United States Patent [19]
Cikanek

[11] Patent Number: 5,358,317
[45] Date of Patent: Oct. 25, 1994

[54] FUZZY LOGIC ELECTRIC VEHICLE REGENERATIVE ANTISKID BRAKING AND TRACTION CONTROL SYSTEM

[75] Inventor: Susan R. Cikanek, Wixom, Mich.

[73] Assignee: Ford Motor Company, Dearborn, Mich.

[21] Appl. No.: 1,965

[22] Filed: Jan. 7, 1993

[51] Int. Cl.[5] .......................... B60T 8/58; B60L 7/10
[52] U.S. Cl. ......................................... 303/100; 303/3; 303/20; 364/426.03; 364/426.02
[58] Field of Search ............................ 303/3, 15–17, 303/20, 93, 100, 103, 105–111; 364/426.01–426.03; 395/900; 180/197, 165

[56] References Cited
U.S. PATENT DOCUMENTS

| | | | |
|---|---|---|---|
| 4,794,538 | 12/1988 | Cao et al. | 364/426.02 |
| 4,809,175 | 2/1989 | Hosaka et al. | 364/424.01 |
| 4,842,342 | 6/1989 | Takahashi et al. | 303/102 |
| 4,930,084 | 5/1990 | Hosaka et al. | 364/426.04 |
| 4,947,332 | 8/1990 | Ghoneim | 364/426.03 |
| 4,962,969 | 10/1990 | Davis | 303/3 |
| 5,001,640 | 3/1991 | Matsumoto et al. | 364/426.02 |
| 5,033,002 | 7/1991 | Sol | 364/426.03 |
| 5,222,568 | 6/1993 | Higasa et al. | 180/165 X |

Primary Examiner—Robert J. Oberleitner
Assistant Examiner—Josie A. Ballato
Attorney, Agent, or Firm—Allan J. Lippa; Roger L. May

[57] ABSTRACT

An regenerative antiskid braking and traction control system using fuzzy logic for an electric or hybrid vehicle having a regenerative braking system operatively connected to an electric traction motor, and a separate hydraulic braking system includes sensors for monitoring present vehicle parameters and a processor, responsive to the sensors, for calculating vehicle parameters defining the vehicle behavior not directly measurable by the sensor and determining if regenerative antiskid braking control, requiring hydraulic braking control, and requiring traction control are required. The processor then employs fuzzy logic based on the determined vehicle state and provides command signals to a motor controller to control operation of the electric traction motor and to the brake controller to control fluid pressure applied at each vehicle wheel to provide the appropriate regenerative braking control, hydraulic braking control, and traction control.

22 Claims, 51 Drawing Sheets

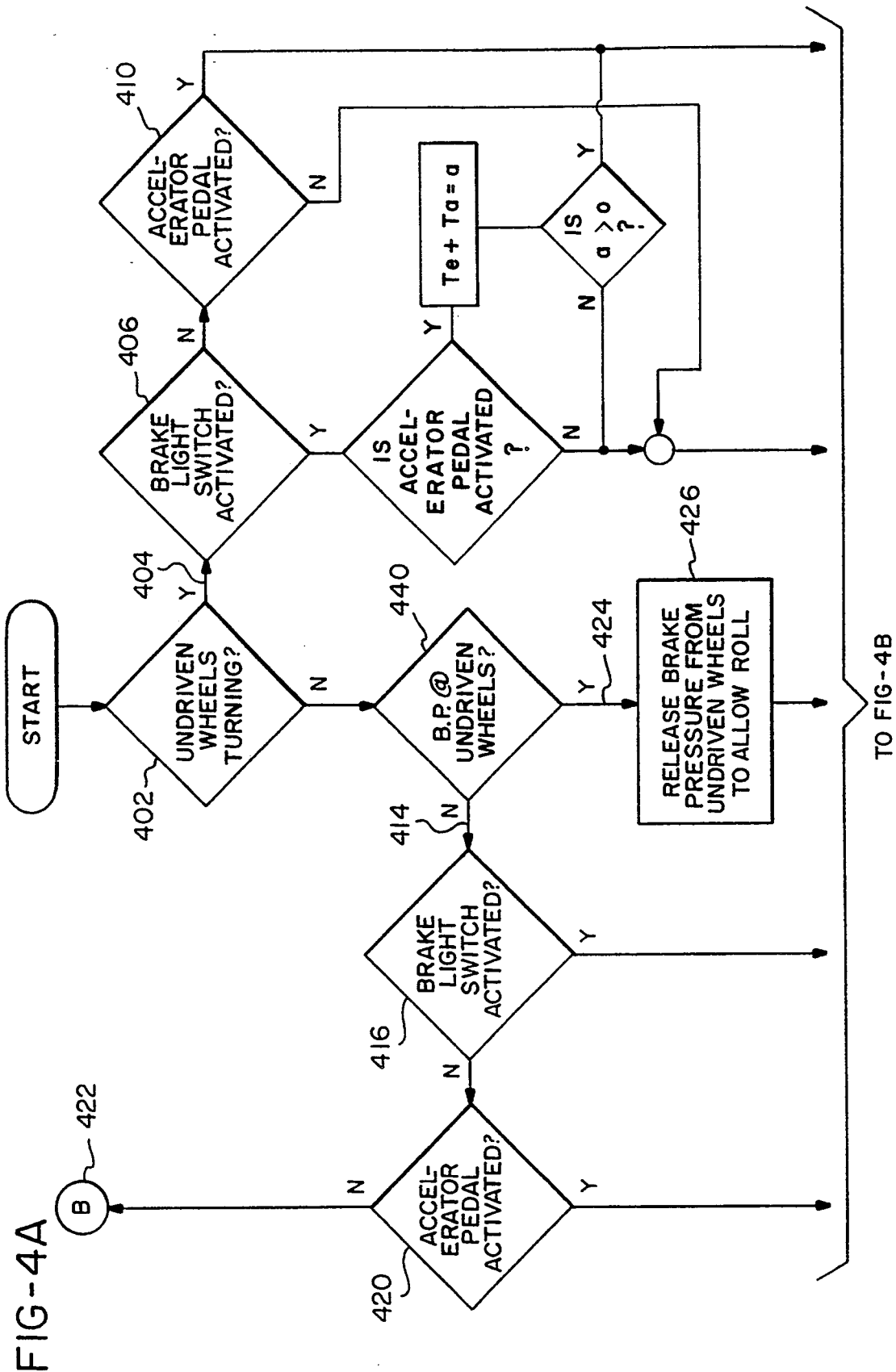

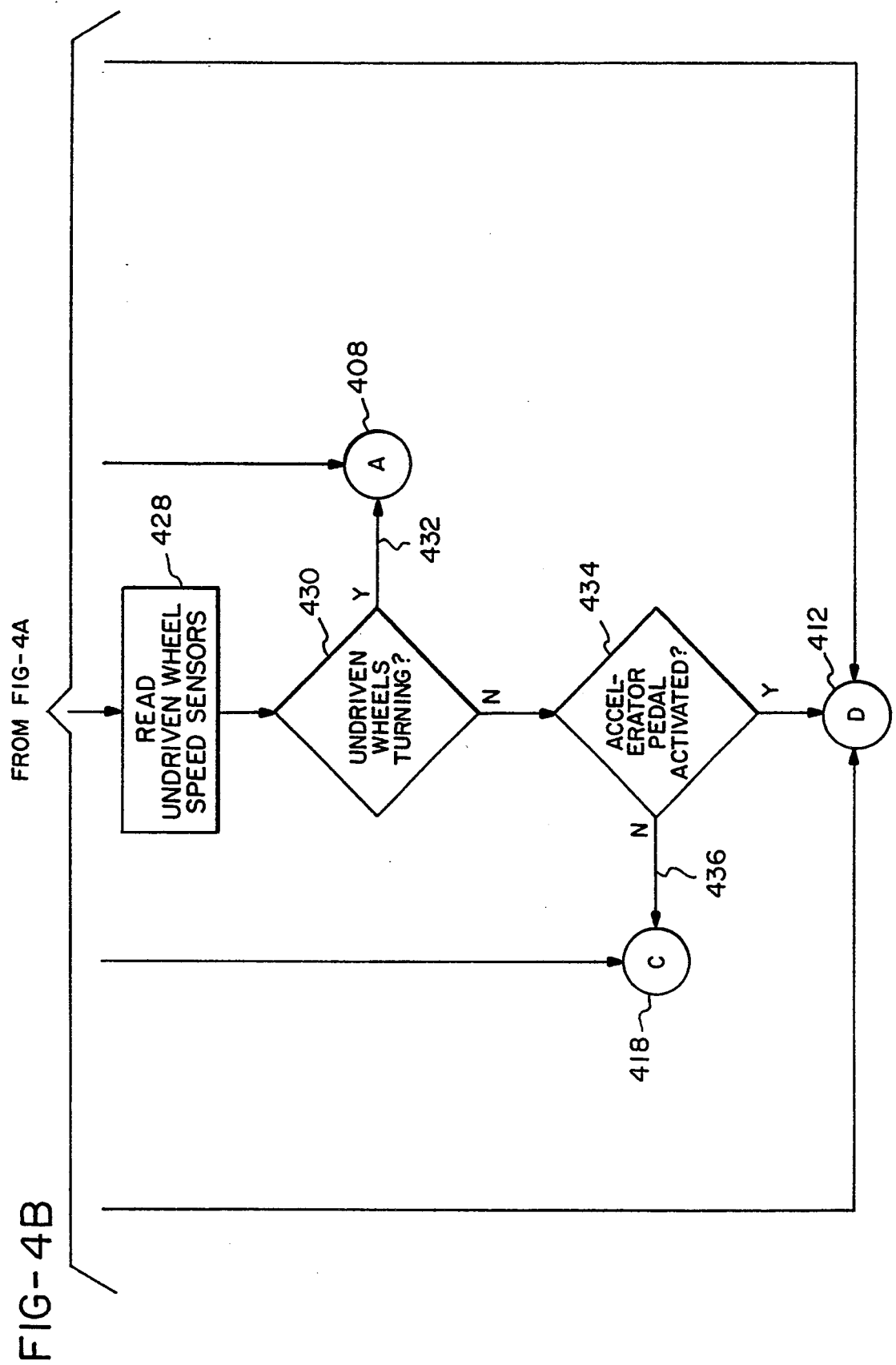

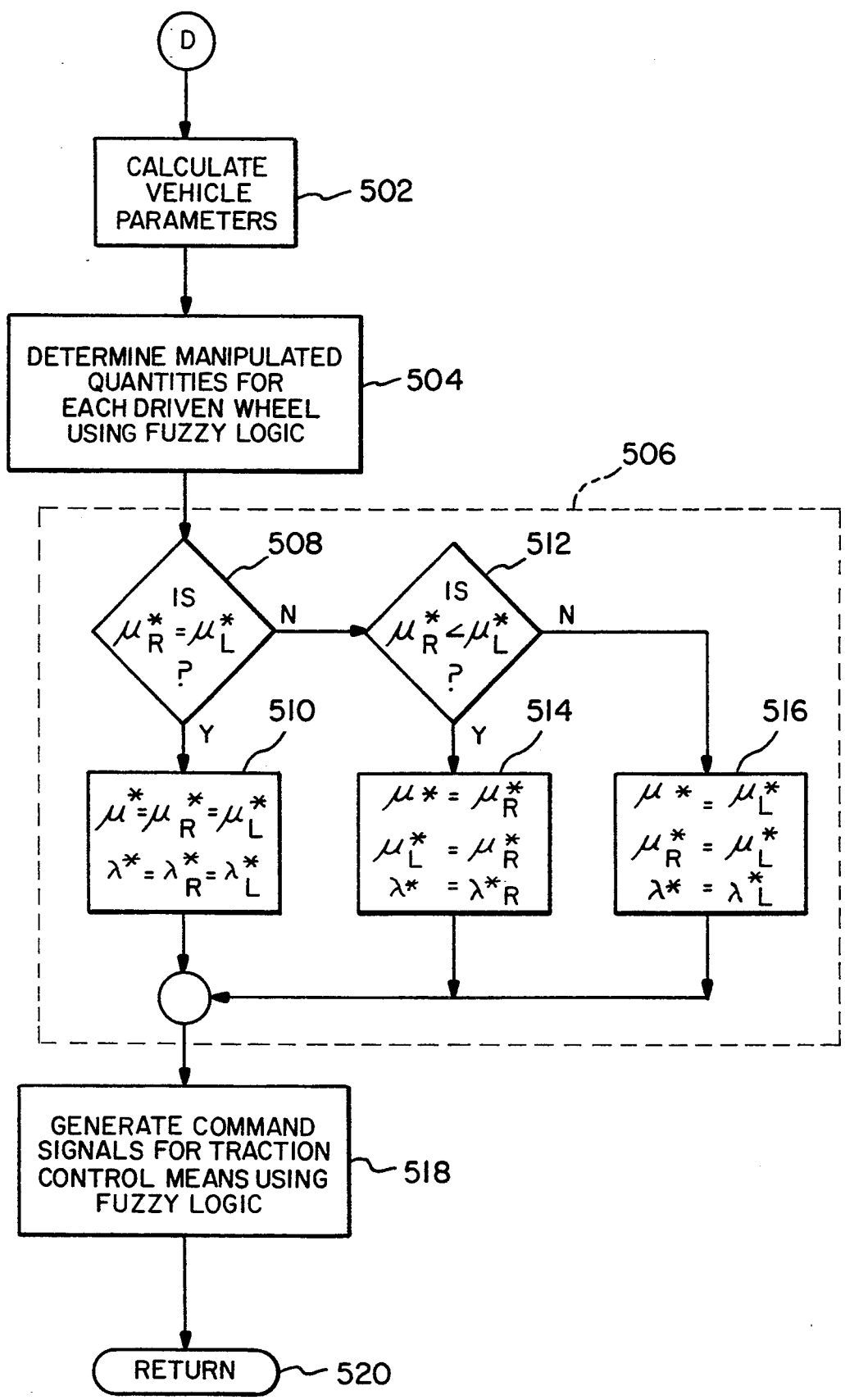

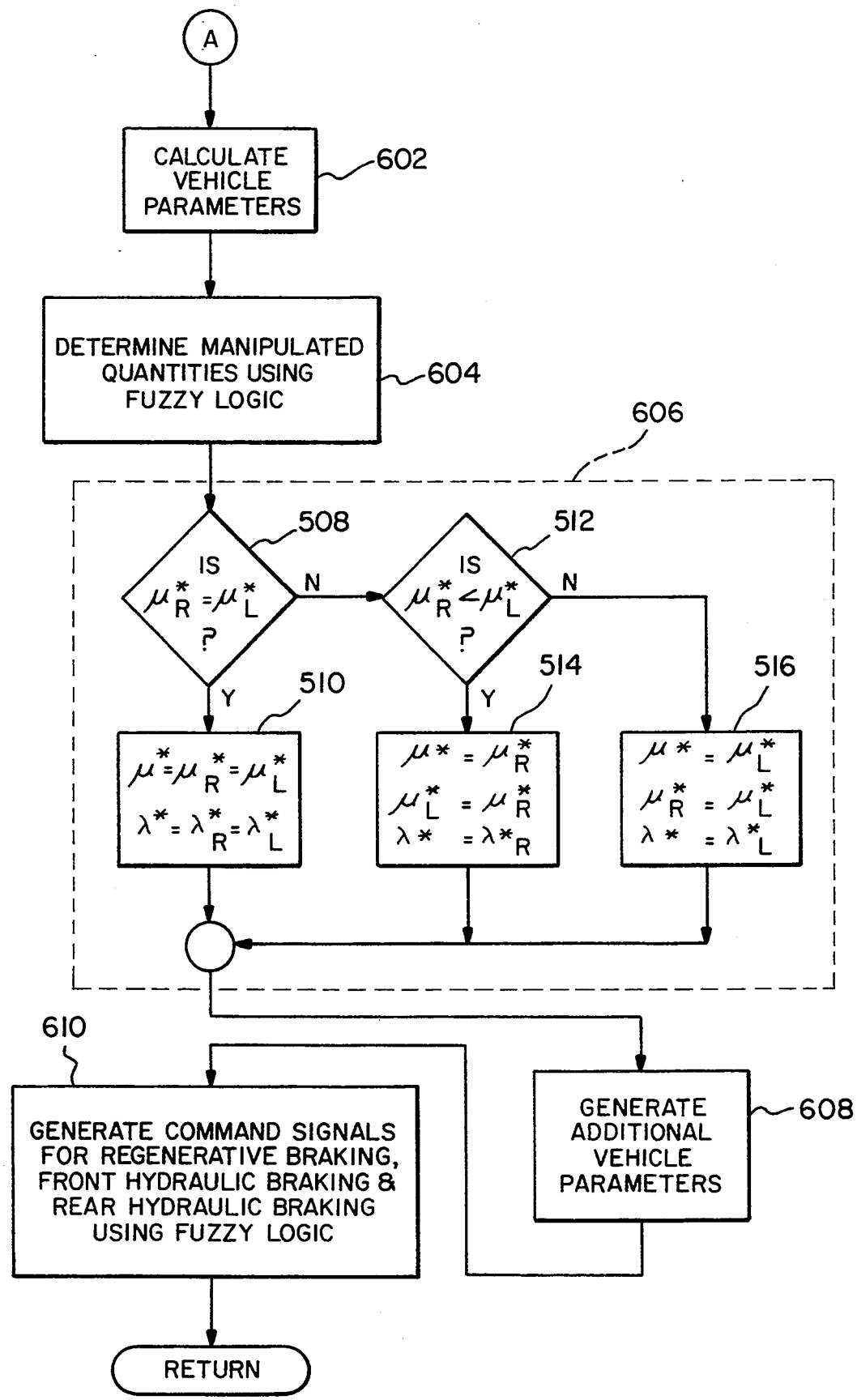

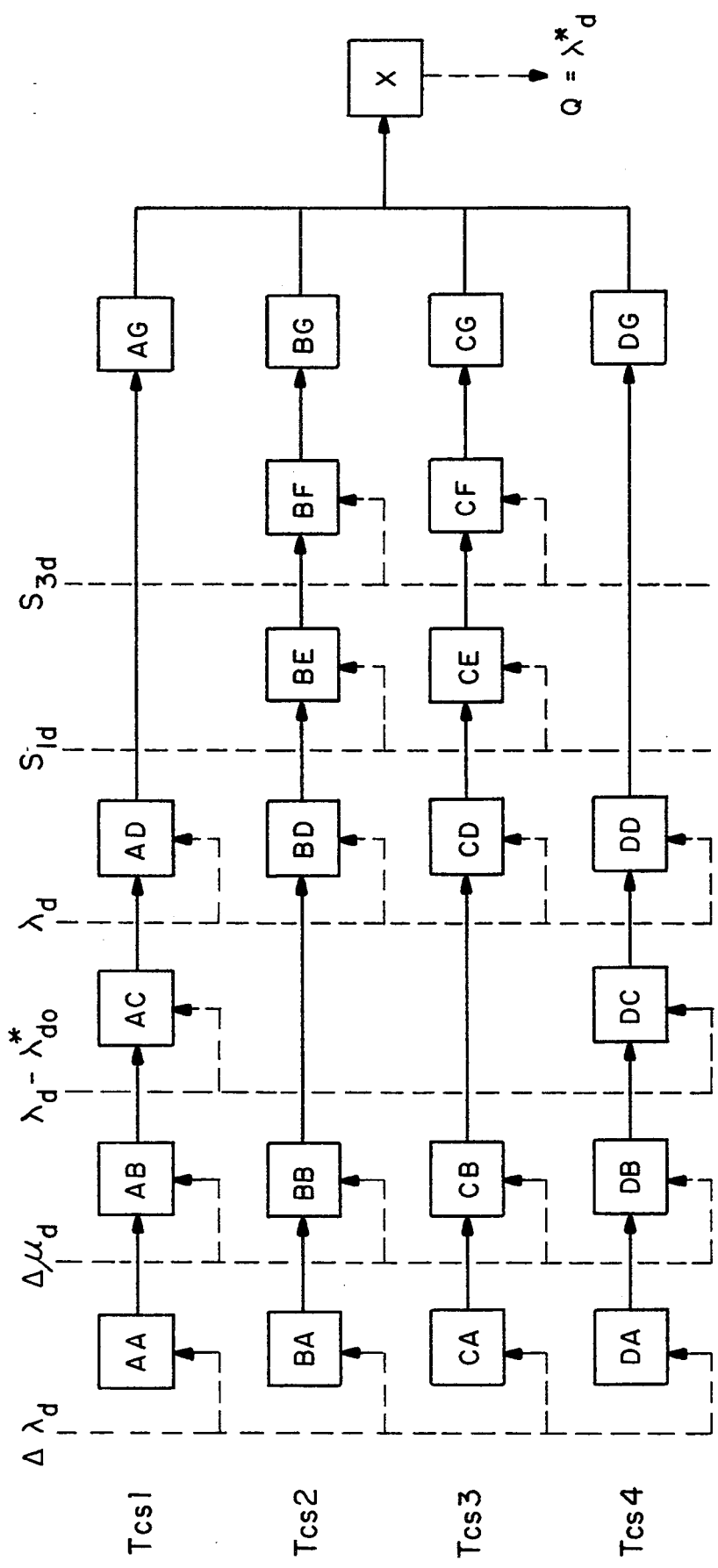

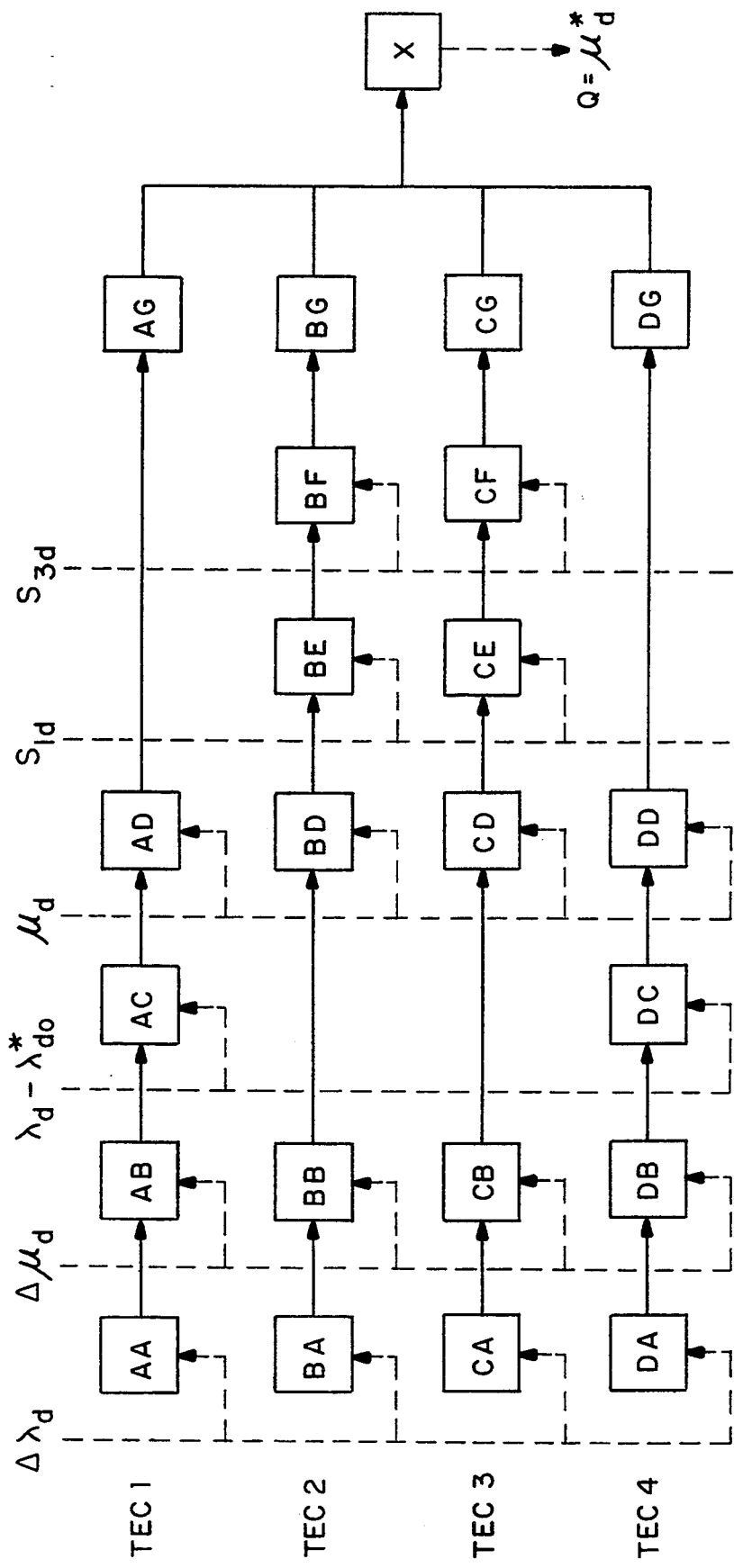
FIG-10  LANGUAGE CONTROL RULES FOR CRITICAL $\mu$ ESTIMATOR (TC)

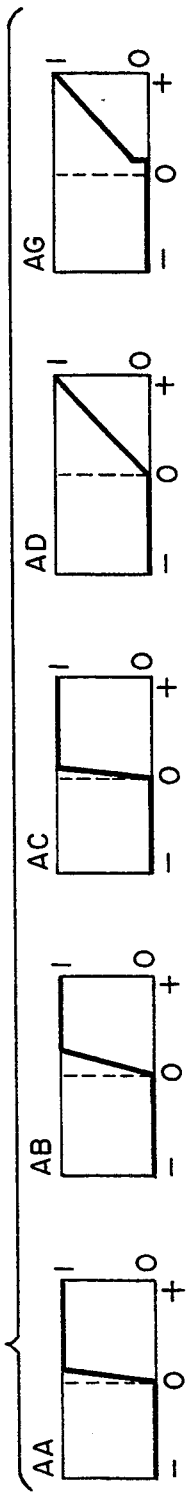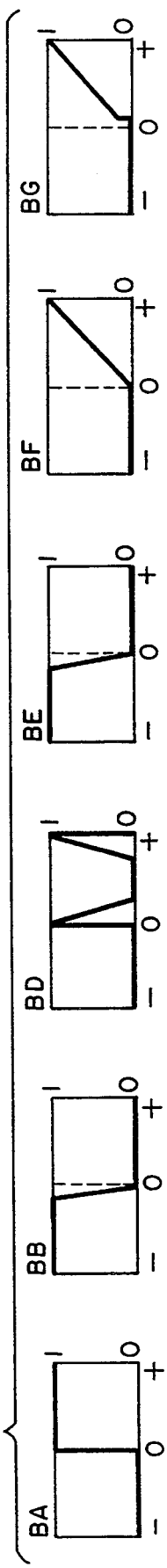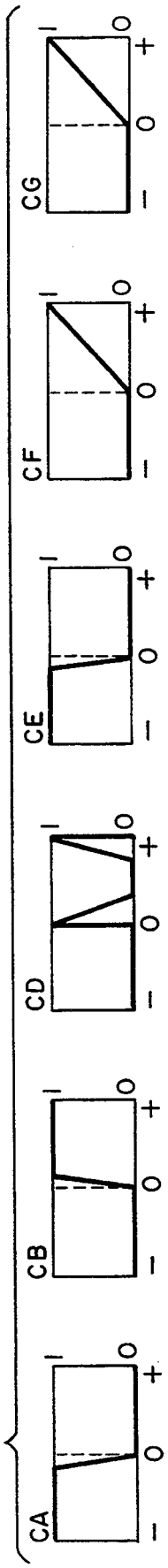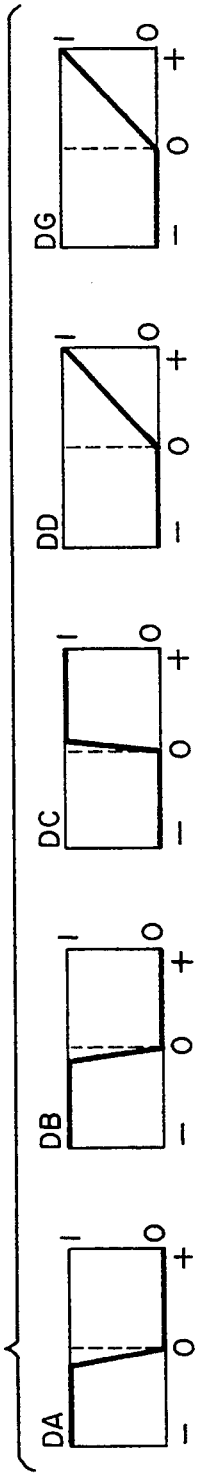
FIG-II(A), FIG-II(B), FIG-II(C), FIG-II(D)

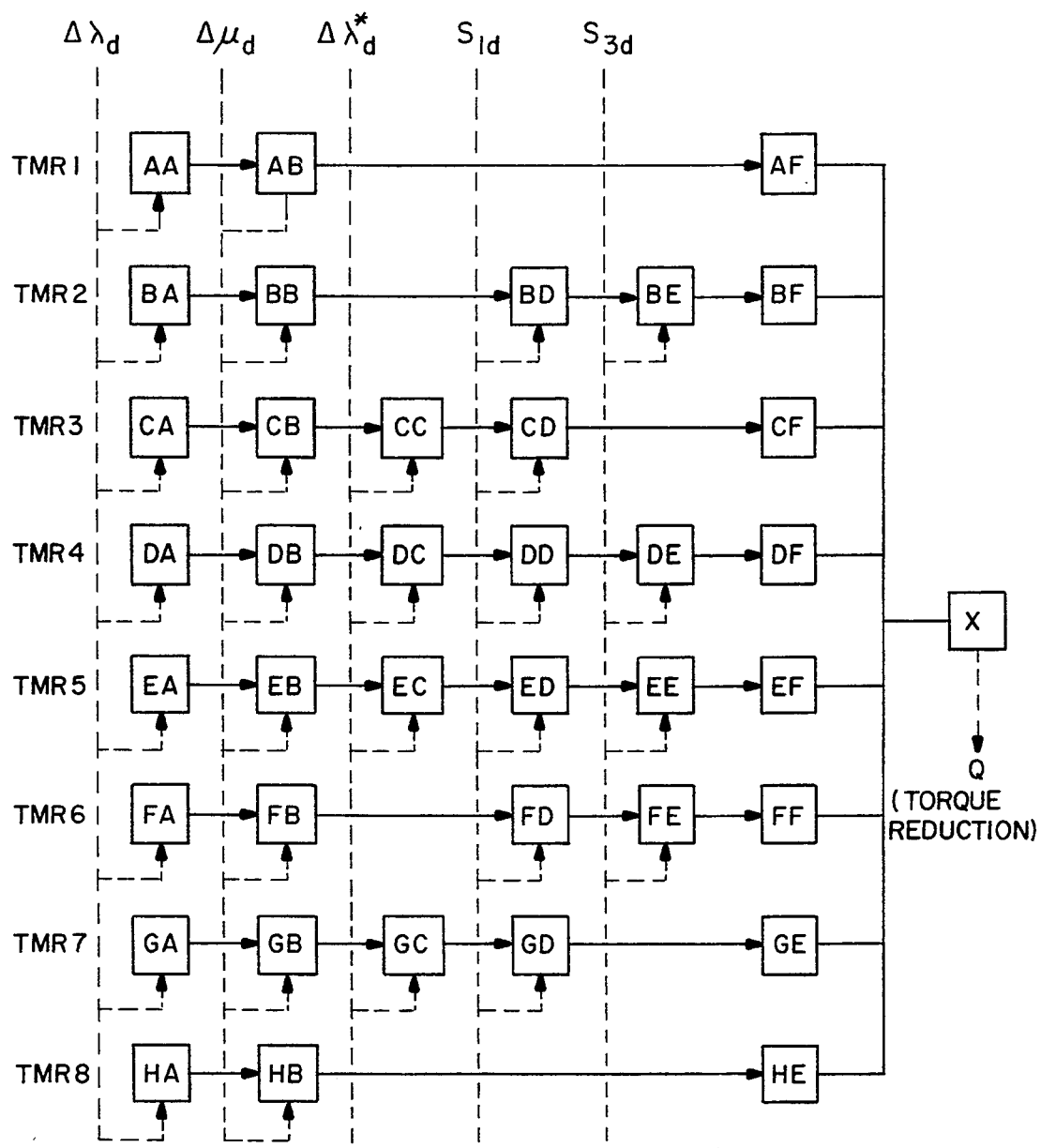

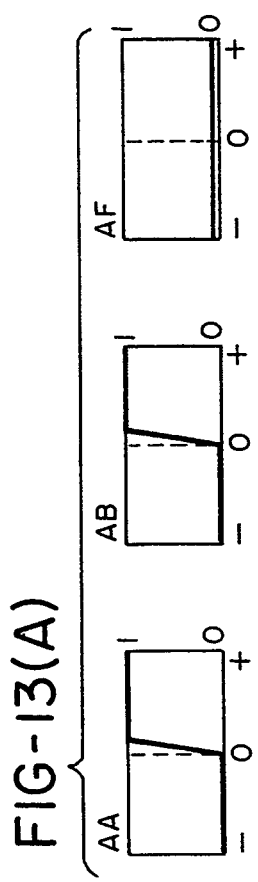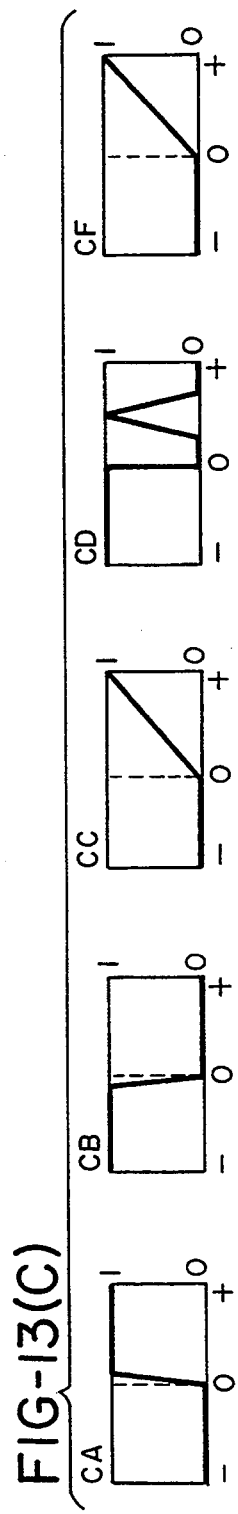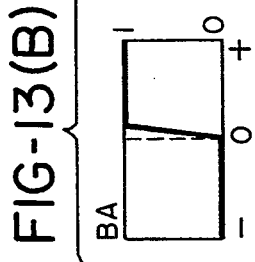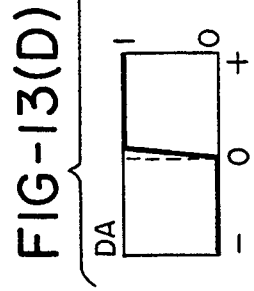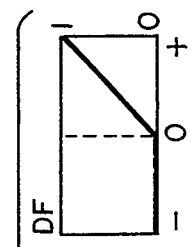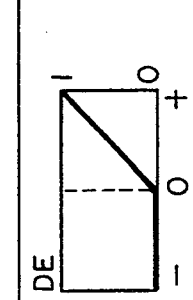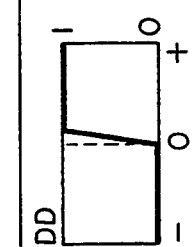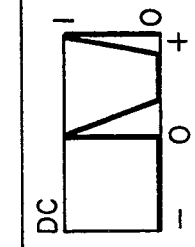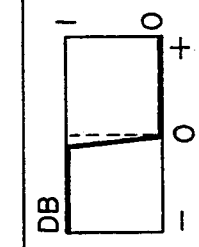
FIG-13(A) FIG-13(B) FIG-13(C) FIG-13(D)

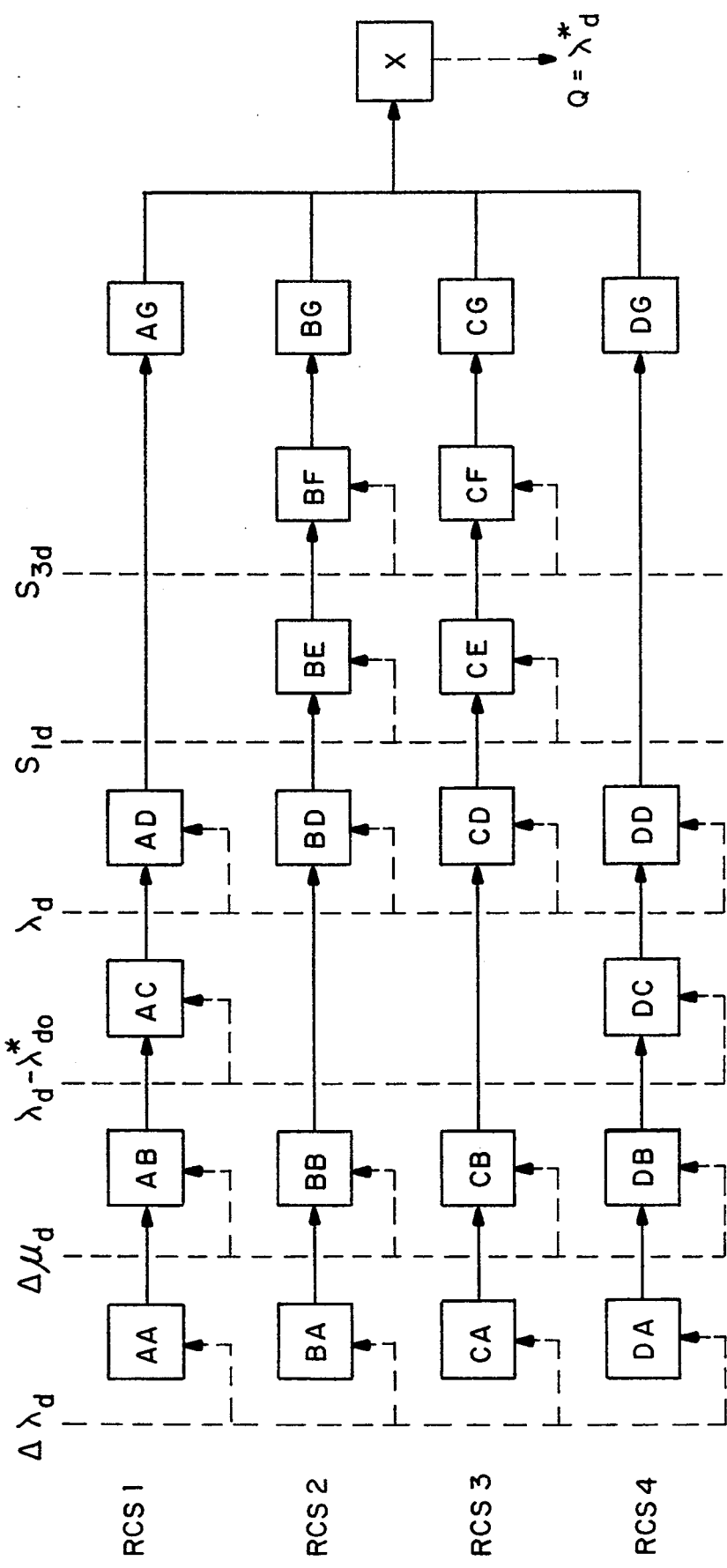

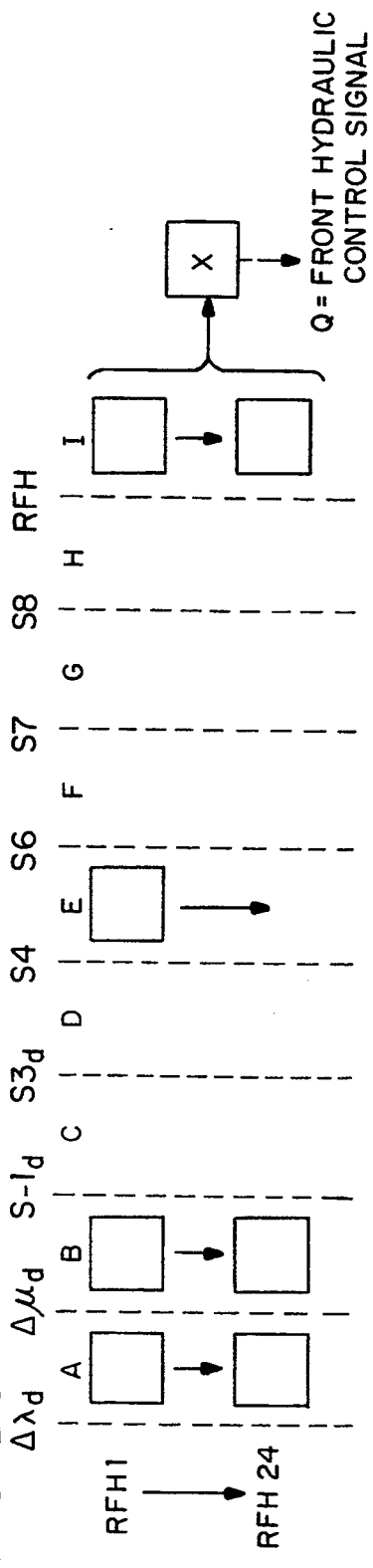
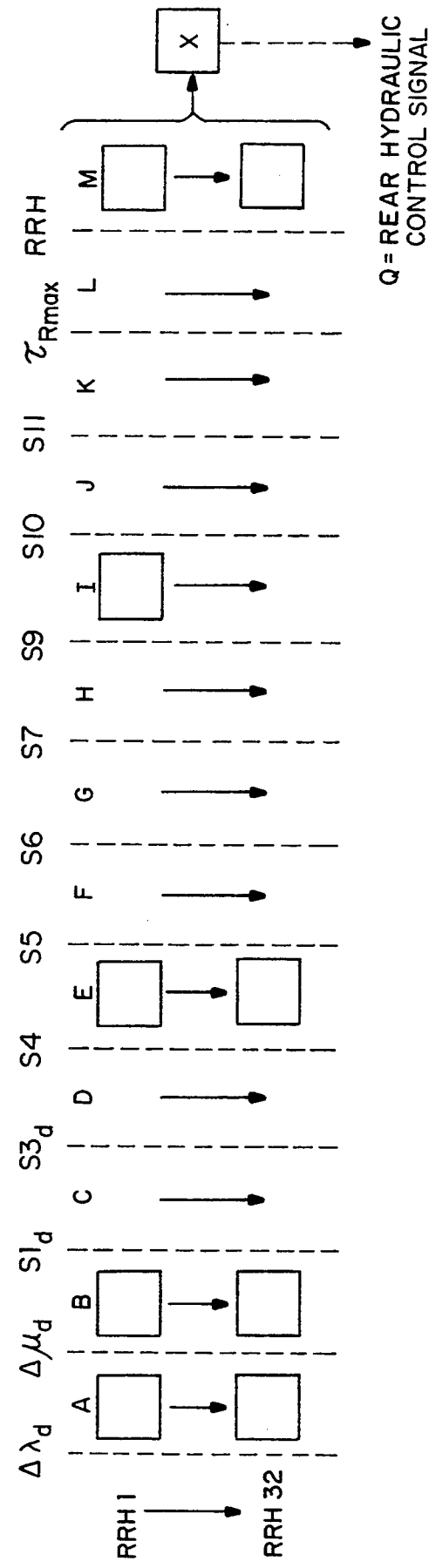

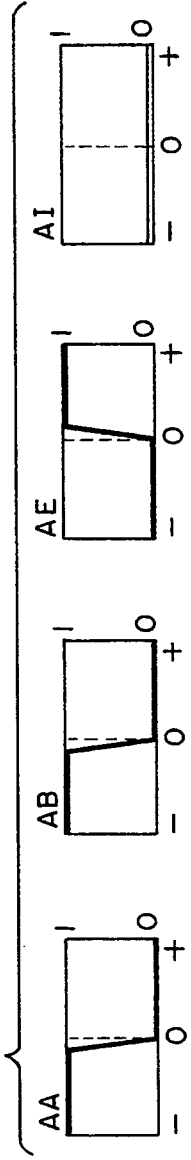
FIG-21(A)
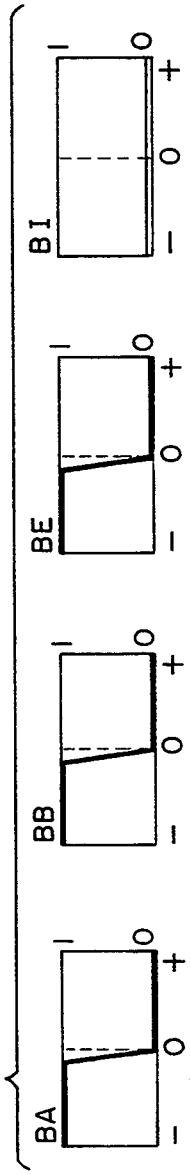
FIG-21(B)
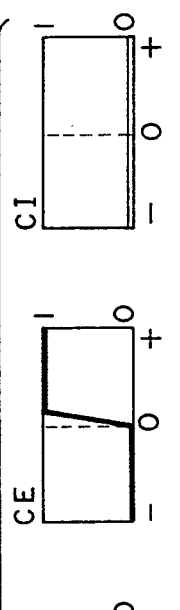
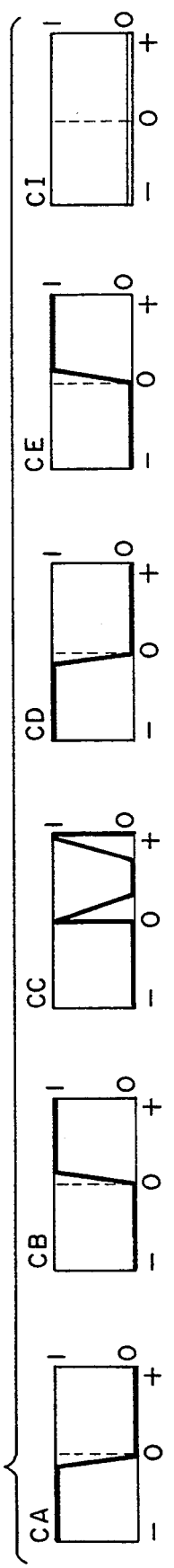
FIG-21(C)
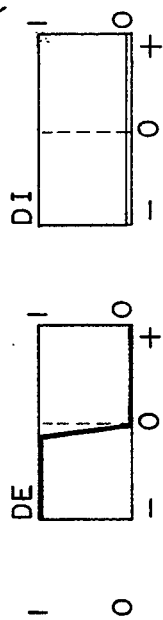
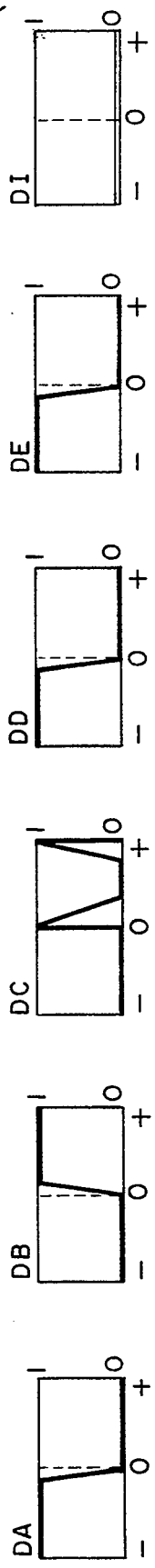
FIG-21(D)

FIG-23(Z)
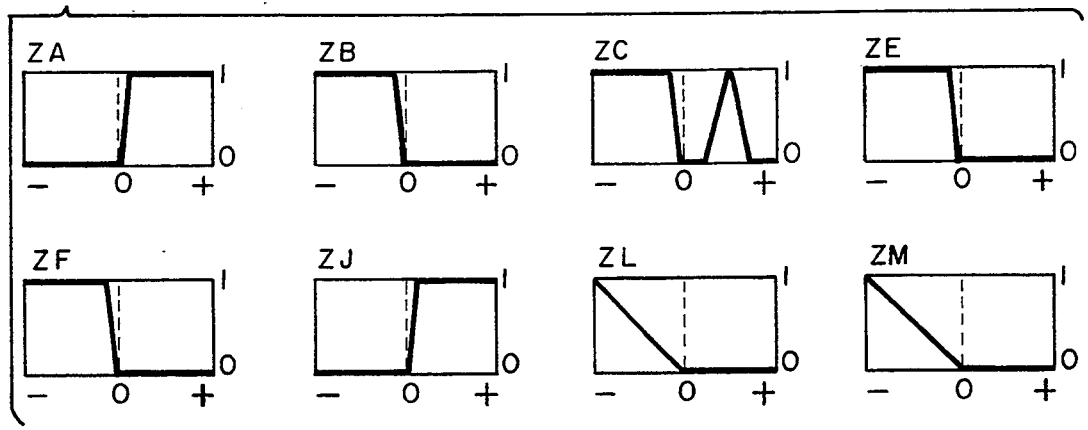
FIG-23(A')
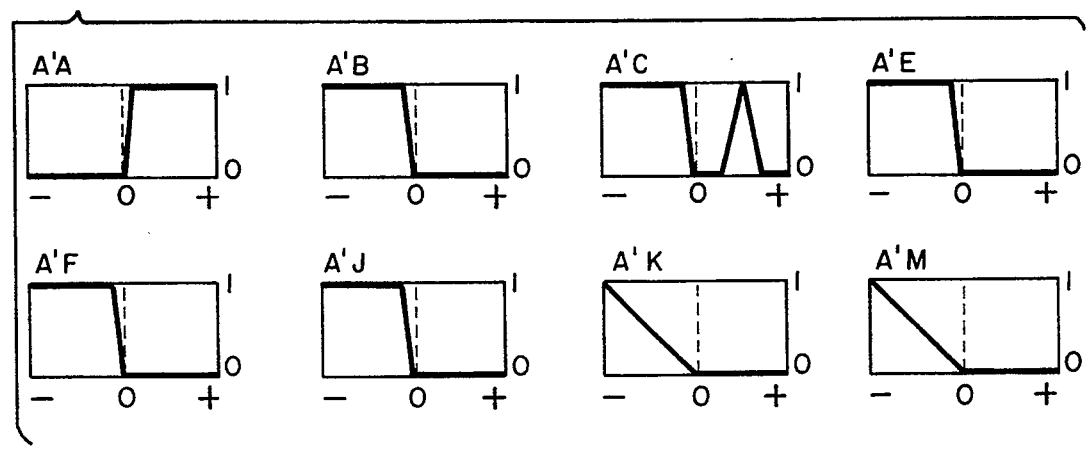
FIG-23(B')
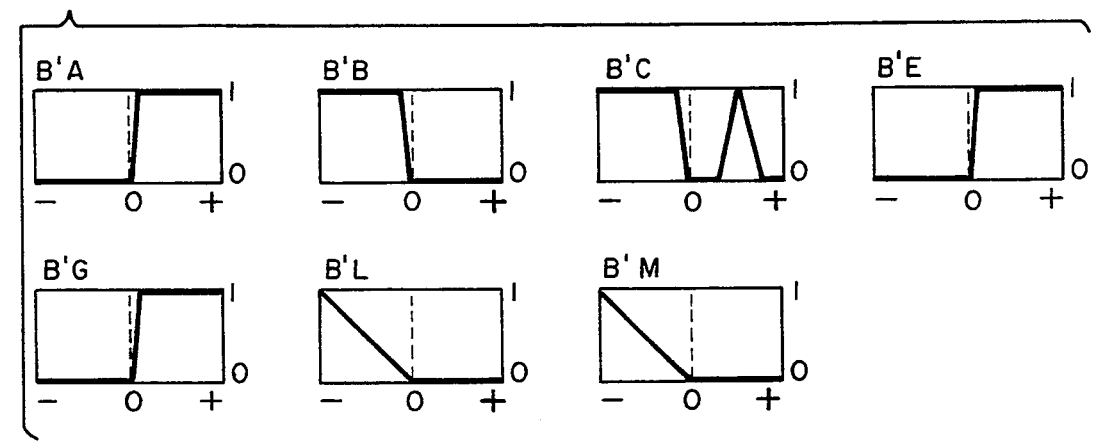

FIG-23(C')
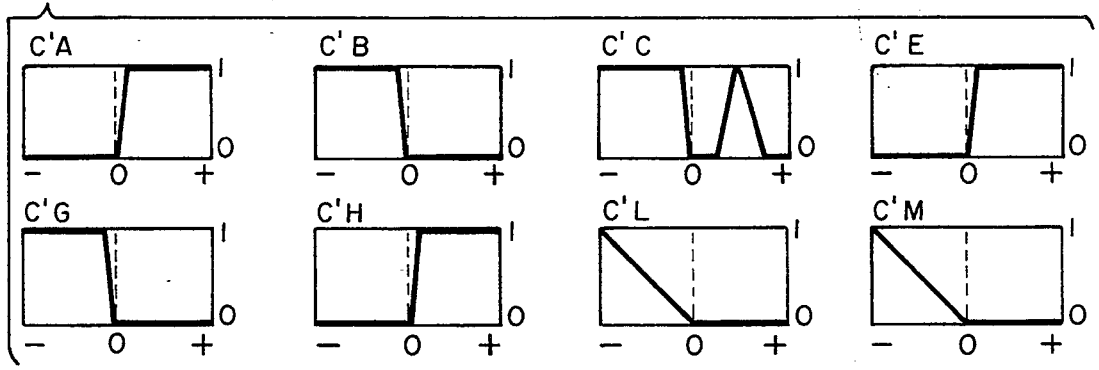
FIG-23(D')
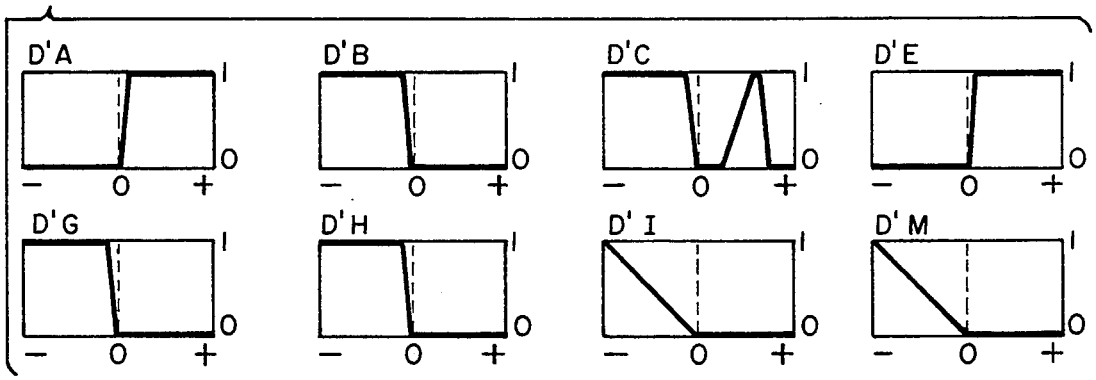
FIG-23(E')
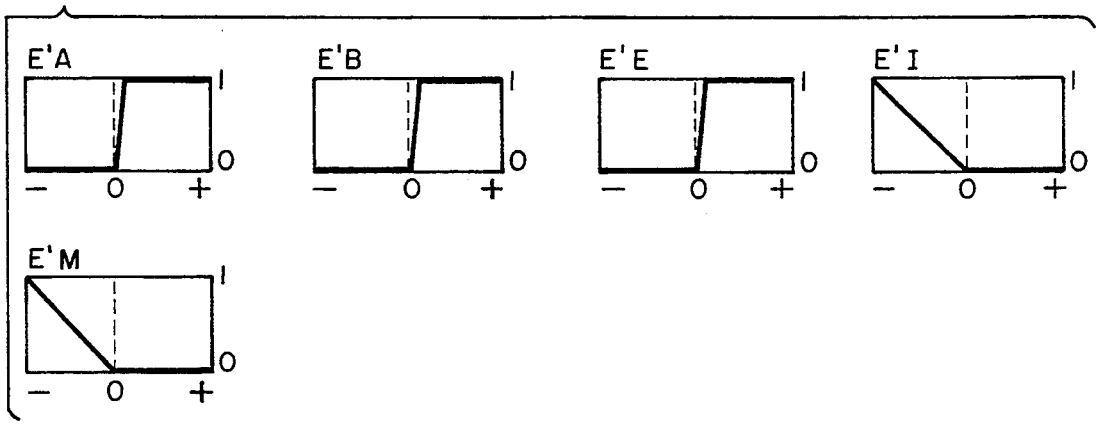
FIG-23(F')
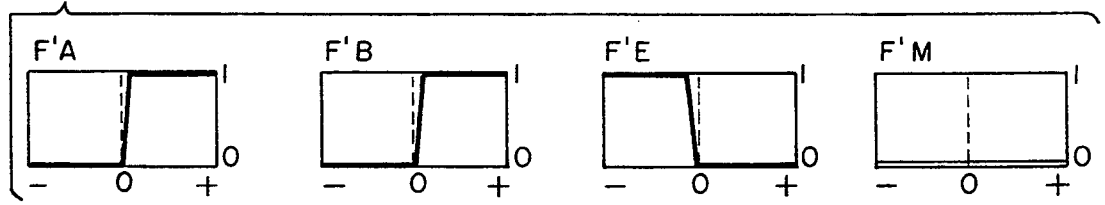

FUZZY LOGIC ELECTRIC VEHICLE REGENERATIVE ANTISKID BRAKING AND TRACTION CONTROL SYSTEM

The U.S. Government has a paid-up license in this invention and the right in limited circumstances to require the patent owner to license others on reasonable terms as provided for by the terms of contract No. DE-AC07-90ID13019, awarded by the U.S. Department of Energy.

BACKGROUND OF THE INVENTION

The present invention relates generally to antiskid braking and traction control for a vehicle and, more particularly, to a system and method for providing antiskid braking and traction control in an electric or hybrid vehicle which improves control performance by the application of fuzzy logic.

Antiskid braking and traction control systems are well known and commonly employed in conventional internal combustion engine vehicles. However, the development of electric and hybrid vehicles has introduced concerns and opportunities unique to electric vehicle control system design. A primary area of concern in electric vehicle design, because of limited battery storage, is the amount of energy used by the various vehicle subsystems. Therefore, designing vehicle control systems that minimize energy use and conserve the available energy stored in the battery is critical.

A further opportunity unique to the electric or hybrid vehicle is the possibility of regenerating the kinetic energy dissipated during braking, or any other period in which the accelerator pedal is not depressed and the vehicle is in motion, e.g. coasting. Such regeneration can be accomplished by controlling the operation of the electric traction motor so that it behaves like a generator. The kinetic energy received during this process can be used to recharge the traction battery and stored for future use. Applying supplemental hydraulic braking only when the braking torque supplied by the electric traction motor cannot meet the driver's brake demand significantly increases the amount of energy recovered. The amount of kinetic energy that is wastefully dissipated while driving or launching an electric or hybrid vehicle is decreased if energy losses due to wheel slippage can be kept minimal.

An antiskid brake control system for a conventional vehicle based on fuzzy inference is disclosed in U.S. Pat. No. 4,842,342 issued to Takahashi et al. Various vehicle parameters are sensed and inputted to a control section for determining a manipulated quantity by a fuzzy inference. The brake fluid pressure is then modulated in accordance with the manipulated quantity. However, the Takahashi et al system was designed solely for operation in conventional vehicles having internal combustion engines and, as such, does not provide for regenerative braking control. In addition, Takahashi et al does not disclose a system for providing vehicle traction control.

Accordingly, there is a need for a system and method for providing antiskid braking and traction control in an electric or hybrid vehicle which provides maximum regenerated kinetic energy during braking and minimizes the loss of kinetic energy due to wheel slip using fuzzy logic to evaluate vehicle performance.

SUMMARY OF THE INVENTION

This need is met by a system and method in accordance with the present invention for providing regenerative antiskid braking and traction control in an electric or hybrid vehicle wherein fuzzy logic is applied to vehicle parameters to determine the appropriate critical values of the vehicle parameters and to generate command signals.

In accordance with one aspect of the present invention, an antiskid braking and traction control system for a vehicle having driven wheels, a regenerative braking system operatively connected to an electric traction motor having motor control means for controlling the operation of said motor and a separate hydraulic braking system having brake control means for controlling fluid pressure applied at each wheel by said hydraulic braking system is provided. The antiskid braking and traction control system includes a sensing means for sensing vehicle parameters representative of vehicle behavior.

A processing means calculates vehicle parameters defining the vehicle behavior not directly measurable by the sensing means. From this information, the state of the vehicle is determined. Fuzzy logic is applied to the sensed vehicle parameters and the calculated vehicle parameters to determine manipulated quantities according to a plurality of first language control rules. Preferably, the processing means employs fuzzy logic to generate the appropriate control signals and provide regenerative antiskid braking control, hydraulic braking control, and traction control.

In accordance with another aspect of the present invention, a method for providing antiskid braking and traction control for a vehicle having at least two driven wheels, a regenerative braking system operatively connected to an electric traction motor having motor control means for controlling the operation of the motor, and a separate hydraulic braking system having brake control means for adjusting the fluid pressure applied at each wheel by the hydraulic braking system, the method for providing antiskid braking and traction control comprising the steps of: sensing vehicle parameters to obtain real-time measurements defining vehicle behavior; calculating additional vehicle parameters describing vehicle behavior not directly measured in the step of sensing vehicle parameters; determining whether regenerative antiskid braking control, hydraulic braking control, or traction control is required based on the vehicle behavior and the critical values; applying fuzzy logic to the vehicle parameters to determine critical values of the vehicle parameters according to a plurality of language control rules; generating command signals, in response to the vehicle parameters and the required control, for controlling the motor control means of the electric traction motor and the brake control means of the hydraulic braking system to provide the regenerative antiskid braking control, hydraulic braking control, or traction control; and controlling the motor control means of the electric traction motor and the brake control means of the hydraulic braking system in accordance with the command signals.

It is thus a feature of the present invention to provide an improved system and method for regenerative antiskid braking and traction control for an electric or hybrid vehicle by means of the application of fuzzy logic.

Other features and advantages of the invention will be apparent from the following description, the accompanying drawings and the appended claims.

BRIEF DESCRIPTION OF THE DRAWINGS

FIGS. 4A and 4B are is a flow charts illustrating a method for determining the vehicle state in accordance with the present invention;

FIG. 5 is a flow chart illustrating a method for generating traction control command signals using fuzzy logic in accordance with the present invention;

FIG. 6 is a flow chart illustrating a method for generating command signals for regenerative antiskid braking, front hydraulic braking, and rear hydraulic braking using fuzzy logic in accordance with the present invention;

FIG. 8 graphically illustrates the language control rules used to determine critical wheel slip $\lambda^*_d$ from a plurality of membership function maps during traction control;

FIG. 10 graphically illustrates the language control rules used to determine critical adhesion coefficient $\mu^*_d$ from a plurality of membership function maps during traction control;

FIGS. 11(A) through 11(D) graphically illustrate the membership function maps of FIG. 10;

FIG. 12 graphically illustrates the language control rules used to determine torque reduction Q from a plurality of membership function maps during traction control;

FIG. 14 graphically illustrates the language control rules used to determine critical wheel slip $\lambda^*_d$ from a plurality of membership function maps during antiskid braking;

FIG. 20 is partial graphical illustration representing the language control rules used to determine a front hydraulic control signal from a plurality of membership function maps;

FIG. 22 is a partial graphical illustration representing the language control rules used to determine a rear hydraulic control signal from a plurality of membership function maps.

DETAILED DESCRIPTION OF THE INVENTION

Figure 1:
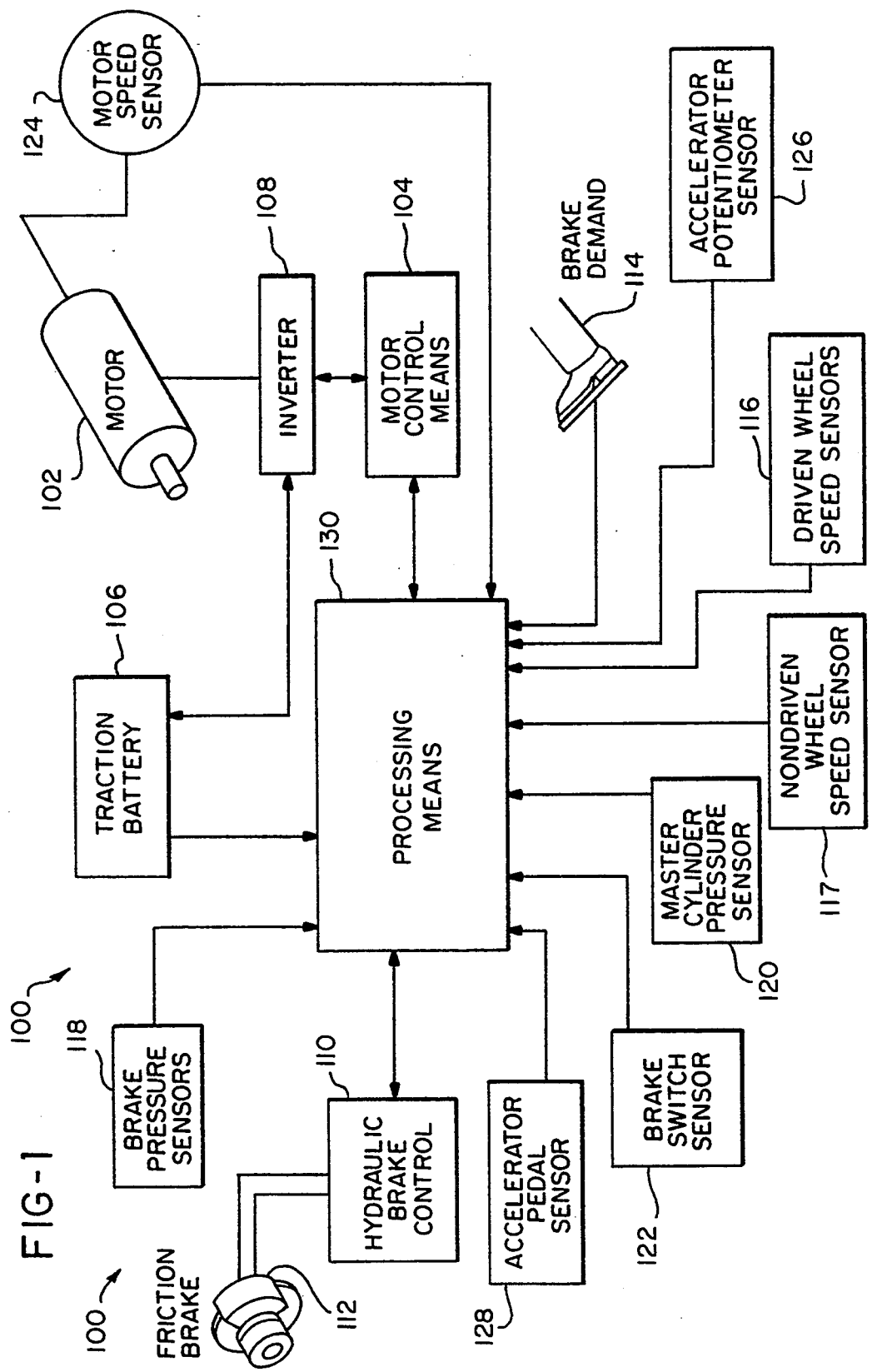
FIG. 1 is a schematic representation of a regenerative antiskid braking and traction control system in accordance with the present invention.

Reference is now made to FIG. 1 which illustrates a regenerative antiskid braking and traction control system, generally designated by the reference numeral 100, according to the present invention for a vehicle having a regenerative braking system operatively connected to an electric traction motor 102. The vehicle further includes a motor control means 104, such as a traction motor operator, for controlling the operation of the motor 102 and a traction battery 106 for supplying power to the motor 102 through an inverter 108. A separate, conventional hydraulic braking system is provided which includes a hydraulic brake control means 110, such as a conventional brake system controller, for controlling the fluid pressure applied to a conventional friction brake 112 of each wheel (not shown), and a manual brake pedal 114. Commonly assigned, U.S. Pat. No. 4,962,969, issued to Davis, describes a vehicle having both regenerative and friction braking systems as discussed above, and is hereby incorporated by reference into the present specification.

In a preferred embodiment, the regenerative antiskid braking and traction control system 100 of the present invention comprises a sensing means, illustrated as driven wheel speed sensors 116, nondriven wheel speed sensors 117, brake pressure sensors 118 for driven wheels and at least one brake pressure sensor for the brake line of the nondriven wheels, master cylinder pressure sensor 120, brake switch sensor 122, motor speed sensor 124, motor current sensor and means for sensing operation of an acceleration pedal switch, shown as an acceleration potentiometer sensor 126 and acceleration pedal sensor 128, for sensing vehicle parameters to obtain real-time measurements representative of vehicle behavior. Since the structure and philosophy of the various sensors are well-known in the art and are not important to the present invention beyond the obtaining of the measurements, details of the sensors will not be further discussed herein.

It should be noted that, in many vehicle control systems, it is prudent to provide for redundant measurements to insure vehicle safety. In the present control system, redundant measurements are made to detect brake demand 114 by measuring the pressure of the master cylinder and determining the state of the brake light switch. Acceleration demand may also be redundantly detected in the preferred embodiment by measuring a conventional accelerator potentiometer, in addition to determining the state of the acceleration pedal switch.

A processing means 130 is provided to determine a vehicle state based upon the obtained measurements. Possible vehicle states include requiring regenerative antiskid braking control, requiring hydraulic braking control, and requiring traction control. Further, the present system 100 maximizes the kinetic energy generated during regenerative braking by using hydraulic braking only when regenerative braking is unable to meet the brake demand 114 of the vehicle operator.

The processing means 130 calculates vehicle parameters defining said vehicle behavior not directly measurable by said sensing means, such as vehicle acceleration. The processing means 130 then determines the vehicle state based on the sensed parameters. Preferably, the processing means 130 applies fuzzy logic to the sensed and calculated vehicle parameters to determine manipulated quantities. Command signals are then generated by the processor 130. The command signals are preferably generated by applying fuzzy logic to the vehicle parameters based on the determined vehicle state.

Figure 3:
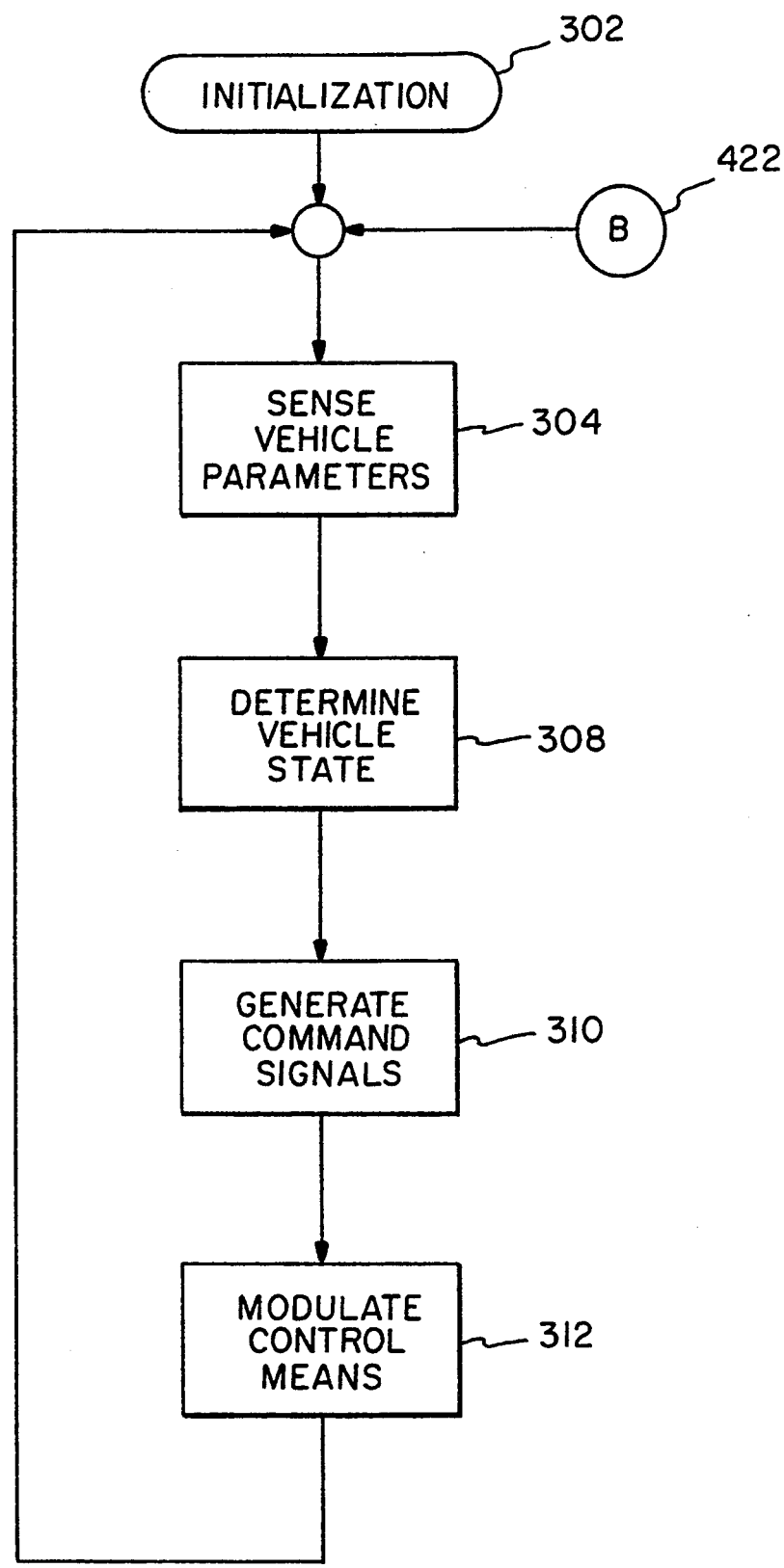
FIG. 3 is a flow chart illustrating a method for providing regenerative antiskid braking and traction control in accordance with the present invention.

Referring now to FIG. 3, a flow chart is shown which illustrates a method for providing regenerative antiskid braking and traction control in accordance with the present invention. Upon starting of the vehicle, the system variables are initially assigned predetermined values 302. Vehicle parameters are then sensed 304 through the sensing means. Based on these vehicle parameters, the vehicle state is determined 308 in accordance with the flow chart of FIG. 4, which is discussed in detail below. In response to the determined vehicle state, additional vehicle parameters, not directly measurable by said sensing means, are calculated by the processing means 130, and appropriate command signals are generated 310. The command signals then modulate 312 the brake control means 110 and the motor control means 104 to provide antiskid braking and traction control.

FIGS. 4A and 4B are a flow chart, implemented by the processing means 130, which illustrates a method for determining the vehicle state, shown as step 308 in FIG. 3. First, it is determined at step 402 whether the nondriven wheels are turning, if so the vehicle is moving 404. If the vehicle is moving 404 and the operator is demanding brakes 406, determined by the brake light switch sensor 122 and the master cylinder brake pressure sensor 120 and the accelerator pedal is not activated, then the vehicle is operating in a state, illustrated as state A, requiring regenerative antiskid braking control 408. If the vehicle is moving 404 and the operator is demanding brakes 406 and the accelerator pedal is activated then the accelerator positive torque command is summed with the brake torque command (negative) and that sum is compared to zero. If that sum is greater than zero then the state of traction control is selected. If that sum is not greater than zero then the state of regenerative antiskid braking control is selected. If the vehicle is moving 404 and the operator is not demanding brakes 406 and the accelerator pedal is activated 410, then the vehicle is operating in a state, illustrated as state D, requiring traction control 412. If the vehicle is moving 404 and the operator is not demanding brakes 406 and the accelerator pedal is not activated 410, the vehicle is coasting and operating in state A requiring regenerative antiskid braking control 408.

Alternatively, if the nondriven wheels are not turning 402, the brake pressure present at the nondriven wheels is determined 440. If brake pressure is not present at the nondriven wheels, then the vehicle is not moving 414. If the vehicle is not moving 414 and the brakes are applied to the driven wheels 416, then the vehicle is operating in a state, illustrated as state C, requiring only hydraulic braking control 418. If the vehicle is not moving 414, the brakes are not activated 416, and the accelerator pedal is activated 420, then the vehicle is in state D requiring traction control 412. If the vehicle is not moving 414, the brakes are not activated 416, and the accelerator pedal is not activated 420, then the vehicle does not require any braking or traction control 422, shown as state B. When no braking or traction control is required 422, the control system simply returns to FIG. 3 and continues this loop until a state requiring braking or traction control is detected.

Finally, if the nondriven wheels are not turning 402 and brake pressure is present at the nondriven wheels 440, then the vehicle is either stopped or skidding with all of the wheels locked up 424. To determine whether the vehicle is skidding, the control system releases brake pressure to the nondriven wheels long enough to allow the nondriven wheels to spin 426 and the nondriven wheel speed sensors 117 are read to detect wheel movement 428. If the wheels spin when brake pressure is released 430, then the vehicle is skidding 432 and in state A requiring regenerative antiskid braking control 408.

Alternatively, if the wheels do not spin when brake pressure is released 430, and the accelerator pedal is depressed 434, then the vehicle is operating in state D requiring traction control 412. Finally, if the wheels do not spin when brake pressure is released 430 and the accelerator is not depressed 434, then the vehicle is stopped 436 and in state C requiring only conventional hydraulic braking 418.

The vehicle state determines which command signals are generated by the processing means 130 for the type of control required. For example, in the preferred embodiment, the braking control command signals may include a front hydraulic braking control signal and a rear hydraulic braking control signal when the vehicle is in a state requiring only hydraulic braking control. These command signals modulate the braking control means 110 so that a predetermined level of hydraulic brake pressure is applied at each wheel. Alternatively, the braking control command signals may include a rear hydraulic braking control signal, a front hydraulic braking control signal, and a regenerative antiskid braking control signal for modulating the braking control means 110 and motor control means 104 when the vehicle is in a state requiring regenerative antiskid braking control. Finally, the traction control command signals may include a reduction in motor torque control signal for modulating the motor control means 104 when the vehicle is in a state requiring traction control.

Figure 2:
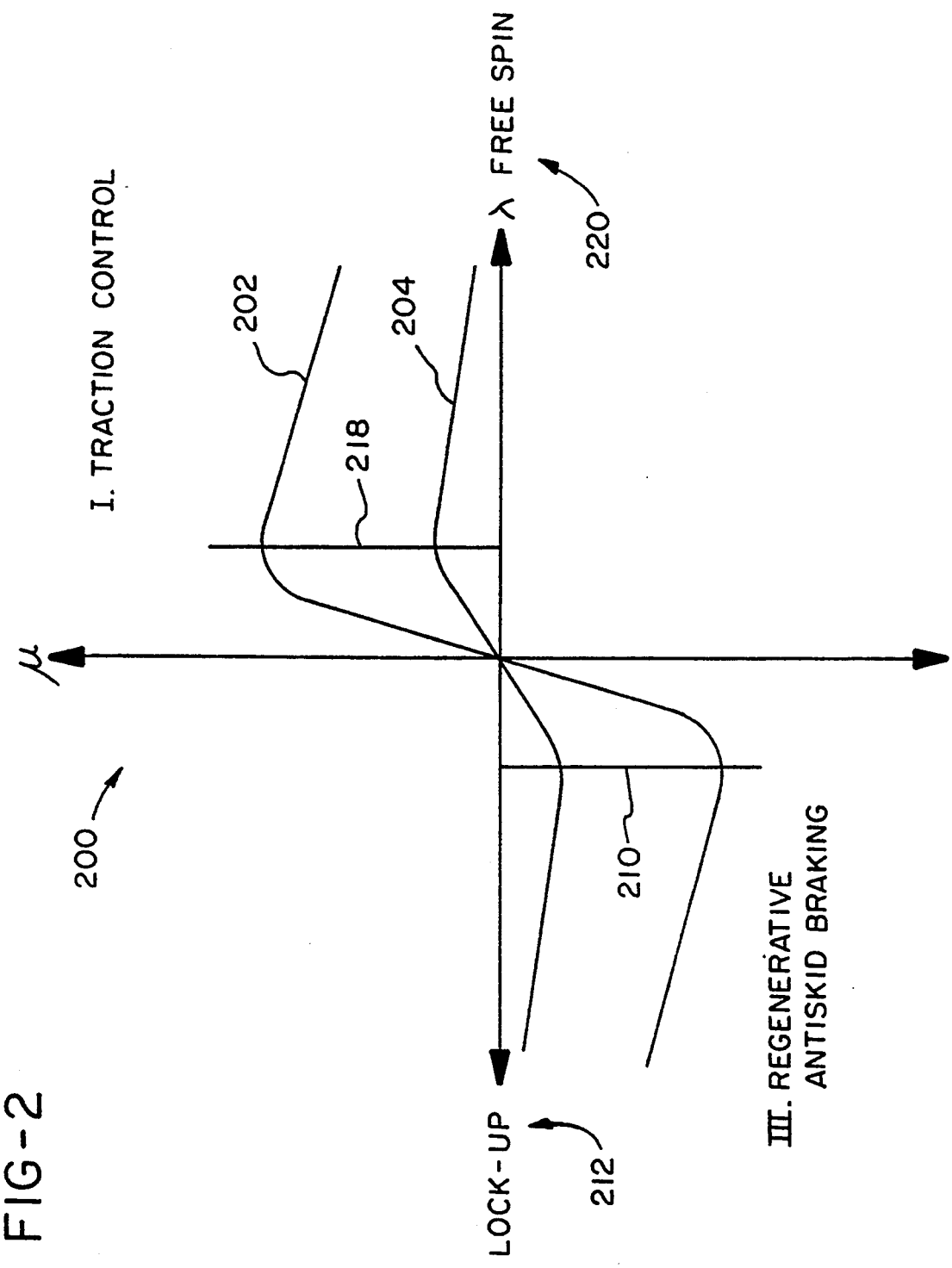
FIG. 2 is a graphical representation of the interrelationship of the adhesion coefficient $\mu$, between a wheel and a road surface, and wheel slip or skid $\lambda$.

The theory behind traction control and regenerative antiskid braking control, and more specifically, the estimation of critical adhesion coefficient $\mu^*$ and critical slip or skid $\lambda^*$, will now be briefly explained with reference to FIG. 2. In FIG. 2, a graph 200 having a wheel slip or skid $\mu$ v. adhesion coefficient $\mu$ curve 202, hereinafter denoted the slip v. mu curve, for a road surface having a high adhesion coefficient, such as dry pavement, and a similar curve 204 for a road surface having a low adhesion coefficient, such as ice, is shown. The adhesion coefficient $\mu$ represents the coefficient of friction between the tire surface and the road surface. Quadrant III of FIG. 2 illustrates conditions conducive to regenerative antiskid braking control, while Quadrant I of FIG. 2 illustrates conditions conducive to traction control.

Referring now to Quadrant I of FIG. 2, when driving torque is applied to a pneumatic tire, a tractive force, proportional to the adhesion coefficient $\mu$, develops at the area where the tire contacts the road surface. The tire tread in front of, and within the contact area is subject to compression while the wheel is being driven. Hence, the distance the tire travels when subject to a driving torque will be less than when it is free rolling. The adhesion coefficient $\mu$ at the contact area is a function of wheel slip $\lambda$ and road surface conditions.

Wheel slip $\lambda$ is defined as the relative difference between the speed of a driven wheel $\omega_d$, detected by driven wheel speed sensor 116, and the speed of the vehicle v/Rw, where Rw is the tire radius detected by nondriven wheel speed sensor 117. Wheel slip and wheel skid are associated with traction and antiskid braking control respectively. Additionally, for ease of description, vehicle parameters relating to a driven wheel will be generally designated by a subscript (d), however, right and left driven wheel designations may be occasionally used for clarification.

When the vehicle is operating in quadrant I of FIG. 2 and thus, requires traction control, the wheel slip $\lambda_d$ for each driven wheel is calculated according to the following equation:

$$\lambda_d = (\omega_d - v/Rw)/\omega_d \quad \omega_d > v/Rw \tag{1}$$

wherein $\omega_d$ is the wheel speed of the subject driven wheel and v/Rw is vehicle speed as measured by the nondriven wheel speed sensor 117. Wheel slip $\lambda$ is always positive when traction control is required due to the compression of the tire surface caused by the acceleration demand. This compression results in a wheel speed $\omega_d$ greater than the vehicle speed v/Rw during acceleration.

As illustrated by the curve 202 in FIG. 2, the adhesion coefficient $\mu$ increases as wheel slip $\lambda$ increases until a critical value of wheel slip $\lambda^*$, denoted by vertical line 218, is surpassed. As wheel slip $\lambda$ increases beyond this critical slip value 218, the wheel approaches free spin, shown at 220. In this region of the curve 202 beyond the critical wheel slip $\lambda^*$, the vehicle is unstable and a condition of excessive wheel slip exists since the available energy demanded by the vehicle operator is increasingly used to accelerate the wheel inertia rather than the vehicle.

To regain vehicle stability when a condition of excessive spin exists, motor torque must be reduced so the driven wheels decelerate to a speed that allows for the maximum traction between the tires and road surface. Optimal vehicle acceleration occurs when the actual wheel slip $\lambda$ is equal to the critical wheel slip $\lambda^*$ for the present road surface. Therefore, the reduction in motor torque required to provide optimal acceleration is a function of the operating point of each driven wheel on the slip v. mu curve in relation to the critical wheel slip $\lambda^*$.

Conversely, when braking torque is applied to a pneumatic tire, the tire tread in front of, and within the contact area of the tire is subject to tension. Hence, the distance the tire travels when subject to braking torque will be greater than when it is free rolling. The tractive force developed at the contact area is a function of wheel slid $\lambda$ and road surface conditions. When the vehicle is operating in a state requiring regenerative antiskid braking control, wheel slid for each driven wheel $\lambda_d$ is calculated according to the following equation:

$$\lambda_d = (\omega_d - v/Rw)/(v/Rw) \quad \omega_d < v/Rw \tag{2}$$

wherein $\omega_d$ is the driven wheel speed and v/Rw is the vehicle speed.

Wheel slid $\lambda$ is always negative when regenerative antiskid braking control is required because of the tension caused by the braking demand. As a result of this tension, the wheel speed $\lambda$ is always less than the vehicle speed v/Rw during braking. As illustrated by curve 202 in FIG. 2, the adhesion coefficient $\mu$ decreases as wheel skid $\lambda$ decreases until a critical value of wheel skid $\lambda^*$, illustrated as line 210, is surpassed. Beyond this critical skid value 210, the adhesion coefficient $\mu$ increases and the wheel approaches lock-up, shown at 212, which leads to vehicle instability. To regain vehicle stability when a condition of excessive skid exists, regenerative motor braking torque must be reduced so the driven wheels can accelerate to a speed that allows for the maximum traction between the tire and road surface. Optimal vehicle deceleration occurs when the wheel skid $\lambda$ is at the critical wheel skid $\lambda^*$ for the present road surface.

From the discussion above, it is apparent that an accurate determination of vehicle speed is critical for the detection of an impending skid or excessive slip condition by the antiskid braking and traction control system. Moreover, accurate knowledge of vehicle speed and vehicle acceleration is of particular importance in the present application since several calculations necessary to maximize regenerative antiskid braking, are functions of vehicle speed and acceleration.

While several methods of calculating vehicle acceleration are known in the art, acceleration is calculated in the present application according to the following equation whenever hydraulic brakes are being applied to the nondriven wheels:

$$Dv = [k(2(\theta_e/G_r) - \theta_{rd} - \theta_{ld}) + \\ \beta(2(\omega_e/G_r) - \omega_{rd} - \omega_{ld}) - J_r(\alpha_{rd} + \alpha_{ld}) - \tau_{br} - \tau_{bl}]/R_w M_v \tag{3}$$

wherein k is the spring rate of the vehicle drive axle, $\theta_e$ is the integral of the electric motor speed, $G_r$ is the combined gear ratio of the differential and the transmission, $\theta_{rd}$ and $\theta_{ld}$ are the integrals of the speed of the right and left driven wheels respectively, $J_r$ is the wheel inertia, $\beta$ is the damping rate between the motorshaft and the wheels, due to bearings, $\omega_e$ is the electric motor speed, $\omega_{rd}$ is the sped of the right driven wheel, $\omega_{ld}$ is the speed of the left driven wheel, $\alpha_{rd}$ and $\alpha_{ld}$ are the time derivatives of the right and left driven wheel speeds respectively, i.e. driven wheel acceleration rates, $\tau_{br}$ and $\tau_{bl}$ are the hydraulic brake torques applied to the right and left driven wheels respectively, $R_w$ is the radius of the wheel, and $M_v$ is the mass of the vehicle. Vehicle acceleration Dv is positive during acceleration and vehicle acceleration Dv is negative during deceleration.

Notably, this calculation accounts for the axle spring rate and damping rate in addition to the torque required to accelerate the driven wheel inertias. These values are especially significant when large transmission and differential gear ratios are present. Prior art regenerative or antiskid braking strategies have not accounted for these parameters when calculating vehicle acceleration. Moreover, acceleration calculated according to EQ. 3 is more robust to noisy measurements because it uses time integrations of the wheel speed.

Whenever hydraulic braking is not applied at the nondriven wheels, acceleration is simply calculated as the time derivative of the vehicle speed v as measured by the nondriven wheel speed sensor 117:

$$Dv = \frac{v(t) - v(t - T)}{T} \quad (4)$$

wherein v(t) is the vehicle speed at time t, T is the sampling rate, and v(t-T) is the vehicle speed at time t minus the sampling rate T, i.e. the previous vehicle speed.

Similarly, an accurate determination of the adhesion coefficient $\mu$ is critical to determining the current operating point of a driven wheel on the slip v. mu curve. Again, several methods of calculating $\mu$ are known in the art; however, the present application calculates $\mu$ for each driven wheel according to the following equation:

$$\mu_d = [k(2(\theta_e/G_r) - \theta_{rd} - \theta_{ld}) + \quad (5)$$

$$\beta(2(\omega_e/G_r) - \omega_{rd} - \omega_{ld}) - 2\tau_d - 2J_r a_d]/2R_w N_y$$

wherein k is the spring rate of the vehicle drive axle, $\beta$ is the damping rate between the motor shaft and wheel, $\theta_e$ is the integral of the electric motor speed, $G_r$ is the combined gear ratio of the differential and the transmission, $\theta_{rd}$ and $\theta_{ld}$ are the integrals of the right and left driven wheel speeds respectively, $\omega_{rd}$ and $\omega_{ld}$ are the right and left driven wheel speeds, $\omega_e$ is the motor speed, $J_r$ is the wheel inertia, $a_d$ is the time derivative of the speed of the driven wheel being monitored, i.e. driven wheel acceleration rate, $\tau_d$ is the hydraulic brake torque applied to the monitored driven wheel, $R_w$ is the radius of the wheel, and $N_y$ is the normal force on the respective wheel.

The normal force, $N_y$, changes as a function of the weight shift of the vehicle during braking and acceleration. For example, the normal force $N_y$ on the respective front wheel is calculated according to the following relationship:

$$N_{yf} = \frac{((W*C)/L) - ((\omega*Dv*h)/(g*L))}{2} \quad (6)$$

wherein W is the vehicle weight, C is the distance from the vehicle center of gravity to the center of the rear axle, L is the wheel base, Dv is the vehicle acceleration, h is the height of the center of gravity from the road surface, and g is the acceleration of gravity at the earth's surface. During vehicle acceleration Dv is positive and during braking Dv is negative. An advantage of EQS. 5 and 6 is the inclusion of individual wheel acceleration, cross-differential torque transfer, and axle windup in determining road surface adhesion coefficients for the right and left driven wheels. These values are especially significant under certain driving conditions such as cornering and slippery road surfaces.

Referring now to FIG. 5, a method for generating command signals to provide traction control when the vehicle is in the state D requiring traction control in accordance with the present invention is shown. First, the processing means 130 calculates certain vehicle parameters that cannot be measured directly by the sensing means 502. The calculated vehicle parameters include wheel slip of each driven wheel $\lambda_d$ (EQ. 1); adhesion coefficients of each driven wheel $\mu_d$ (EQ. 5); wheel acceleration of each driven wheel $a_d$; vehicle acceleration Dv (EQ. 4); vehicle speed; the difference between present adhesion coefficient $\mu_d$ and previous adhesion coefficient $\mu_{do}$ for each driven wheel, $\Delta\mu_d$; the difference between present wheel slip $\lambda_d$ and previous wheel slip $\lambda_{do}$ for each driven wheel $\Delta\lambda_d$; the ratio of present adhesion coefficient $\mu_d$ to previous adhesion coefficient $\mu_{do}$ for each driven wheel S1d; the slope of the slip v. mu curve for each driven wheel S2d; the ratio of the present slope of the slip v. mu curve for each driven wheel to the previous slope of the slip vs. mu curve for each driven wheel S3d; and the difference between slip $\lambda_d$ and critical slip $\lambda^*_{do}$ for each driven wheel $\Delta\lambda^*_d$.

Thus, in the preferred embodiment, the remaining vehicle parameters are calculated according to the following equations:

$$\Delta\mu_d = \mu_d - \mu_{do}$$

$$\Delta\lambda_d = \lambda_d - \lambda_{do}$$

$$S1_d = \mu_d/\mu_{do}$$

$$S2_d = \Delta\mu_d/\Delta\lambda_d$$

$$S3_d = S2_d/S2_{do}$$

$$\Delta\lambda^*_d = \lambda_d - \lambda^*_{do}$$

The processing means 130 then applies fuzzy logic to the calculated and sensed values to determine various manipulated quantities 504. The manipulated quantities may include a critical adhesion coefficient $\mu^*_r$ for the right driven wheel, a critical adhesion coefficient $\mu^*_l$ for the left driven wheel, a critical wheel slip $\lambda^*_r$ for the right driven wheel, a critical wheel slip $\lambda^*_l$ for the left driven wheel. It should be noted that in a four wheel drive vehicle, critical adhesion coefficients and critical wheel slips would be derived for all driven wheels.

A brief summary of the operation of fuzzy logic is presented below. Fuzzy logic is a branch of logic that uses degrees of membership, rather than strict true/false or binary membership, to define a set. As a result, fuzzy sets have nondefinite boundaries. The degree of membership represents the level of confidence that a particular value belongs in a given fuzzy set. The degree of membership is expressed as a number between 0 and 1 called an association or membership value. The formula used to determine the membership value of a particular input is called a membership function. The membership functions assign membership values expressed as linguistic variables, such as "small," "medium," or "large," to the control system inputs which are then evaluated according to a plurality of language control rules. The membership functions in the present invention are derived from mathematical models of vehicle dynamics, and are stored in function tables in the processing means 130.

Language control rules are ambiguous rules that employ an IF-THEN structure to generate a manipulated quantity. Generation of a manipulated quantity is now described with reference to FIG. 8 which shows the traction control membership function map to estimate critical wheel slip $\lambda^*_d$ for any driven wheel. Each of the four rows corresponds to one of the four language control rules, TCS1-TCS4, employed in this embodiment to estimate $\lambda^*_d$ for each driven wheel when the vehicle is operating in a state requiring traction control. The first six columns correspond to the IF-portion, or antecedent membership functions, of each language control rule. The seventh column corresponds to the THEN-portion, or consequent membership function of each language control rule. FIGS. 9(a)–(d) illustrate the antecedent and consequent membership functions associated with TCS1–TCS4 respectively. The language control rules, TCS1–TCS4, to be evaluated to determine $\lambda^*_d$ for each driven wheel are as follows:

TCS1: If $\Delta\lambda_d$ is positive large, and $\Delta\mu_d$ is positive large, and $\Delta\lambda^*_d$ is positive large, and $\lambda_d$ is positive medium, then $\lambda^*_d$ is positive medium.

TCS2: If $\Delta\lambda_d$ is positive large, and $\Delta\mu_d$ is negative large, and $S1_d$ is positive small or positive large, and $S3_d$ is negative large, and $\lambda_d$ is positive medium, then $\lambda^*_d$ is positive medium.

TCS3: If $\Delta\lambda_d$ is negative large, and $\Delta\mu_d$ is positive large, and $S1_d$ is positive small or positive large, and $S3_d$ is negative large, and $\lambda_d$ is positive medium, then $\lambda^*_d$ is positive medium.

TCS4: If $\Delta\lambda_d$ is negative large, and $\Delta\mu_d$ is negative large, and $\Delta\lambda^*_d$ is positive large, and $\lambda_d$ is positive medium, then $\lambda^*_d$ is positive medium.

Figure 7:
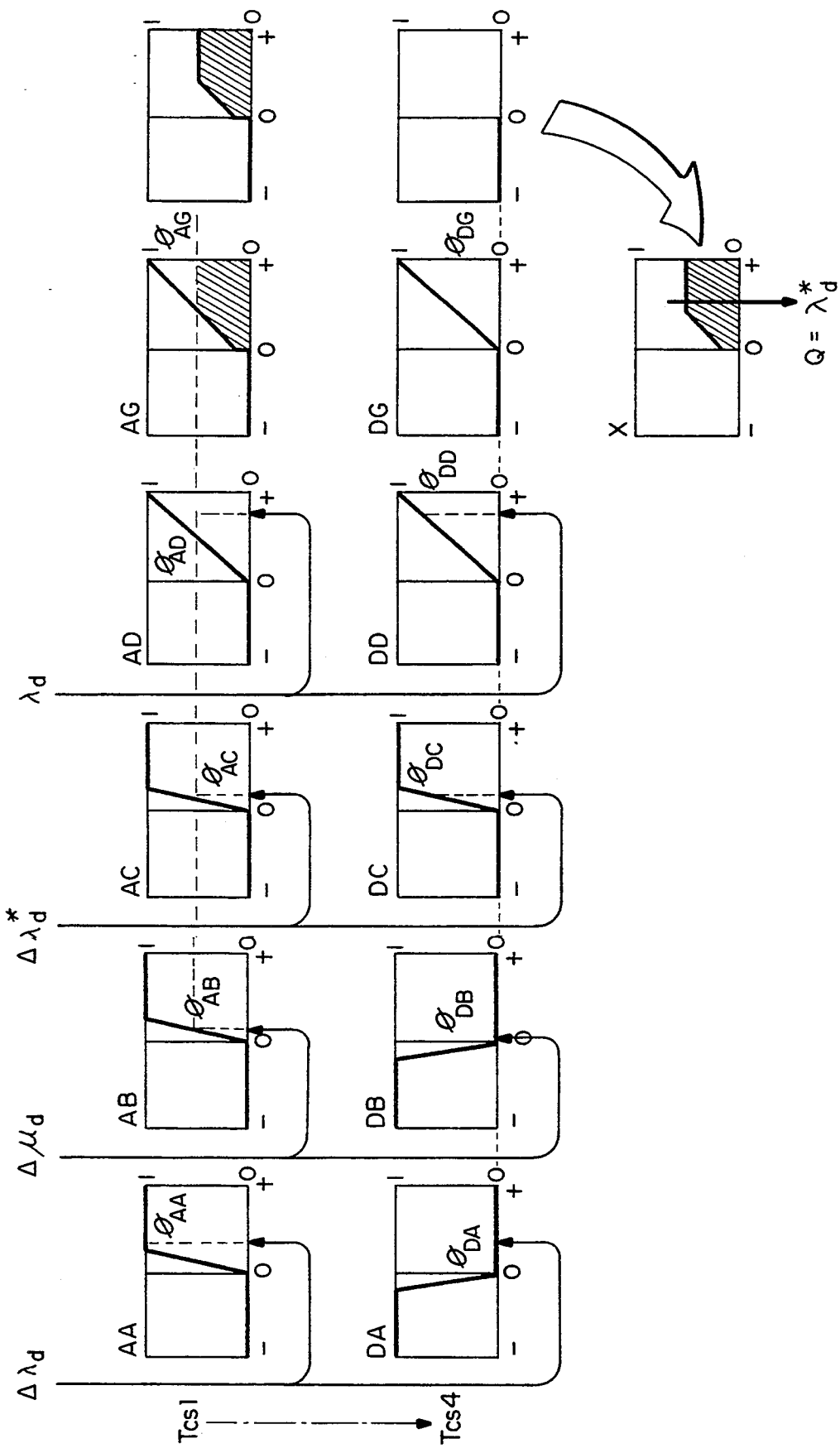
FIG. 7 graphically illustrates how language control rules are evaluated using fuzzy logic.
Figure 9A:
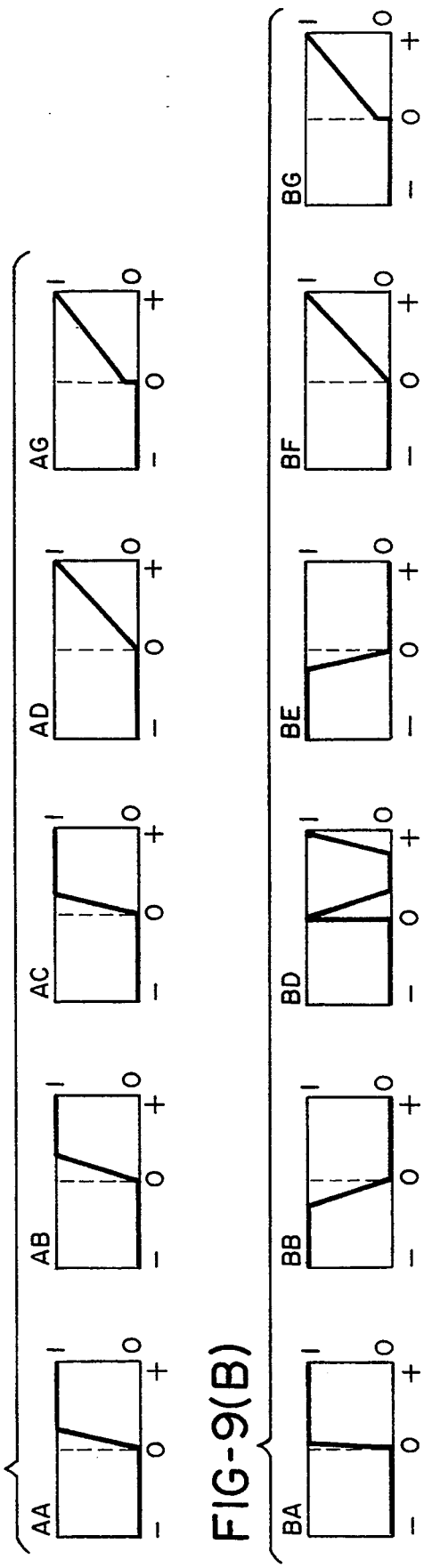
FIGS. 9(A) through 9(D) graphically illustrate the membership function maps of FIG. 8.
Figure 9B:
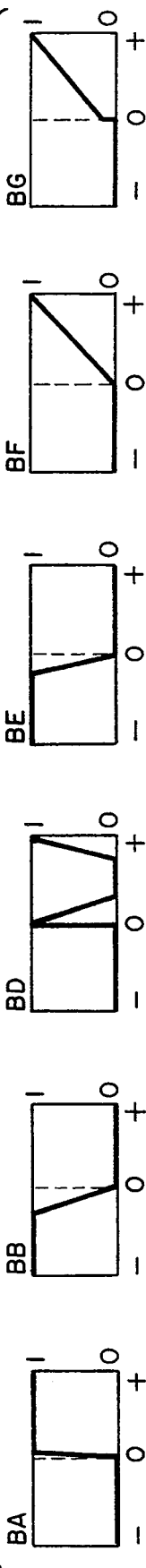
Figure 9C:
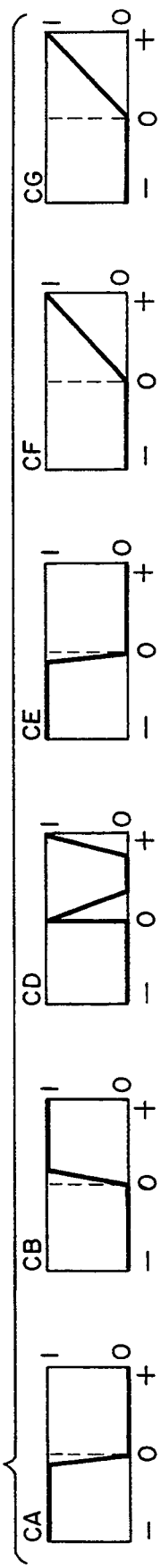
Figure 9D:
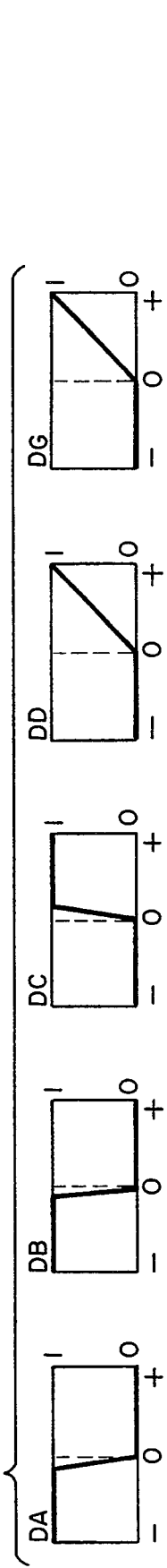
Figure 13E:
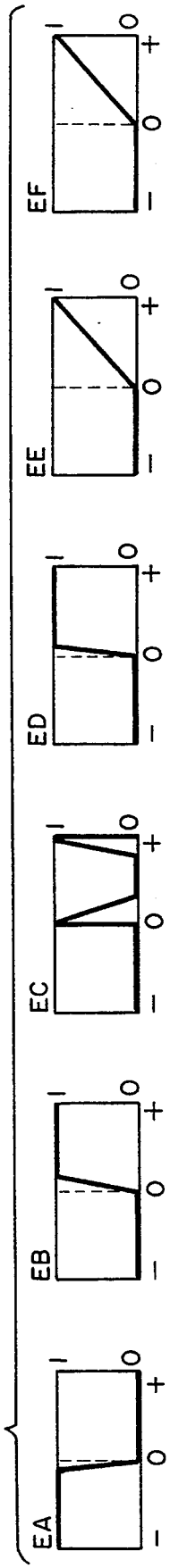
FIGS. 13(A) through 13(F) graphically illustrate the membership function maps of FIG. 12.
Figure 13F:
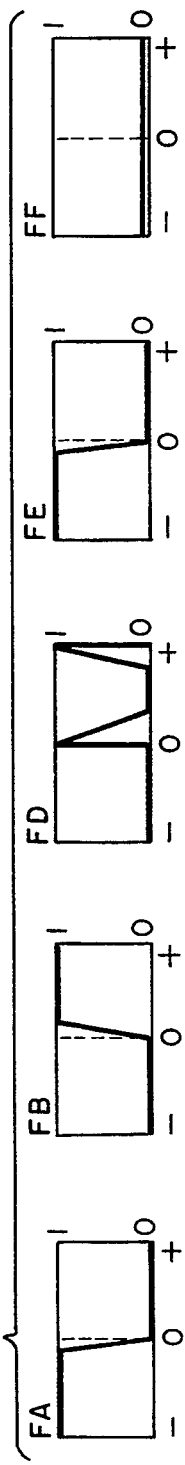
Figure 13G:
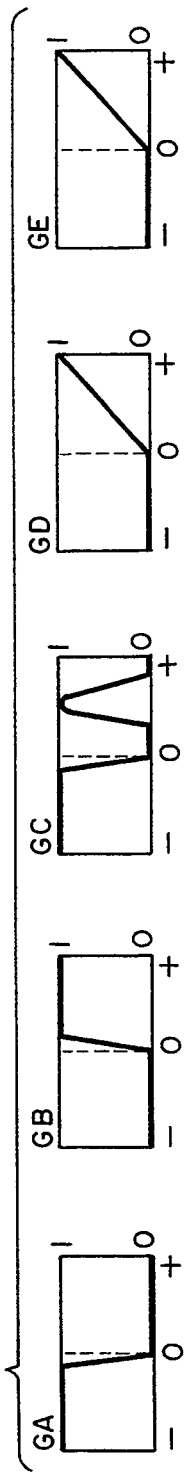
Figure 13H:
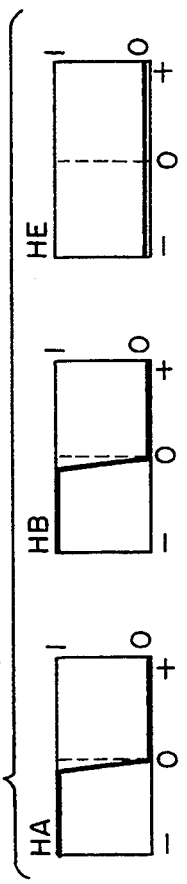
Figure 15A:
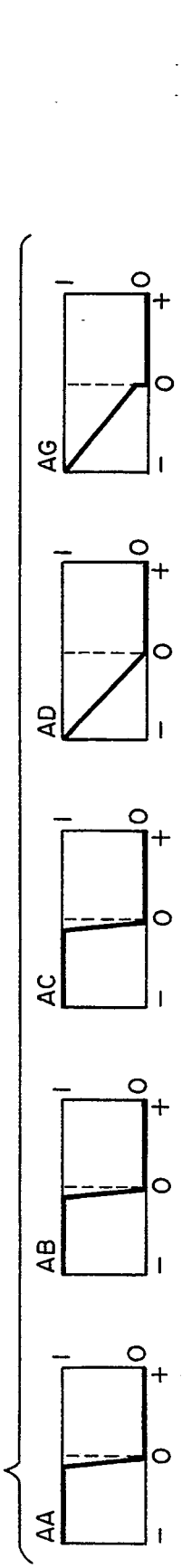
FIGS. 15(A) through 15(D) graphically illustrate the membership function maps of FIG. 14.
Figure 15B:
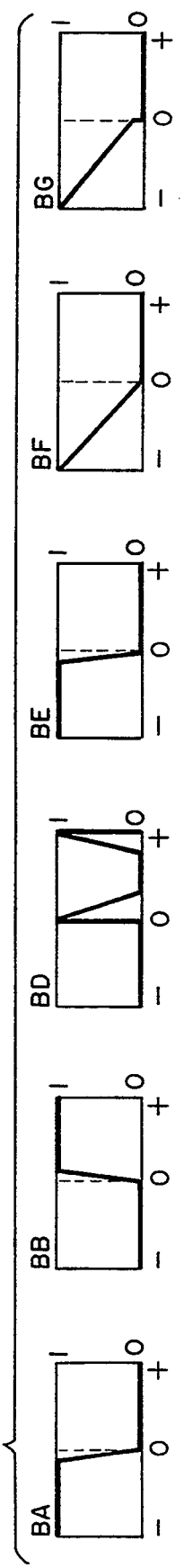
Figure 15C:
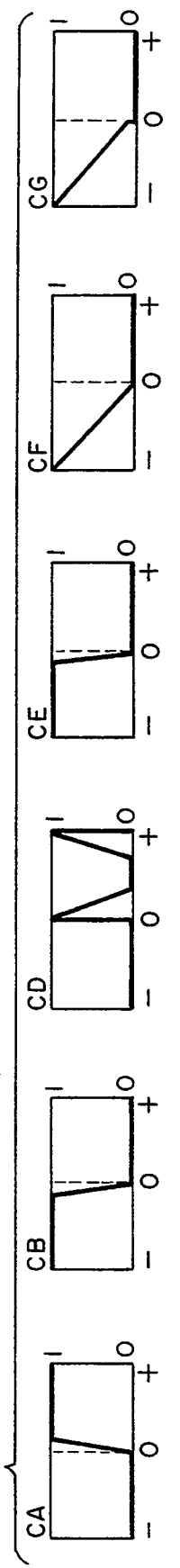
Figure 15D:
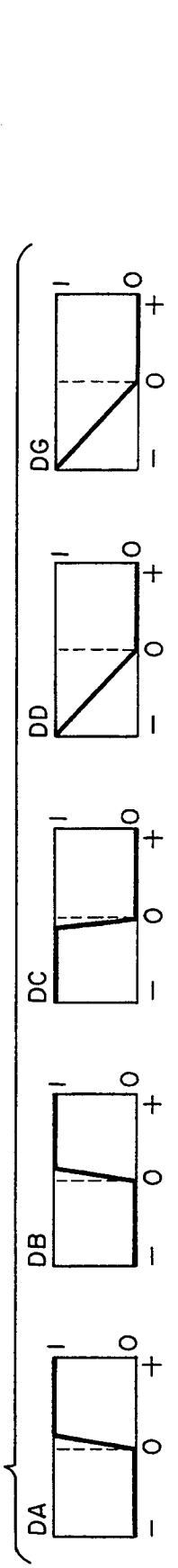

Following is a description of how the language control rules are evaluated. Reference is made to FIG. 7 which graphically illustrates the process using language control rules TCS1 and TCS4 as examples. First, the processing means 130 assigns membership values corresponding to the current values of the input parameters. Accordingly, membership values $\Phi_{AA}$, $\Phi_{AB}$, $\Phi_{AC}$, and $\Phi_{AD}$, corresponding to $\Delta\lambda_d$, $\Delta\mu_d$, $\Delta\lambda^*_d$, and $\lambda_d$ respectively are assigned for TCS1; and membership values $\Phi_{DA}$, $\Phi_{DB}$, $\Phi_{DC}$, and $\Phi_{DD}$, corresponding to $\Delta\lambda_d$, $\Delta\mu_d$, $\Delta\lambda^*_d$, and $\lambda_d$ respectively are assigned for TCS4. Next, the membership values for each rule are compared and a minimum value, which will be used to clip the consequent membership function, is selected. Accordingly, $\Phi_{AB}$ is used in this example to clip consequent membership function AG in TCS1, and $\Phi_{DA}$ or $\Phi_{DB}$, which are both zero, are used to clip consequent membership function DG in TCS4. The center of gravity of the resulting clipped consequent membership function represents the degree of certainty to which the particular language control rule holds true. A final manipulated quantity, Q, is generated by superimposing the resulting consequent membership functions of each language control rule involved in its determination and calculating the center of gravity. In this example, the resulting consequent membership functions for TCS1–TCS4 are superimposed on one graph, illustrated as graph X, to determine a center of gravity, Q, representing the value of critical slip for the given driven wheel $\lambda^*_d$.

The processing means 130 similarly determines the critical adhesion coefficient $\mu^*_d$ for each driven wheel using fuzzy logic. The membership function maps associated with the determination of the critical adhesion coefficient $\mu^*_d$ for each driven wheel when the vehicle is operating in a state requiring traction control are illustrated in FIG. 10. The processing means 130 evaluates the following language control rules for each driven wheel when the vehicle is in a state requiring traction control:

TEC1: If $\Delta\lambda_d$ is positive large, and $\Delta\mu_d$ is positive large, and $\Delta\lambda^*_d$ is positive large, and $\mu_d$ is positive medium, then $\mu^*_d$ is positive medium.

TEC2: If $\Delta\lambda_d$ is positive large, and $\Delta\mu_d$ is negative large, and $S1_d$ is positive small or positive large, and $S3_d$ is negative large, and $\mu_d$ is positive medium, then $\mu^*_d$ is positive medium.

TEC3: If $\Delta\lambda_d$ is negative large, and $\Delta\mu_d$ is positive large, and $S1_d$ is positive small or positive large, and $S3_d$ is negative large, and $\mu_d$ is positive medium, then $\mu^*_d$ is positive medium.

TEC4: If $\Delta\lambda_d$ is negative large, and $\Delta\mu_d$ is negative large, and $\Delta\lambda^*_d$ is positive large, and $\mu_d$ is positive medium, then $\mu^*_d$ is positive medium.

The antecedent and consequent membership functions associated with TEC1–TEC4 are shown in FIGS. 11(a)–(d) respectively. The final manipulated quantity generated represents the critical adhesion coefficient $\mu^*_d$ for each driven wheel.

After determining the critical adhesion coefficients and critical wheel slips for each driven wheel, the processing means 130 then determines a worst case slip condition 506. An example of such a determination is shown in FIG. 5 for a vehicle having right and left driven wheels. First, the processing means 130 determines whether the right driven wheel critical adhesion coefficient $\mu^*_r$ is equal to the left driven wheel critical adhesion coefficient $\mu^*_l$ 508. If the critical adhesion coefficients are equal, the vehicle is operating on a same-$\mu$ surface and the critical adhesion coefficient $\mu^*$ and critical wheel slip $\lambda^*$ are set equal to the right driven wheel critical adhesion coefficient $\mu^*_r$ and right driven wheel critical slip $\lambda^*_r$ respectively 510. However, if the critical adhesion coefficients are not equal, the vehicle is operating on a split-$\mu$ surface and the processing means 130 determines whether the $\mu^*_r$ is less than $\mu^*_l$ 512. If $\mu^*_r$ is less than $\mu^*_l$, then $\mu^*$ is set equal to $\mu^*_r$ and $\lambda^*$ is set equal to $\lambda^*_r$ 514. Conversely, if $\mu^*_r$ is not less than $\mu^*_l$, then $\mu^*$ is set equal to $\mu^*_l$ and $\lambda^*$ is set equal to $\lambda^*_l$ 516.

Continuing with FIG. 5, the processing means 130 then generates the appropriate command signals for the motor control means 104 using fuzzy logic based on the sensed and calculated information 518. A membership function map of language control rules which are evaluated to generate the reduction in motor torque control signal when the vehicle is in a state requiring traction control is shown in FIG. 12. The processing means 130 evaluates the following language control rules to generate the reduction in motor torque control signal:

TMR1: If $\Delta\lambda_d$ is positive large, and $\Delta\mu_d$ is positive large, then reduce motor torque zero.

TMR2: If $\Delta\lambda_d$ is positive large, and $\Delta\mu_d$ is negative large, and $S1_d$ is positive small or positive large, and $S3_d$ is negative large, then reduce motor torque zero.

TMR3: If $\Delta\lambda_d$ is positive large, and $\Delta\mu_d$ is negative large, and $S1_d$ is negative large or positive medium, and $\Delta\lambda^*_d$ is positive medium, then reduce motor torque positive medium.

TMR4: If $\Delta\lambda_d$ is positive large, and $\Delta\mu_d$ is negative large, and $S1_d$ is positive small or positive large, and $S3_d$ is positive large, and $\Delta\lambda^*_d$ is positive medium, then reduce motor torque positive medium.

TMR5: If $\Delta\lambda_d$ is negative large, and $\Delta\mu_d$ is positive large, and $S1_d$ is positive small or positive large, and $S3_d$ is positive large, and $\Delta\lambda^*_d$ is positive medium, then reduce motor torque positive medium.

TMR6: If $\Delta\lambda_d$ is negative large, and $\Delta\mu_d$ is positive large, and $S1_d$ is positive small or positive large, and $S3_d$ is negative large, then reduce motor torque zero.

TMR7: If $\Delta\lambda_d$ is negative large, and $\Delta\mu_d$ is positive large, and $S1_d$ is negative large or positive medium, and Δλ*$_d$ is positive medium, then reduce motor torque positive medium.

TMR8: If Δλ$_d$ is negative large, and Δμ$_d$ is negative large, and then reduce motor torque zero.

The antecedent and consequent membership functions associated with TMR1–TMR8 are shown in FIG. 13(a)–(g) respectively. The final manipulated quantity generated represents the reduction in motor torque command signal.

Referring now to FIG. 6, a method for generating command signals to provide for regenerative braking, front hydraulic braking and rear hydraulic braking when the vehicle is in the state A requiring regenerative braking in accordance with the present invention is shown. First, the processing means 130 calculates certain vehicle parameters that cannot be measured directly by the sensing means 602. These vehicle parameters are: right and left driven wheel skid EQ. 2, road surface adhesion for the right and left driven wheels EQ. 5, Δμ$_d$, Δλ$_d$, S1$_d$, S2$_d$, S3$_d$, Δλ*$_d$ wheel acceleration of each driven wheel α$_d$, vehicle acceleration EQS. 3 and 4, in addition the vehicle acceleration must be integrated in order to derive vehicle speed when the non-driven wheels are braked.

The processing means 130 then determines various manipulated quantities, such as critical adhesion coefficient μ* and critical wheel slip λ* using fuzzy logic. In FIG. 14 a membership function map for determining the critical wheel slip λ*$_d$ for each driven wheel when the vehicle is in state A requiring regenerative antiskid braking is illustrated. The language control rules evaluated by the processing means 130 in such a state are as follows:

RCS1: If Δλ$_d$ is negative large, and Δμ$_d$ is negative large, and Δλ*$_d$ is negative large, and λ$_d$ is negative medium, then λ*$_d$ is negative medium.

RCS2: If Δλ$_d$ is negative large, and Δμ$_d$ is positive large, and S1$_d$ is positive small or positive large, and S3$_d$ is negative large, and λ$_d$ is negative medium, then λ*$_d$ is negative medium.

RCS3: If Δλ$_d$ is positive large, and Δμ$_d$ is negative large, and S1$_d$ is positive small or positive large, and S3$_d$ is negative large, and λ$_d$ is negative medium, then λ*$_d$ is negative medium.

RCS4: If Δλ$_d$ is positive large, and Δμ$_d$ is positive large, and Δμ*$_d$ is negative large, and λ$_d$ is negative medium, then λ*$_d$ is negative medium.

FIGS. 15(a)–(d) illustrate the antecedent and consequent membership functions associated with RCS1–RCS4 respectively. The final manipulated quantity generated represents the critical wheel slip for a given driven wheel λ*$_d$.

Figure 16:
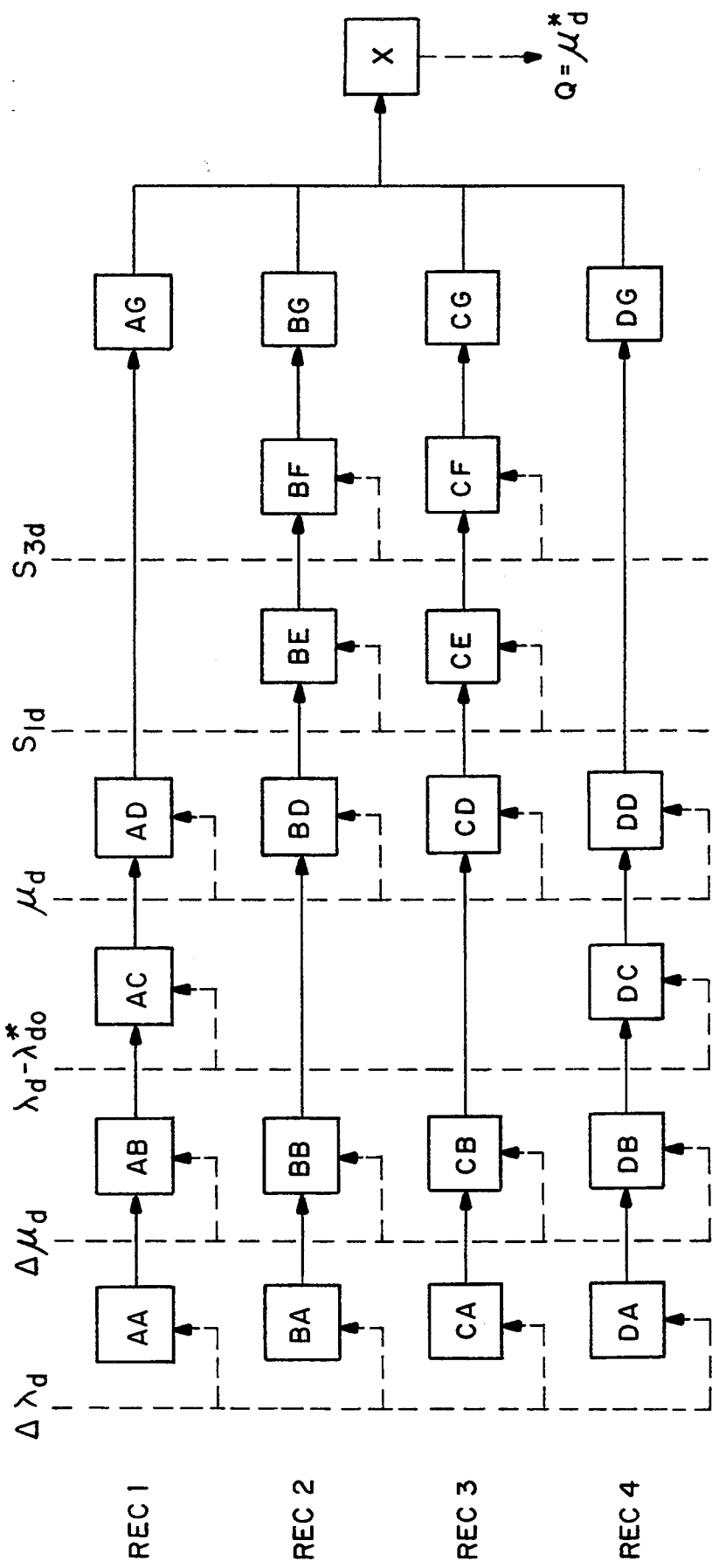
FIG. 16 graphically illustrates the language control rules used to determine critical adhesion coefficient $\mu^*_d$ from a plurality of membership function maps during antiskid braking.
Figure 17A:
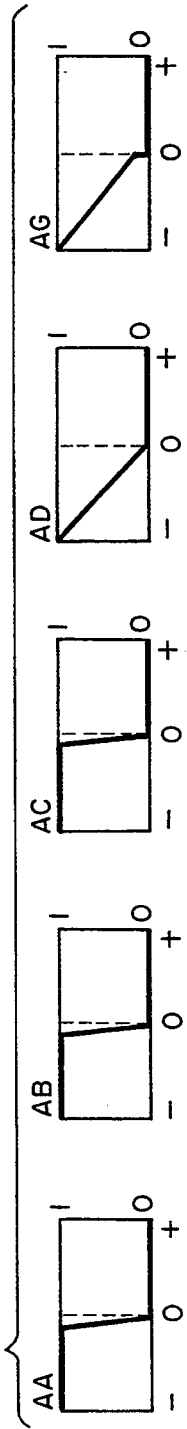
FIGS. 17(A) through 17(D) graphically illustrate the membership function maps of FIG. 16.
Figure 17B:
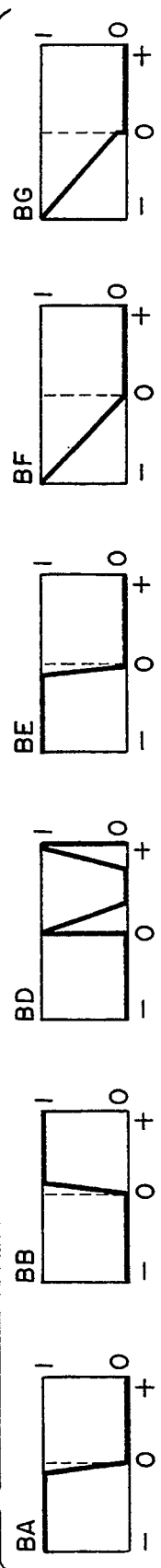
Figure 17C:
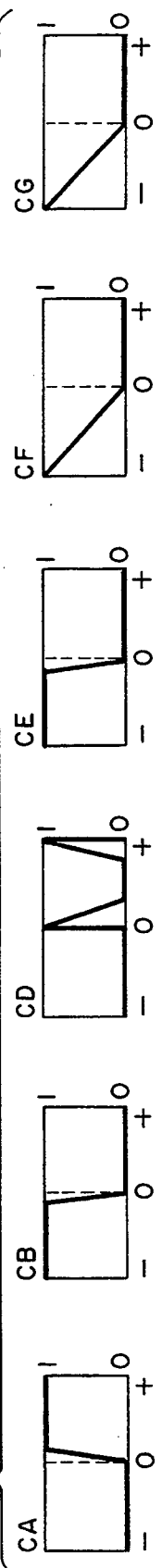
Figure 17D:
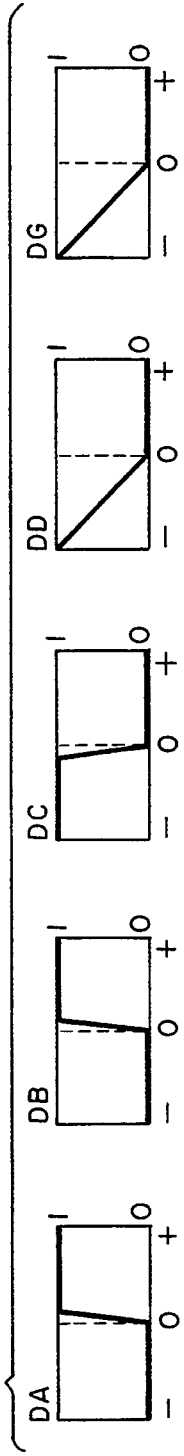

In addition, the processing means 130 evaluates the following language control rules, the membership maps therefor shown in FIG. 16, for each driven wheel to determine a critical adhesion coefficient λ*$_d$ for each driven wheel, when the vehicle is in state A requiring regenerative antiskid braking control:

REC1: If Δλ$_d$ is negative large, and Δμ$_d$ is negative large, and Δλ*$_d$ is negative large, and μ$_d$ is negative medium, then μ*$_d$ is negative medium.

REC2: If Δλ$_d$ is negative large, and Δμ$_d$ is positive large, and S1$_d$ is positive small or positive large, and S3$_d$ is negative large, and μ$_d$ is negative medium, then μ*$_d$ is negative medium.

REC3: If Δλ$_d$ is positive large, and Δμ$_d$ is negative large, and S1$_d$ is positive small or positive large, and S3$_d$ is negative large, and μ$_d$ is negative medium, then μ*$_d$ is negative medium.

REC4: If Δλ$_d$ is positive large, and Δμ$_d$ is positive large, and Δλ*$_d$ is negative large, and μ$_d$ is negative medium, then μ*$_d$ is negative medium. The antecedent and consequent membership functions associated with REC1–REC4 are shown in FIGS. 17(a)–(d) respectively. The final manipulated quantity generated represents the critical adhesion coefficient for each driven wheel μ*$_d$.

After determining the respective critical adhesion coefficient and critical wheel slip for each driven wheel, the processing means 130 next determines the worse case slip condition 606. This procedure is identical to the procedure described above with respect to FIG. 5 and, consequently, will not be reiterated.

Once the worst case slip condition has been determined, additional vehicle parameters are calculated 608. These additional parameters include the maximum brake torque that can be applied to the front wheels just before the skid point with no braking torque applied to the rear wheels $\tau_{Fmax2}$ and the maximum brake torque that can be applied to the front wheels just before skid where brake torque is applied to all four wheels $\tau_{Fmax4}$ according to the following equations:

$$\tau_{Fmax2} = R_w * [(\mu * N_v C)/(L - \mu * h)] \quad (7)$$

$$\tau_{Fmax4} = R_w * [(\mu * N_v)/L] * (C + \mu * h) \quad (8)$$

wherein C is the distance between the center of gravity of the vehicle and the center of the rear axle, h is the height of the center of gravity, and L is the wheel base. The normal force in equations 7, 8 and 9 is the normal force of the entire vehicle at the center of gravity.

The maximum brake torque that can be applied to the rear wheels just before skid when brake torque is applied to all four wheels $\tau_{Rmax}$ is also calculated according to the following equation:

$$\tau_{Rmax} = R_w * [(\mu * N_v)/L] * (B - \mu * h) \quad (9)$$

wherein B is the distance between the center of gravity of the vehicle to the center of the front axle. Finally, various differences, S4–S11, used by the fuzzy logic to generate command signals in the appropriate proportion, are calculated according to the following equations:

$$S4 = \tau_d - \tau_{regavailable}$$

$$S5 = \tau_{Fmax2} - \tau_d$$

$$S6 = \tau_{regavailable} - \tau_{Fmax4}$$

$$S7 = \tau_d - \tau_{regavailable} - \tau_{Rmax}$$

$$S8 = \tau_{Fmax4} - \tau_{regdemand}$$

$$S9 = \tau_d - \tau_{regdemand}$$

$$S10 = \tau_d - \tau_{Fmax4} - \tau_{Rmax}$$

$$S11 = \tau_d - \tau_{Fmax4}$$

wherein $\tau_d$ is the torque demanded by the driver, $\tau_{regavailable}$ is the available regenerative brake torque, and $\tau_{regdemand}$ is the regenerative brake torque demanded.

The brake torque is proportional to the hydraulic fluid pressure.

Figure 18:
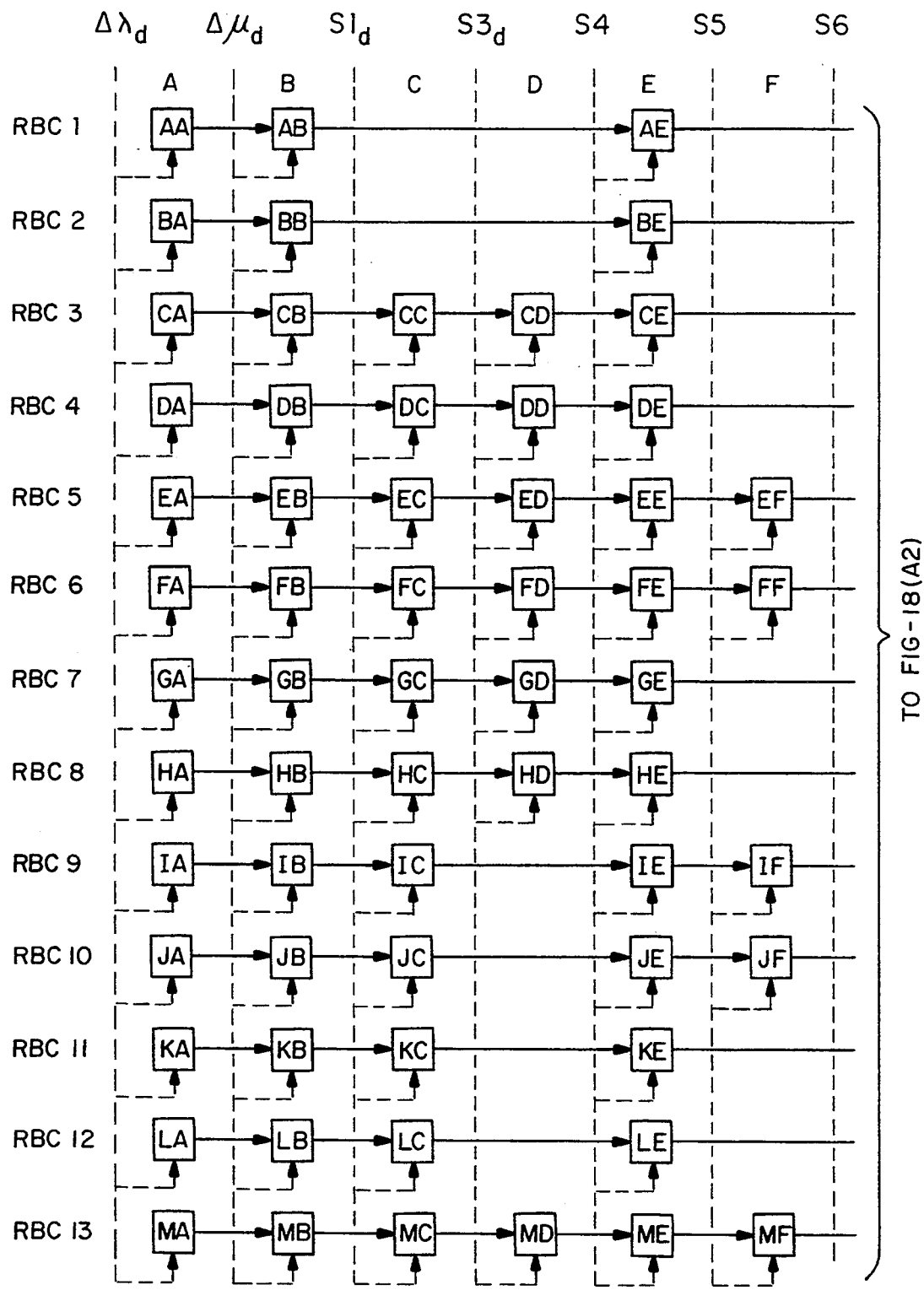
FIGS. 18(A1) through 18(B2) graphically illustrate the language control rules used to determine regenerative braking torque from a plurality of membership function maps.
Figure 18:
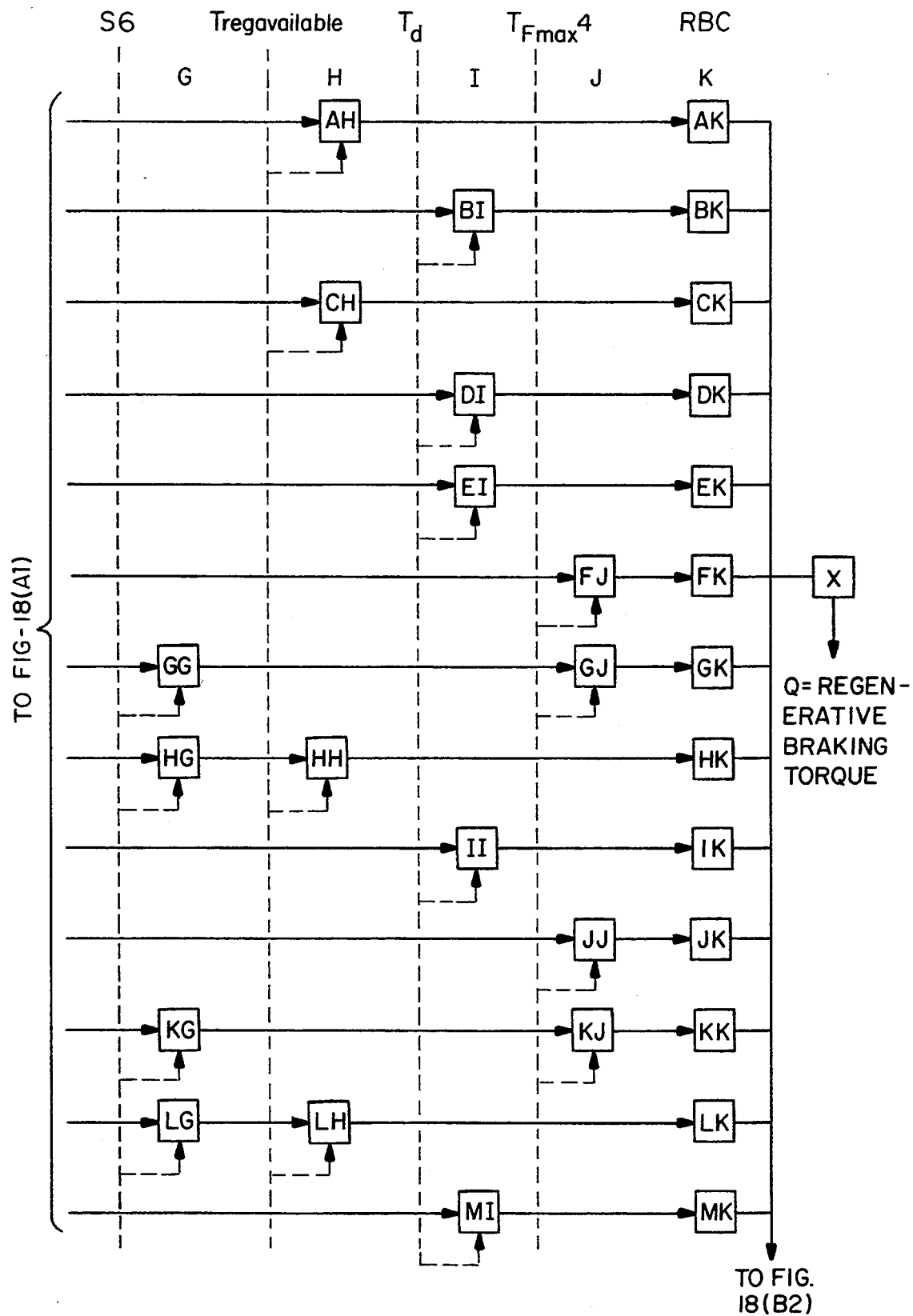
Figure 18:
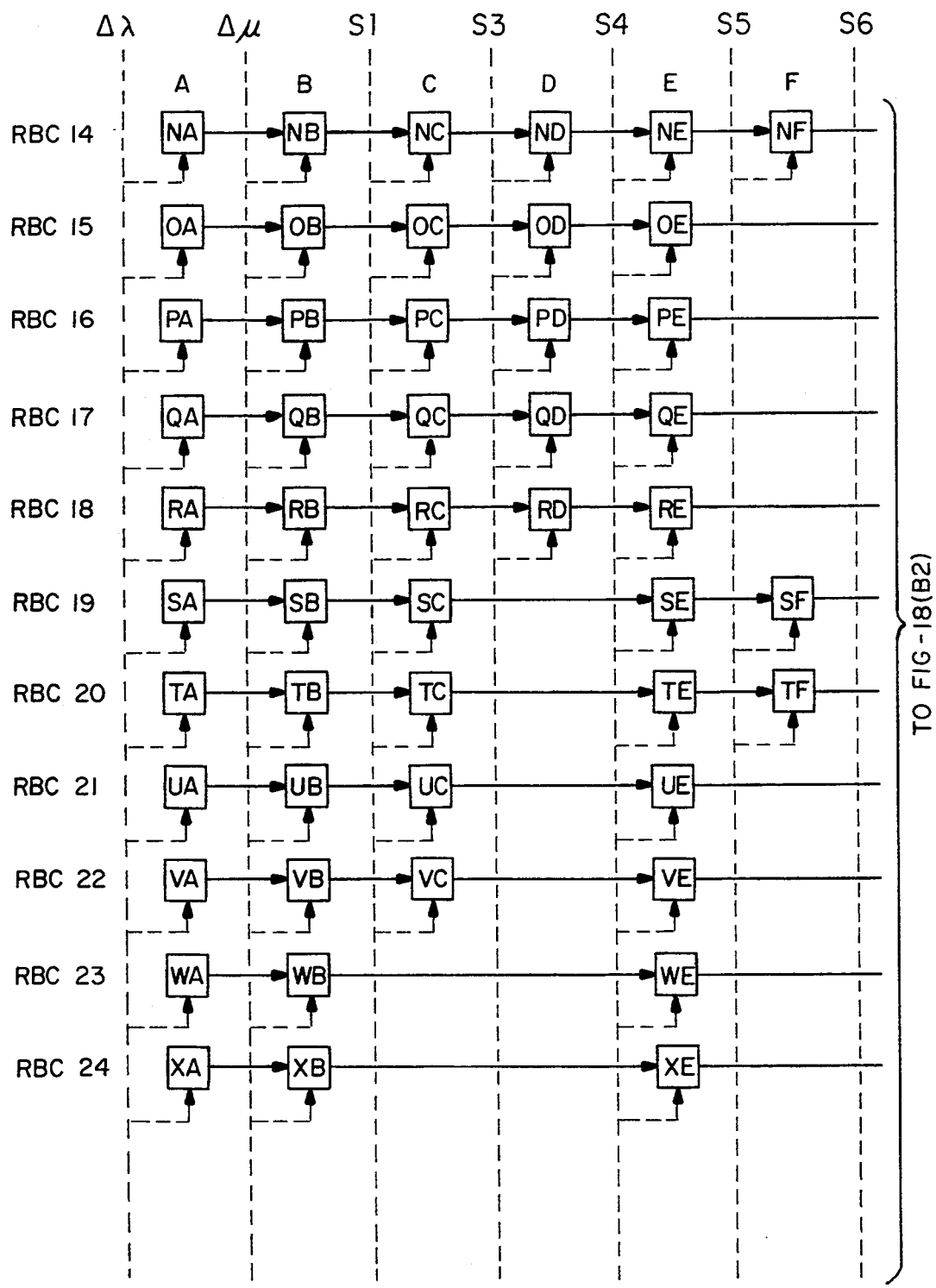
Figure 18:
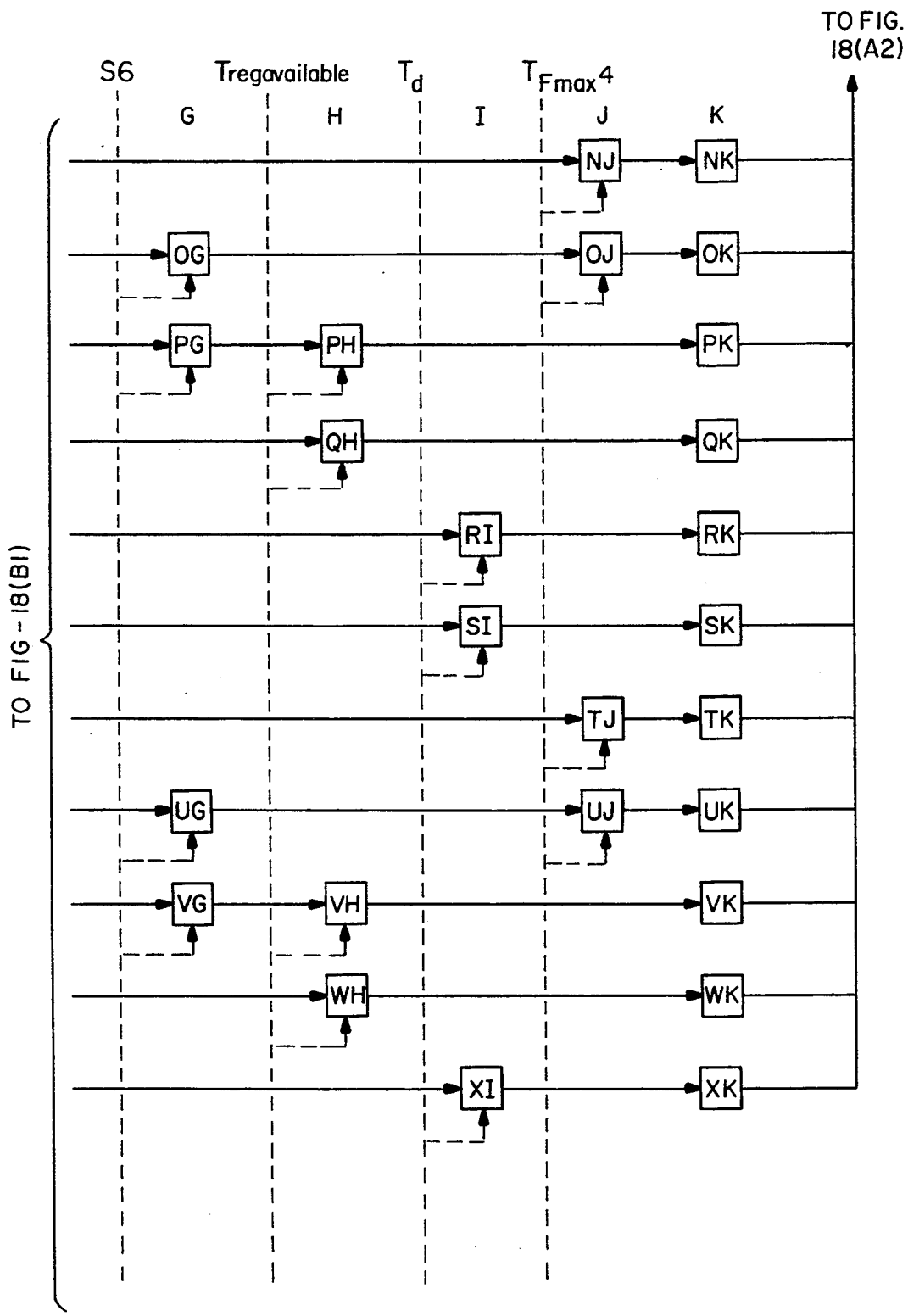

Fuzzy logic is applied to the sensed and calculated vehicle parameters by the processing means 130 to generate command signals for regenerative braking, front hydraulic braking and rear hydraulic braking 610. The membership function maps associated with the regenerative braking control signal, the front hydraulic braking control signal, and the rear hydraulic braking control signal are shown in FIGS. 18, 20, and 22 respectively. The language control rules evaluated to generate the regenerative braking torque demand signal are as follows:

RBC1: If $\Delta\lambda_d$ is negative large, and $\Delta\mu_d$ is negative large, and S4 is positive large, and $\tau_{regavailable}$ is negative medium, then the regenerative braking torque demand is negative medium.

RBC2: If $\Delta\lambda_d$ is negative large, and $\Delta\mu_d$ is negative large, and S4 is negative large, and $\tau_d$ is negative medium, then the regenerative braking torque demand is negative medium.

RBC3: If $\Delta\lambda_d$ is negative large, and $\Delta\mu_d$ is positive large, and $S1_d$ is positive small or positive large, and $S3_d$ is negative large, and S4 is positive large, and the $\tau_{regavailable}$ is negative medium, then the regenerative braking torque demand is negative medium.

RBC4: If $\Delta\lambda_d$ is negative large, and $\Delta\mu_d$ is positive large, and $S1_d$ is positive small or positive large, and $S3_d$ is negative large, and S4 is negative large, and $\tau_d$ is negative medium, then the regenerative braking torque demand is negative medium.

RBC5: If $\Delta\lambda_d$ is negative large, and $\Delta\mu_d$ is positive large, and $S1_d$ is positive small or positive large, and $S3_d$ is positive large, and S4 is negative large, and S5 is positive large, and $\tau_d$ is negative medium, then the regenerative brake torque demand applied to the driven wheels is negative medium.

RBC6: If $\Delta\lambda_d$ is negative large, and $\Delta\mu_d$ is positive large, and $S1_d$ is positive small or positive large, and $S3_d$ is positive large, and S4 is negative large, and S5 is negative large, and $\tau_{Fmax4}$ is negative medium, then the regenerative brake torque demand applied to the driven wheels is negative medium.

RBC7: If $\Delta\lambda_d$ is negative large, and $\Delta\mu_d$ is positive large, and $S1_d$ is positive small or positive large, and $S3_d$ is positive large, and S4 is positive large, and S6 is positive large, and $\tau_{Fmax4}$ is negative medium, then the regenerative brake torque demand applied to the driven wheels is negative medium.

RBC8: If $\Delta\lambda_d$ is negative large, and $\Delta\mu_d$ is positive large, and $S1_d$ is positive small or positive large, and $S3_d$ is positive large, and S4 is positive large, and S6 is negative large, and $\tau_{regavailable}$ is negative medium, then the regenerative brake torque demand is negative medium.

RBC9: If $\Delta\lambda_d$ is negative large, and $\Delta\mu_d$ is positive large, and $S1_d$ is negative large or positive medium, and S4 is negative large, and S5 is positive large, and $\tau_d$ is negative medium, then the regenerative brake torque demand is negative medium.

RBC10: If $\Delta\lambda_d$ is negative large, and $\Delta\mu_d$ is positive large, and $S1_d$ is negative large or positive medium, and S4 is negative large, and S5 is negative large, and $\tau_{Fmax4}$ is negative medium, then the regenerative brake torque demand is negative medium.

RBC11: If $\Delta\lambda_d$ is negative large, and $\Delta\mu_d$ is positive large, and $S1_d$ is negative large or positive medium, and S4 is positive large, and S6 is positive large, and $\tau_{Fmax4}$ is negative medium, then the regenerative brake torque demand is negative medium.

RBC12: If $\Delta\lambda_d$ is negative large, and $\Delta\mu_d$ is positive large, and $S1_d$ is negative large or positive medium, and S4 is positive large, and S6 is negative large, and $\tau_{regavailable}$ is negative medium, then the regenerative brake torque demand is negative medium.

RBC13: If $\Delta\lambda_d$ is positive large, and $\Delta\mu_d$ is negative large, and $S1_d$ is positive small or positive large, and S3 is positive large, and S4 is negative large, and S5 is positive large, and the $\tau_d$ is negative medium, then the regenerative brake torque demand is negative medium.

RBC14: If $\Delta\lambda_d$ is positive large, and $\Delta\mu_d$ is negative large, and $S1_d$ is positive small or positive large, and S3 is positive large, and S4 is negative large, and S5 is negative large, and $\tau_{Fmax4}$ is negative medium, then the regenerative brake torque demand is negative medium.

RBC15: If $\Delta\lambda_d$ is positive large and $\Delta\mu_d$ is negative large, and $S1_d$ is positive small or positive large, and S3 is positive large, and S4 is positive large, and S6 is positive large, and $\tau_{Fmax4}$ is negative medium, then the regenerative brake torque demand is negative medium.

RBC16: If $\Delta\lambda_d$ is positive large, and $\Delta\mu_d$ is negative large, and $S1_d$ is positive small or positive large, and $S3_d$ is positive large, and S4 is positive large, and S6 is negative large, and $\tau_{regavailable}$ is negative medium, then the regenerative brake torque demand applied to the driven wheels is negative medium.

RBC17: If $\Delta\lambda_d$ is positive large, and $\Delta\mu_d$ is negative large, and $S1_d$ is positive small or positive large, and $S3_d$ is negative large, and S4 is positive large, and $\tau_{regavailable}$ is negative medium, then the regenerative brake torque demand applied to the driven wheels is negative medium.

RBC18: If $\Delta\lambda_d$ is positive large, and $\Delta\mu_d$ is negative large, and $S1_d$ is positive small or positive large, and $S3_d$ is negative large, and S4 is negative large, and the $\tau_d$ is negative medium, then the regenerative brake torque demand applied to the driven wheels is negative medium.

RBC19: If $\Delta\lambda_d$ is positive large, and $\Delta\mu_d$ is negative large, and $S1_d$ is negative large or positive medium, and S4 is negative large, and S5 is positive large, and $\tau_d$ is negative medium, then the regenerative brake torque demand applied to the driven wheels is negative medium.

RBC20: If $\Delta\lambda_d$ is positive large, and $\Delta\mu_d$ is negative large, and $S1_d$ is negative large or positive medium, and S4 is negative large, and S5 is negative large, and $\tau_{Fmax4}$ is negative medium, then the regenerative brake torque demand applied to the driven wheels is negative medium.

RBC21: If $\Delta\lambda_d$ is positive large, and $\Delta\mu_d$ is negative large, and $S1_d$ is negative large or positive medium, and S4 is positive large, and S6 is positive large, and $\tau_{Fmax4}$ is negative medium, then the regenerative brake torque demand applied to the driven wheels is negative medium.

RBC22: If $\tau\lambda_d$ is positive large, and $\Delta\mu_d$ is negative large, and $S1_d$ is negative large or positive medium, and S4 is positive large, and S6 is negative large, and $\tau_{regavailable}$ is negative medium, then the regenerative brake torque demand applied to the driven wheels is negative medium.

RBC23: If $\Delta\lambda_d$ is positive large, and $\Delta\mu_d$ is positive large, and S4 is positive large, and $\tau_{regavailable}$ is negative medium, then the regenerative brake torque demand applied to the driven wheels is negative medium.

RBC24: If $\Delta\lambda_d$ is positive large, and $\Delta\mu_d$ is positive large, and S4 is negative large, and $\tau_d$ is negative medium, then the regenerative brake torque demand applied to the driven wheels is negative medium.

Figure 19A:
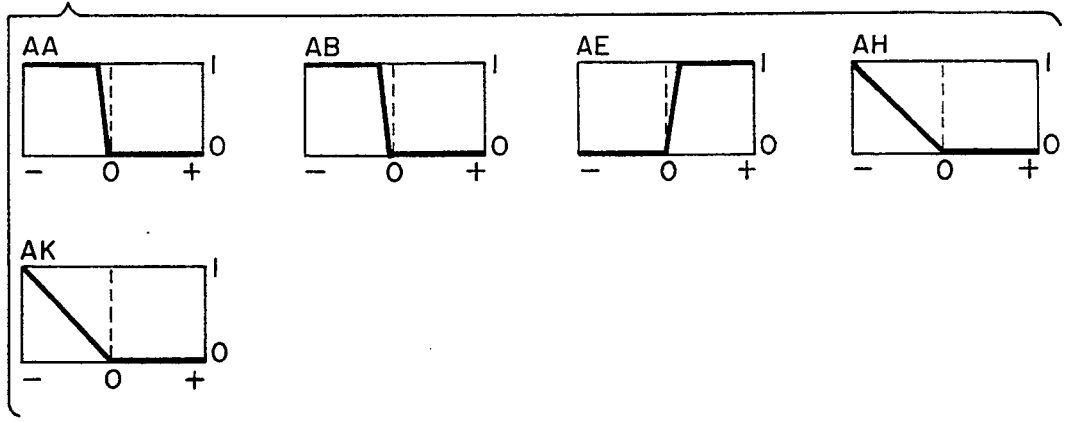
FIGS. 19(A) through 19(X) graphically illustrate the membership function maps of FIGS. 18(A1) through 18(B2)
Figure 19B:
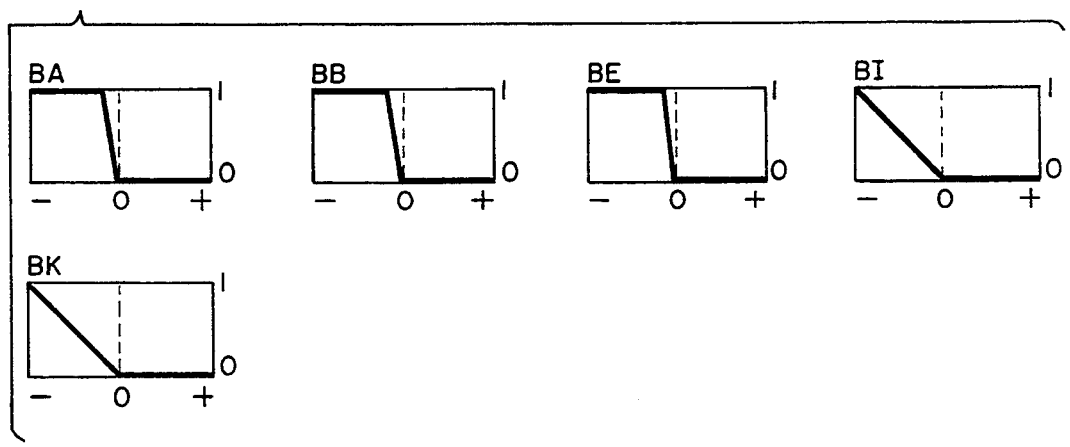
Figure 19C:
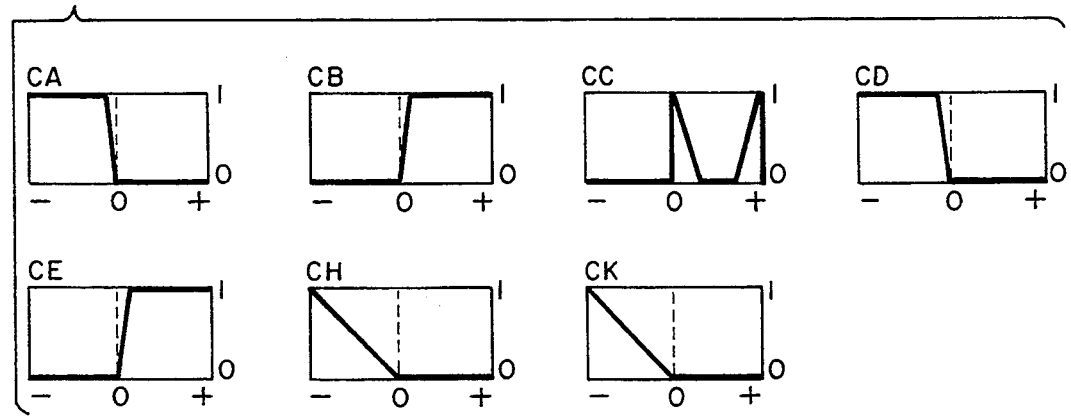
Figure 19D:
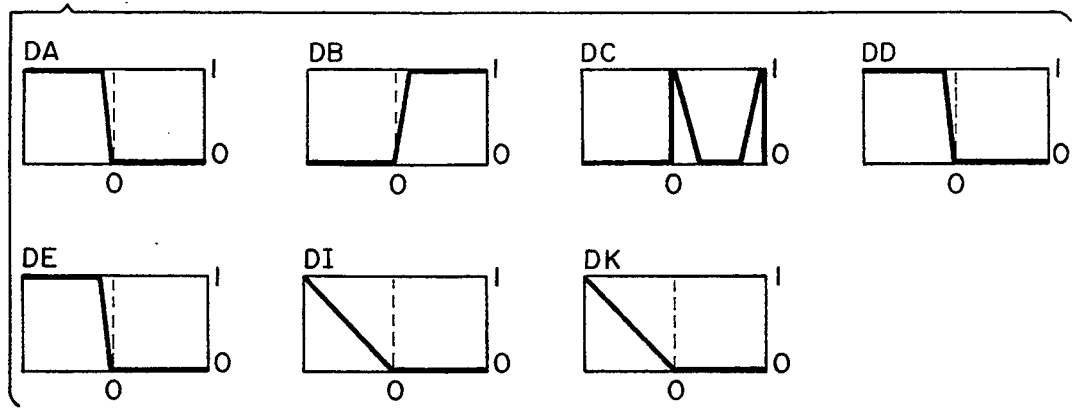
Figure 19E:
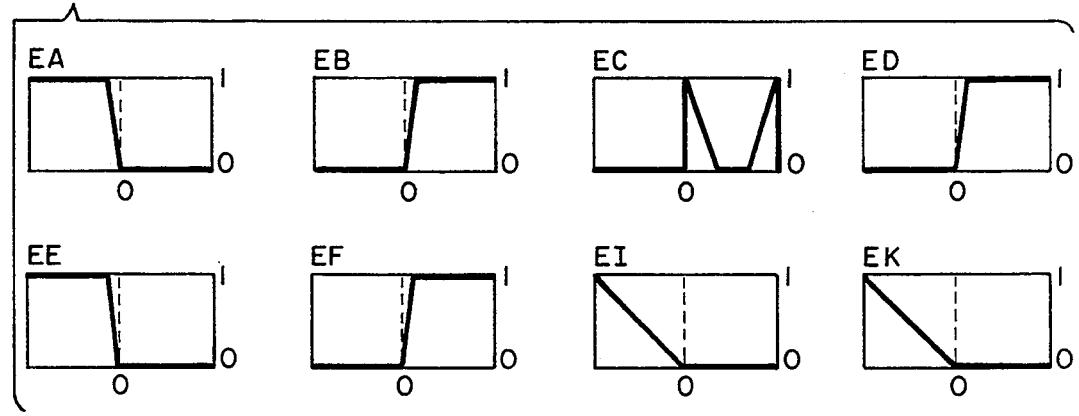
Figure 19F:
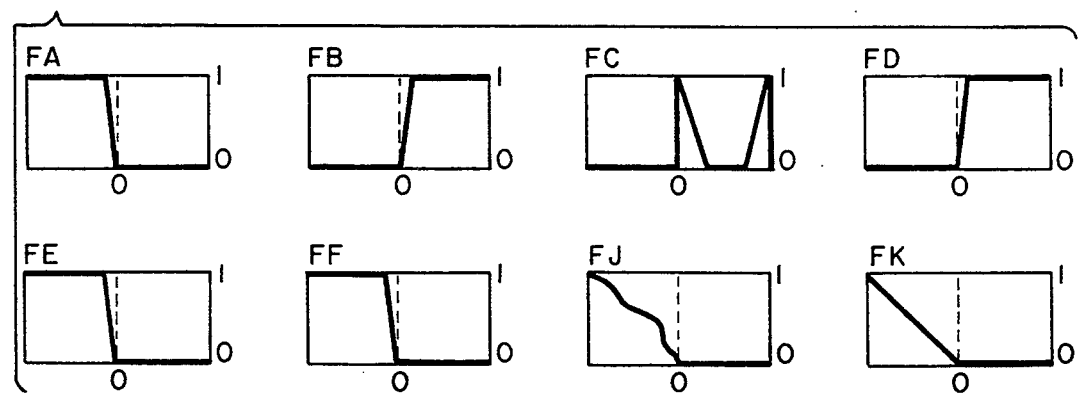
Figure 19G:
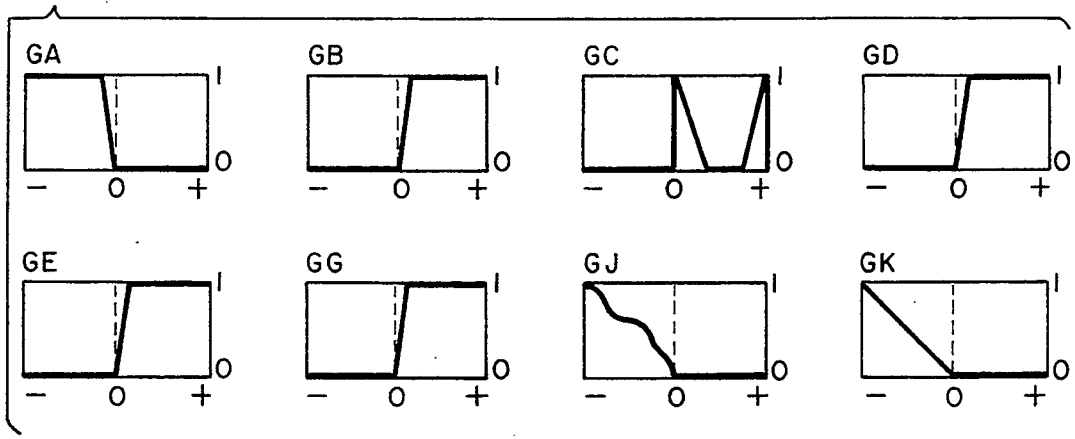
Figure 19H:
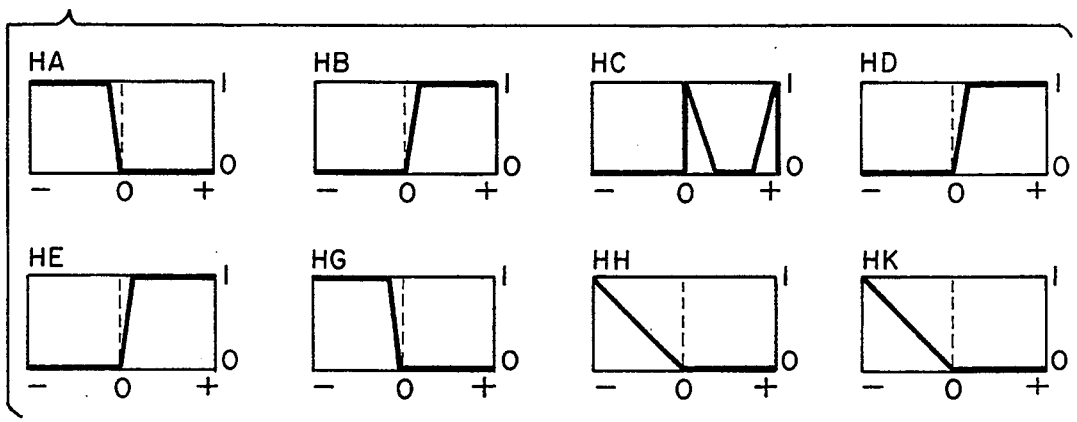
Figure 19I:
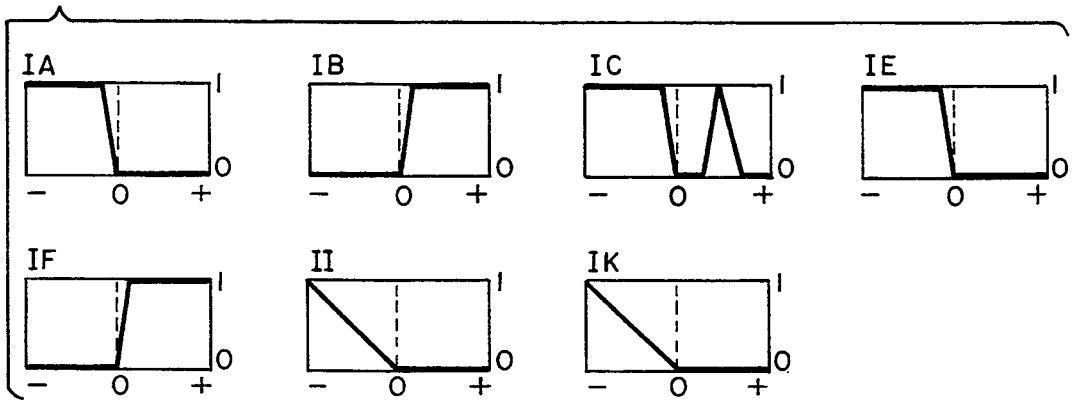
Figure 19J:
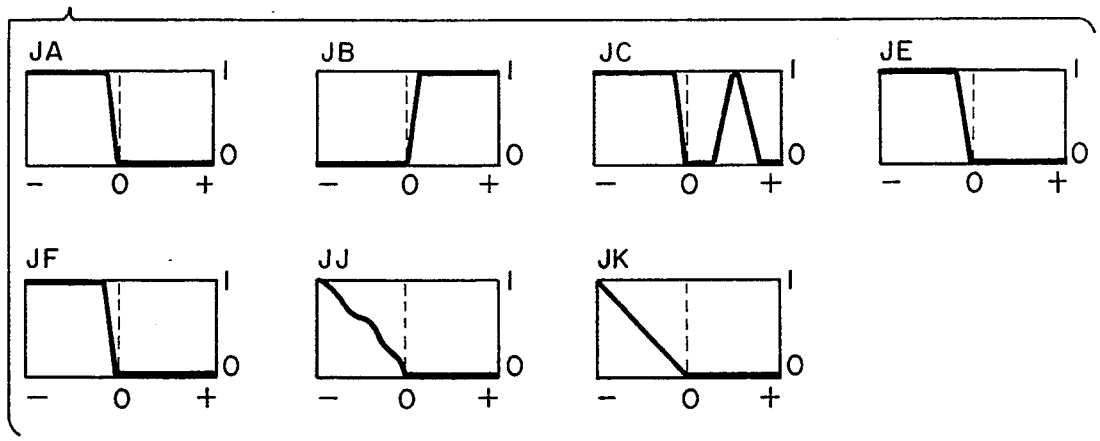
Figure 19K:
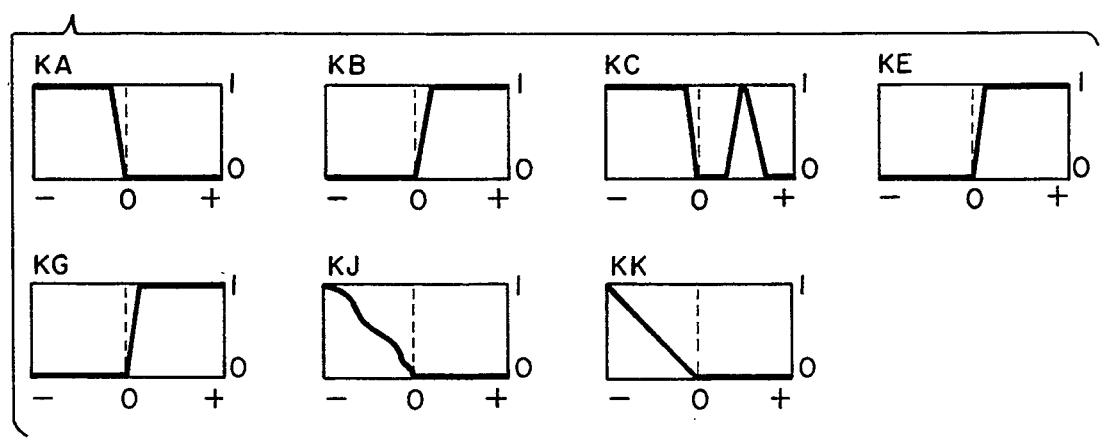
Figure 19L:
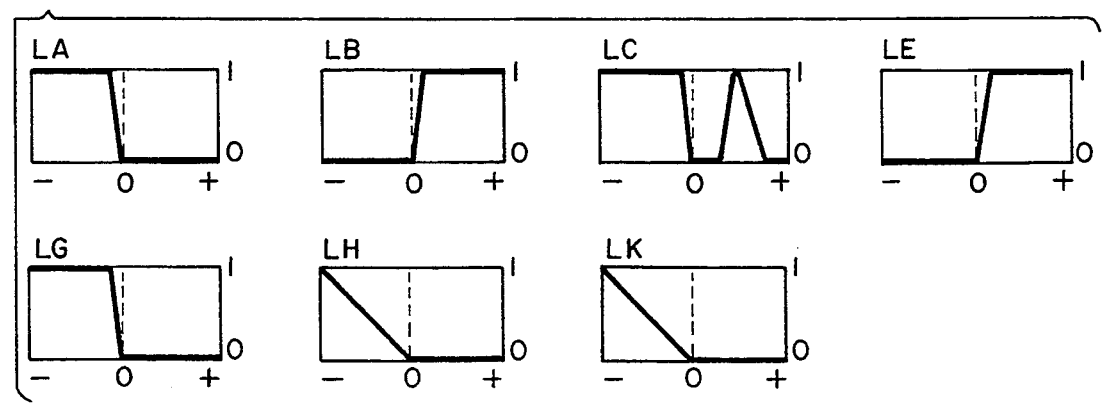
Figure 19M:
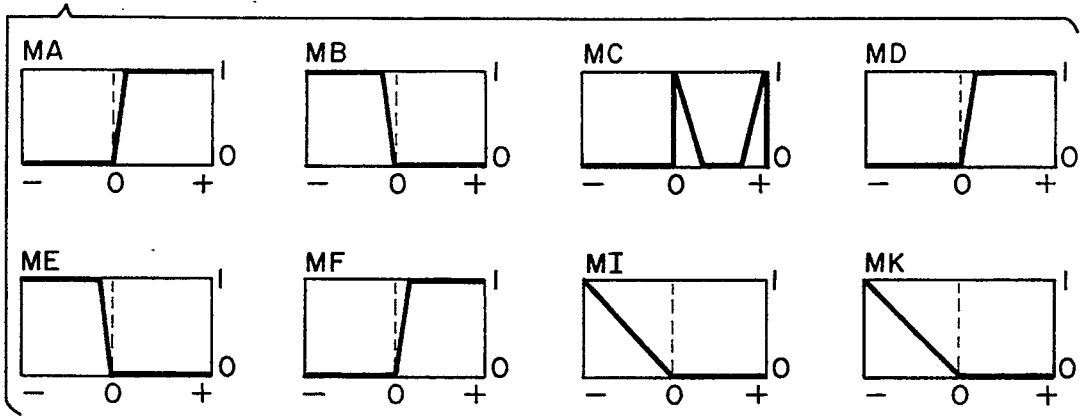
Figure 19N:
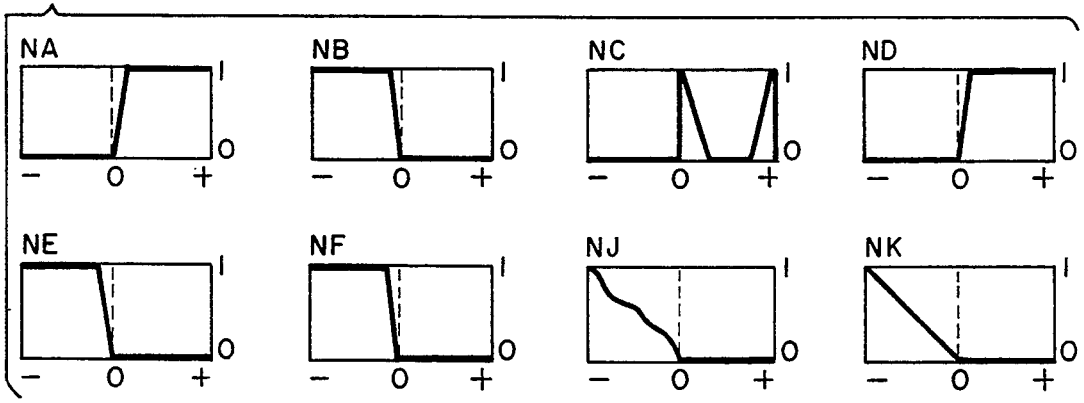
Figure 19O:
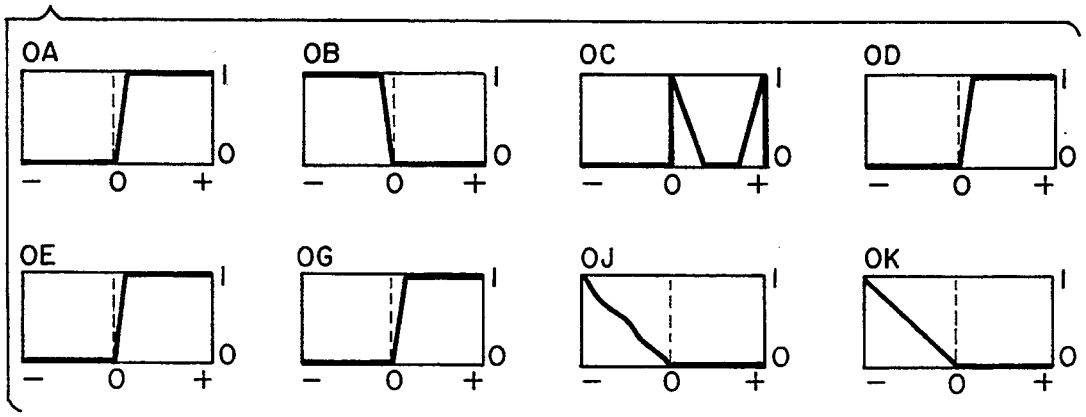
Figure 19P:
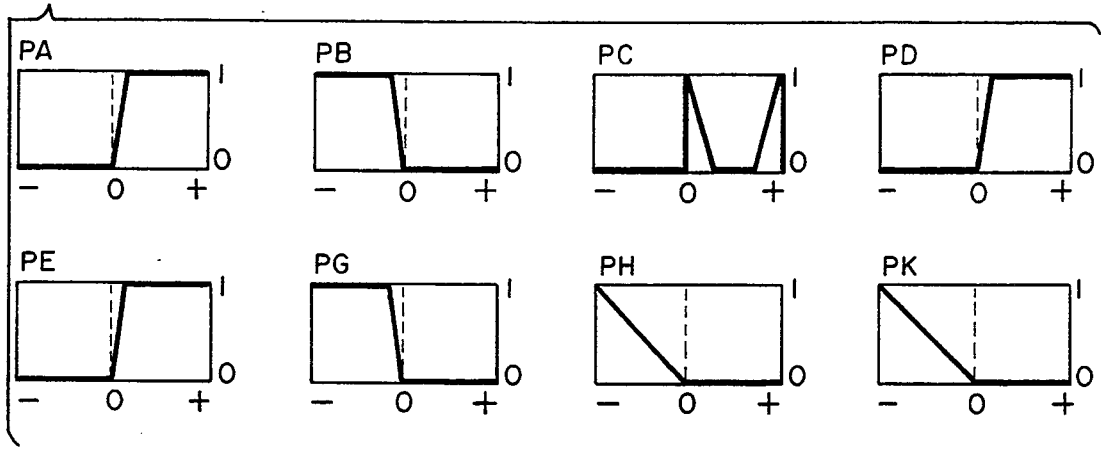
Figure 19Q:
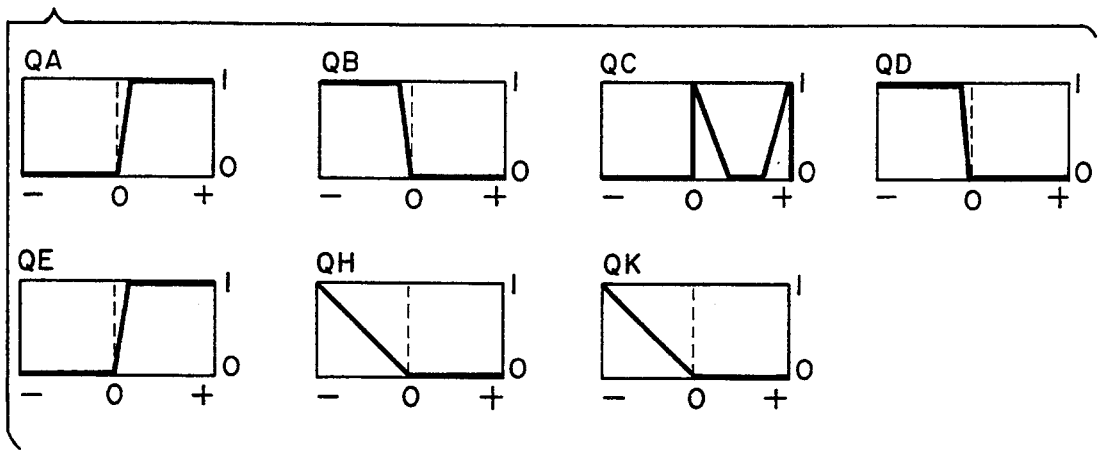
Figure 19R:
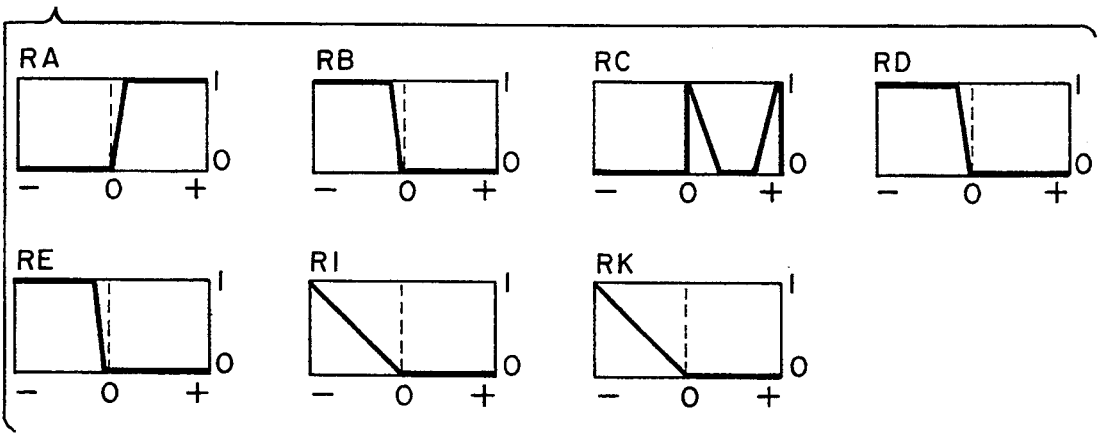
Figure 19S:
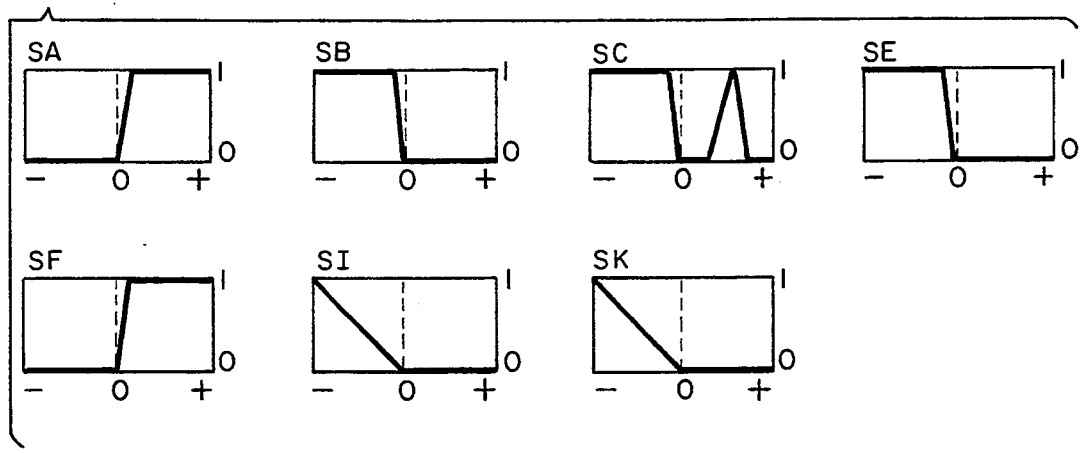
Figure 19T:
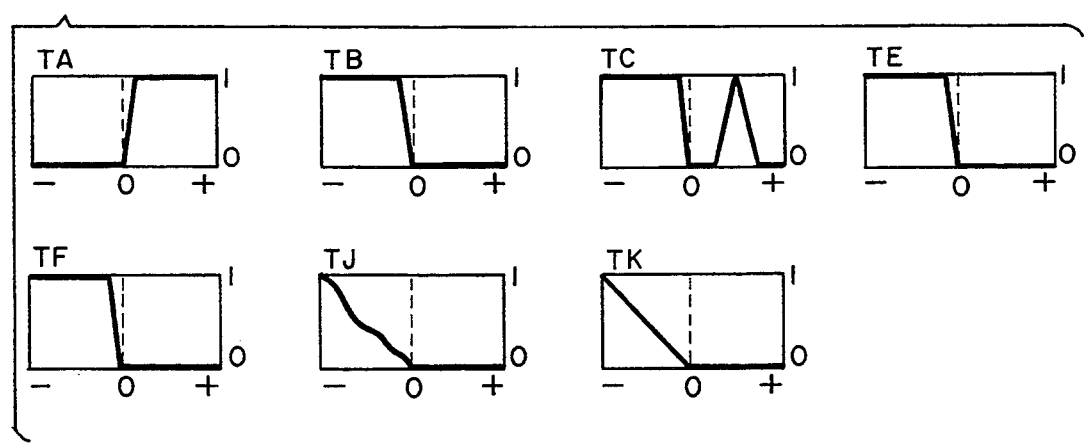
Figure 19U:
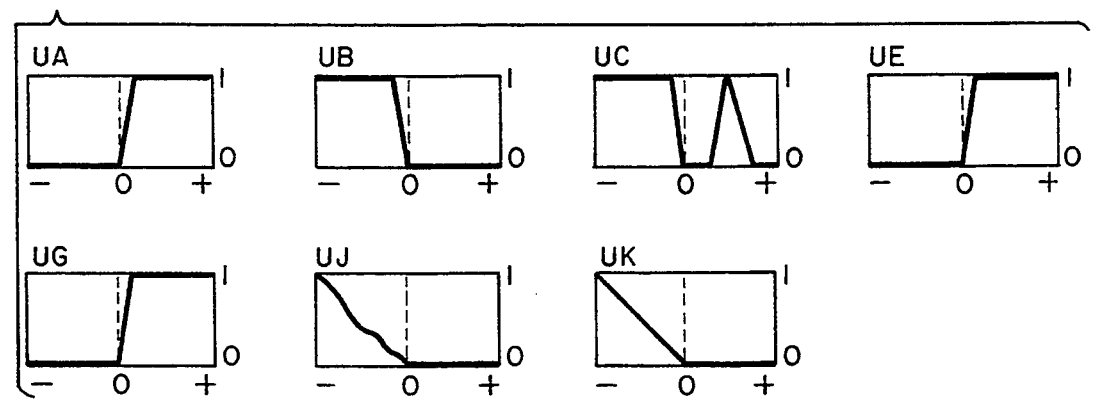
Figure 19V:
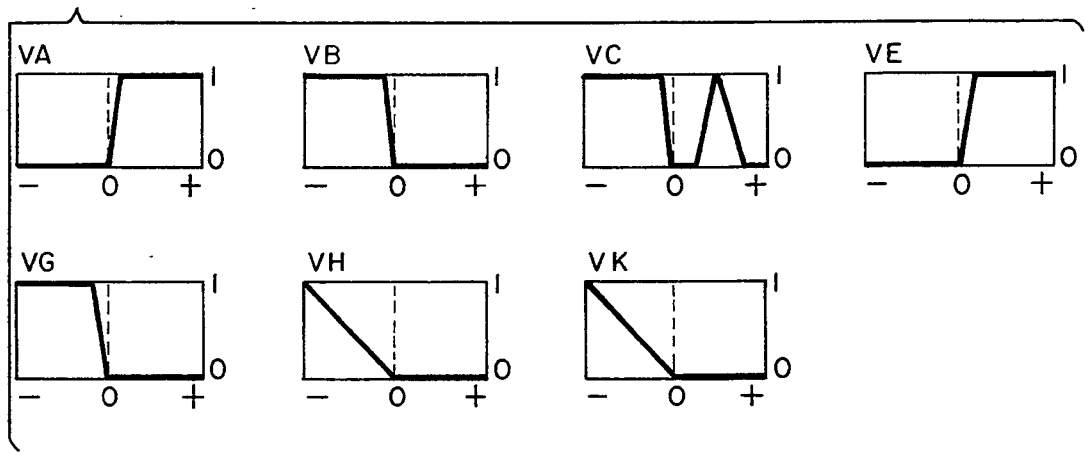
Figure 19W:
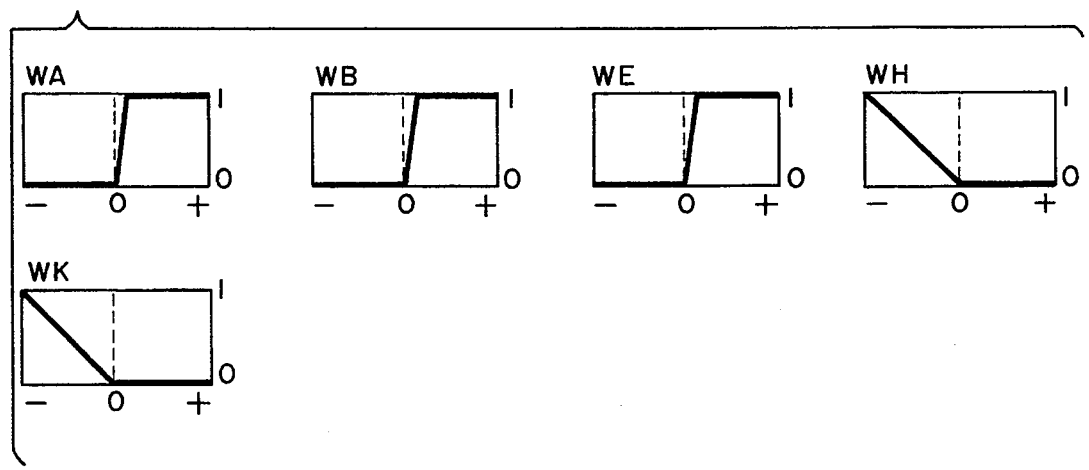
Figure 19X:
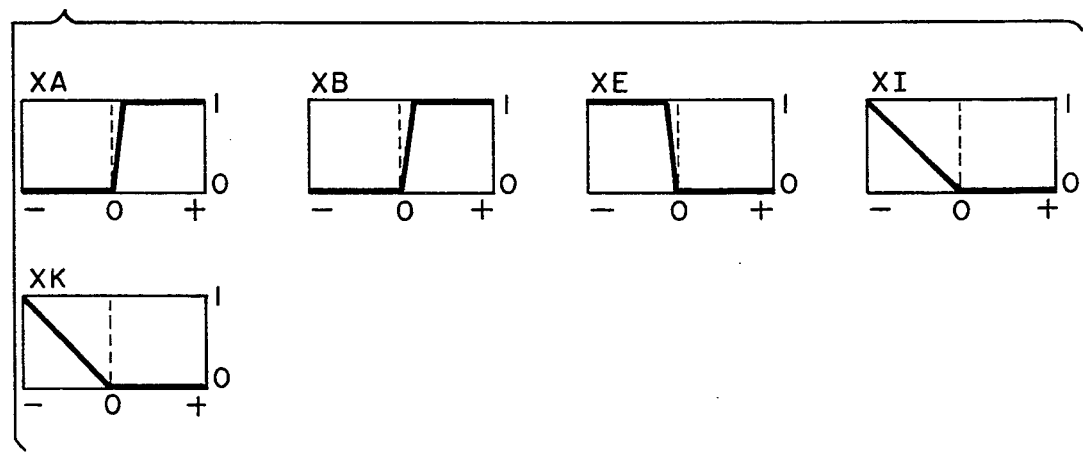

The antecedent and consequent membership functions associated with RBC1–RBC24 are shown in FIGS. 19(a)–(x) respectively. The final manipulated quantity generated represents the regenerative braking control signal.

The language control rules evaluated to generate the front hydraulic braking control signal are as follows:

RFH1: If $\Delta\lambda_d$ is negative large, and $\Delta\mu_d$ is negative large, and S4 is positive large, then the hydraulic brake torque demand applied to the driven wheels is zero.

RFH2: If $\Delta\lambda_d$ is negative large, and $\Delta\mu_d$ is negative large, and S4 is negative large, then the hydraulic brake torque demand to the driven wheels is zero.

RFH3: If $\Delta\lambda_d$ is negative large, and $\Delta\mu_d$ is positive large, and $S1_d$ is positive small or positive large, and $S3_d$ is negative large, and S4 is positive large, then the hydraulic brake torque demand applied to the driven wheels is zero.

RFH4: If $\Delta\lambda_d$ is negative large, and $\Delta\mu_d$ is positive large, and $S1_d$ is positive small or positive large, and $S3_d$ is negative large, and S4 is negative large, then the hydraulic brake torque demand applied to the driven wheels is zero.

RFH5: If $\Delta\lambda_d$ is negative large, and $\Delta\mu_d$ is positive large, and $S1_d$ is positive small or positive large, and $S3_d$ is positive large, and S4 is negative large, then the hydraulic brake torque demand applied to the driven wheels is zero.

RFH6: If $\Delta\lambda_d$ is negative large, and $\Delta\mu_d$ is positive large, and $S1_d$ is positive small or positive large, and $S3_d$ is positive large, and S4 is positive large, and S6 is positive large, then the hydraulic brake torque demand applied to the driven wheels is zero.

RFH7: If $\Delta\lambda_d$ is negative large, and $\Delta\mu_d$ is positive large, and $S1_d$ is positive small or positive large, and $S3_d$ is positive large, and S4 is positive large, and S6 is negative large, and S7 is positive large, and S8 is negative medium, then the hydraulic brake torque demand applied to the driven wheels is negative medium.

RFH8: If $\Delta\lambda_d$ is negative large, and $\Delta\mu_d$ is positive large, and $S1_d$ is positive small or positive large, and $S3_d$ is positive large, and S4 is positive large, and S6 is negative large, and S7 is negative large, then the hydraulic brake torque demand applied to the driven wheels is zero.

RFH9: If $\Delta\lambda_d$ is negative large, and $\Delta\mu_d$ is positive large, and $S1_d$ is negative large or positive medium, and S4 is negative large, then the hydraulic brake torque demand applied to the driven wheels is zero.

RFH10: If $\Delta\lambda_d$ is negative large, and $\Delta\mu_d$ is positive large, and $S1_d$ is negative large or positive medium, and S4 is positive large, and S8 is positive large, then the hydraulic brake torque demand applied to the driven wheels is zero.

RFH11: If $\Delta\lambda_d$ is negative large, and $\Delta\mu_d$ is positive large, and $S1_d$ is negative large or positive medium, and S4 is positive large, and S6 is negative large, and S7 is positive large, and S8 is negative medium, then the hydraulic brake torque demand applied to the driven wheels is negative medium.

RFH12: If $\Delta\lambda_d$ is negative large, and $\Delta\mu_d$ is positive large, and $S1_d$ is negative large or positive medium, and S4 is positive large, and S6 is negative large, and S7 is negative large, then the hydraulic brake torque demand applied to the driven wheels is zero.

RFH13: If $\Delta\lambda_d$ is positive large, and $\Delta\mu_d$ is negative large, and $S1_d$ is positive large or positive small, and $S3_d$ is positive large, and S4 is negative large, then the hydraulic brake torque demand applied to the driven wheels is zero.

RFH14: If $\Delta\lambda_d$ is positive large, and $\Delta\mu_d$ is negative large, and $S1_d$ is positive large or positive small, and $S3_d$ is positive large, and S4 is positive large, and S6 is positive large, then the hydraulic brake torque demand applied to the driven wheels is zero.

RFH15: If $\Delta\lambda_d$ is positive large, and $\Delta\mu_d$ is negative large, and $S1_d$ is positive large or positive small, and $S3_d$ is positive large, and S4 is positive large, and S6 is negative large, and S7 is negative large, then the hydraulic brake torque demand applied to the driven wheels is zero.

RFH16: If $\Delta\lambda_d$ is positive large, and $\Delta\mu_d$ is negative large, and $S1_d$ is positive small or positive large, and $S3_d$ is positive large, and S4 is positive large, and S6 is negative large, and S7 is positive large, and S8 is negative medium, then the hydraulic brake torque demand applied to the driven wheels is negative medium.

RFH17: If $\Delta\lambda_d$ is positive large, and $\Delta\mu_d$ is negative large, and $S1_d$ is positive small or positive large, and $S3_d$ is negative large, and S4 is negative large, then the hydraulic brake torque demand applied to the driven wheels is zero.

RFH18: If $\Delta\lambda_d$ if positive large, and $\Delta\mu_d$ is negative large, and $S1_d$ is positive small or positive large, and $S3_d$ is negative large, and S4 is positive large, then the hydraulic brake torque demand applied to the driven wheels is zero.

RFH19: If $\Delta\lambda_d$ is positive large, and $\Delta\mu_d$ is negative large, and $S1_d$ is negative large or positive medium, and S4 is negative large, then the hydraulic brake torque demand applied to the driven wheels is zero.

RFH20: If $\Delta\lambda_d$ is positive large, and $\Delta\mu_d$ is negative large, and $S1_d$ is negative large or positive medium, and S4 is positive large, and S6 is positive large, then the hydraulic brake torque demand applied to the driven wheels is zero.

RFH21: If $\Delta\lambda_d$ is positive large, and $\Delta\mu_d$ is negative large, and $S1_d$ is negative large or positive medium, and S4 is positive large, and S6 is negative large, and S7 is positive large and S8 is negative medium, then the hydraulic brake torque demand applied to the driven wheels is negative medium.

RFH22: If $\Delta\lambda_d$ is positive large, and $\Delta\mu_d$ is negative large, and $S1_d$ is negative large or positive medium, and S4 is positive large, and S6 is negative large, and S7 is negative large, then the hydraulic brake torque demand applied to the driven wheels is zero.

RFH23: If $\Delta\lambda_d$ is positive large, and $\Delta\mu_d$ is positive large, and S4 is positive large, then the hydraulic brake torque demand applied to the driven wheels is zero.

RFH24: If $\Delta\mu_d$ is positive large, and $\Delta\mu_d$ is positive large, and S4 is negative large, then the hydraulic brake torque demand applied to the driven wheels is zero.

Figure 21E:
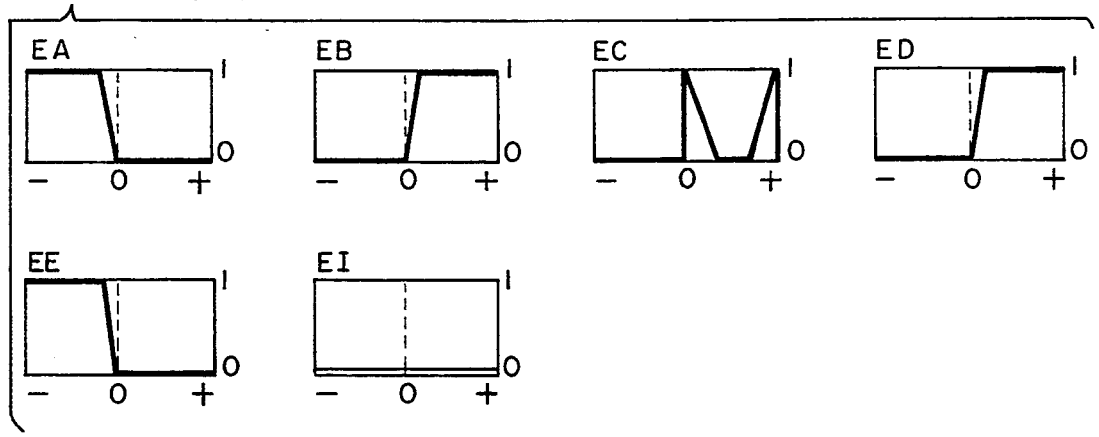
FIGS. 21(A) through 21(X) graphically illustrate the membership function maps of FIG. 20.
Figure 21F:
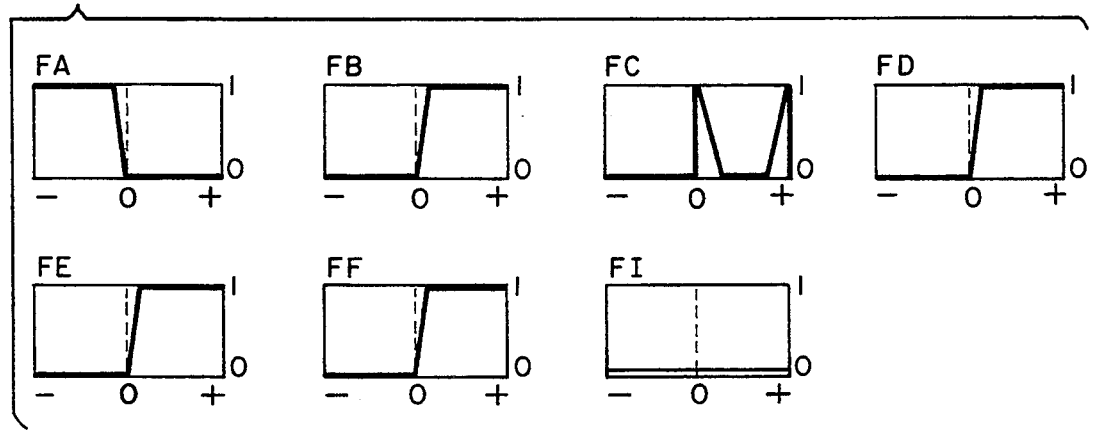
Figure 21G:
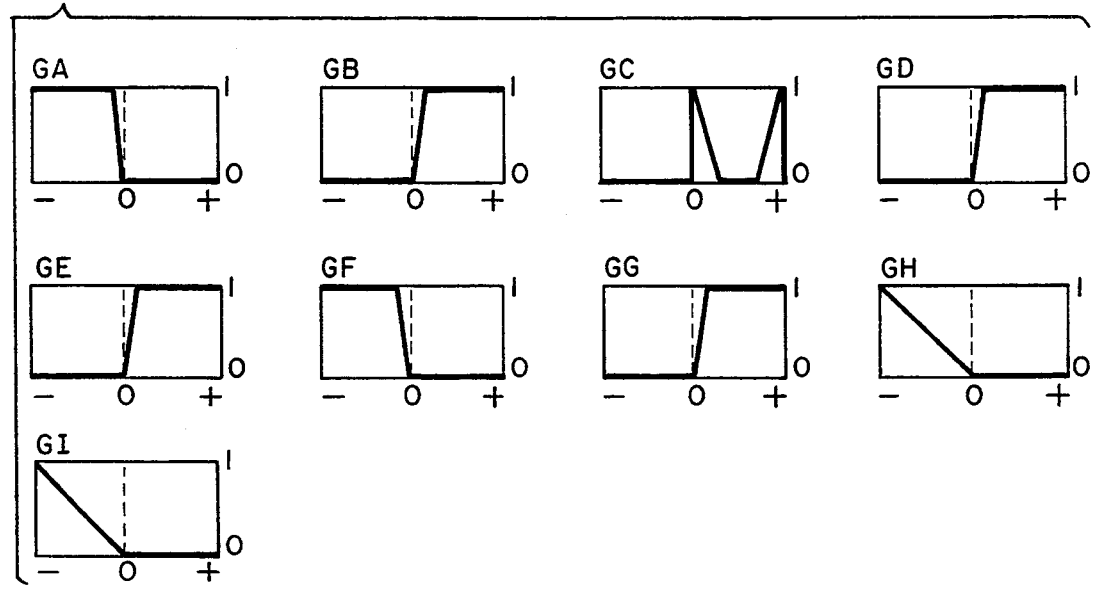
Figure 21H:
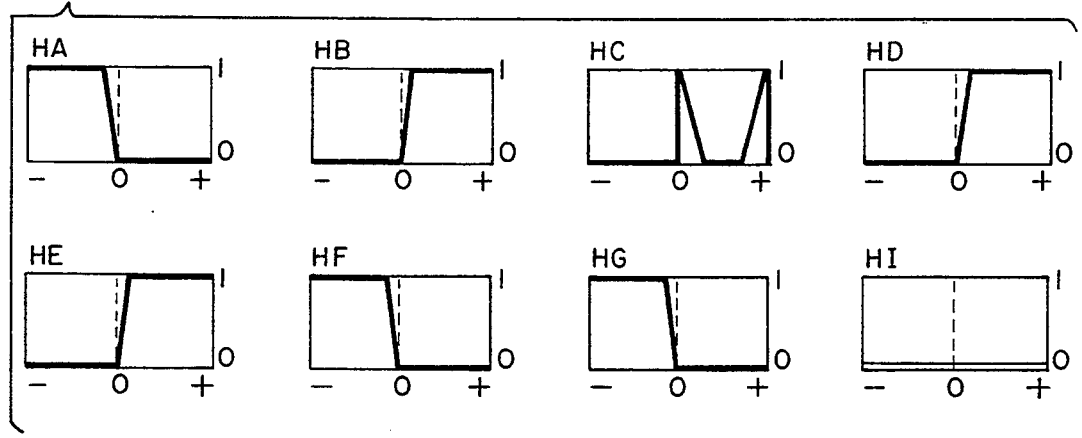
Figure 21I:
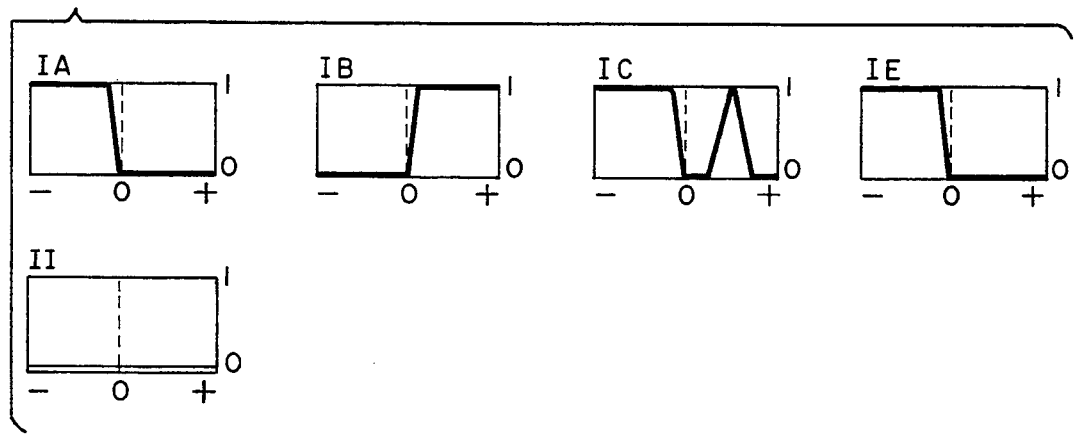
Figure 21J:
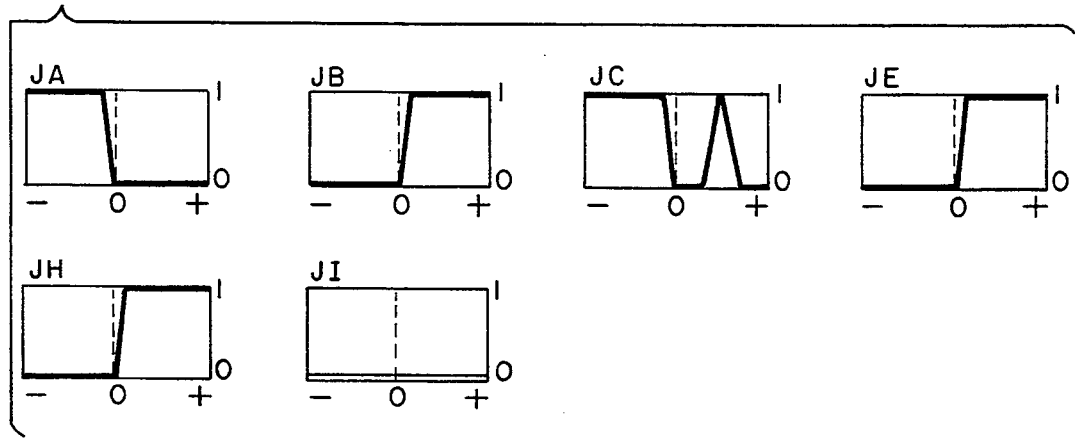
Figure 21K:
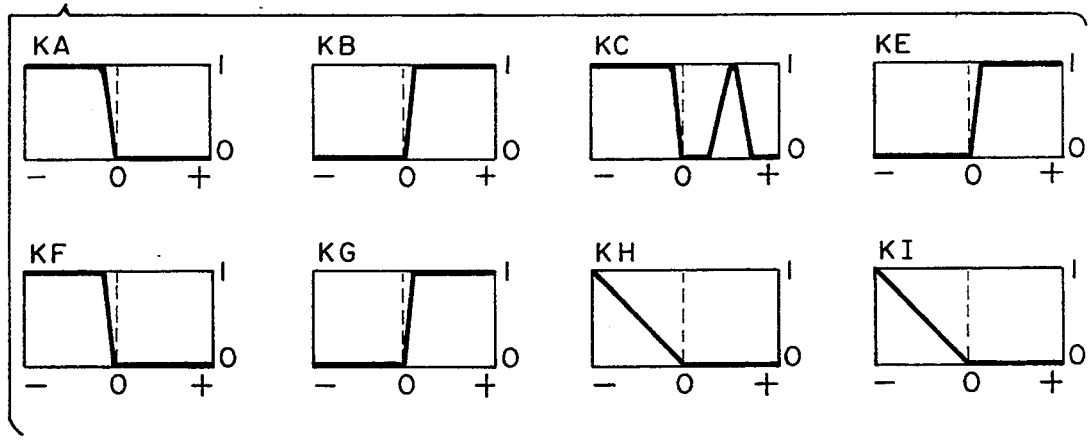
Figure 21L:
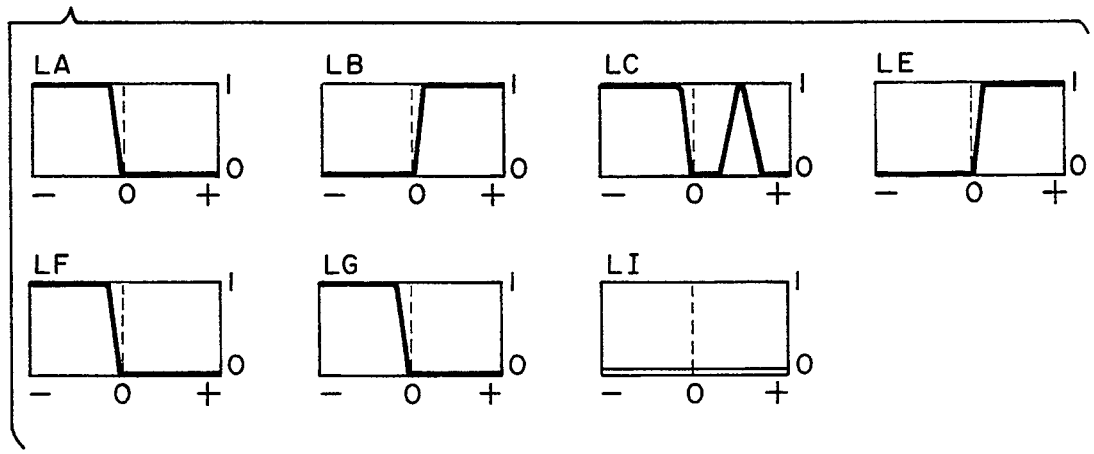
Figure 21M:
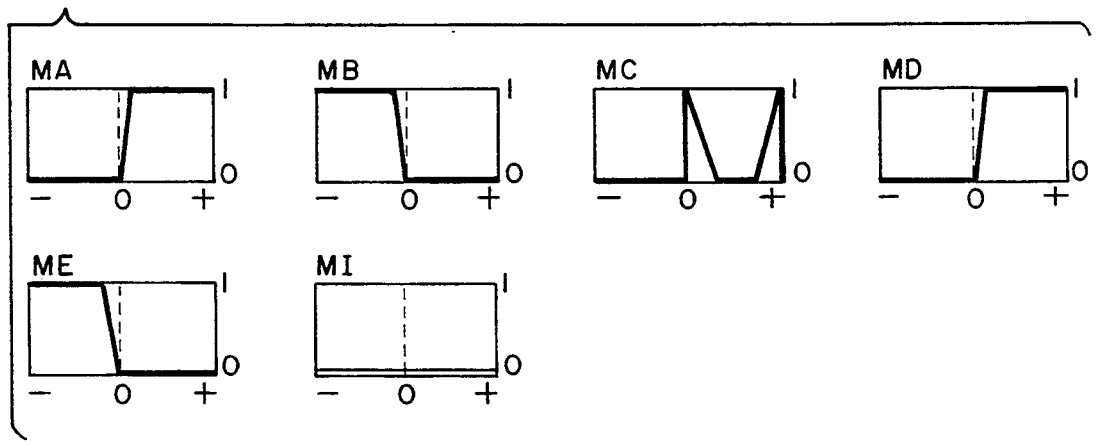
Figure 21N:
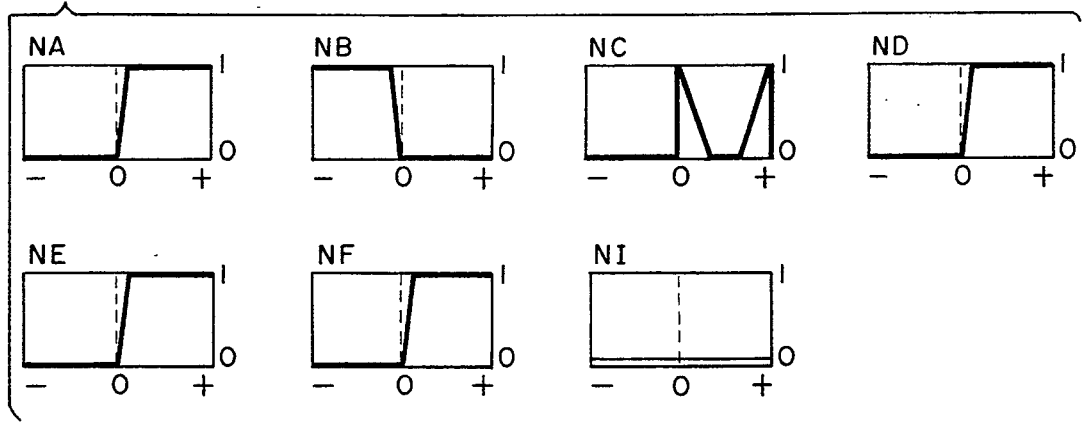
Figure 21O:
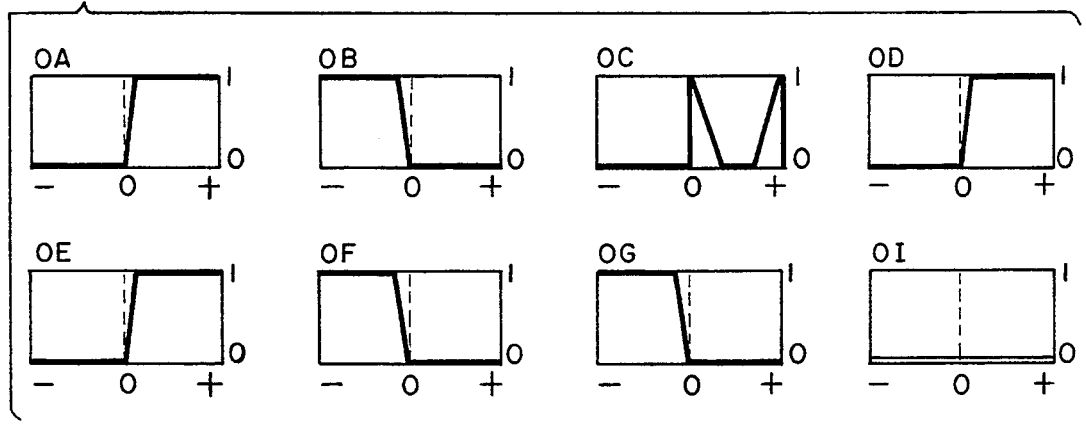
Figure 21P:
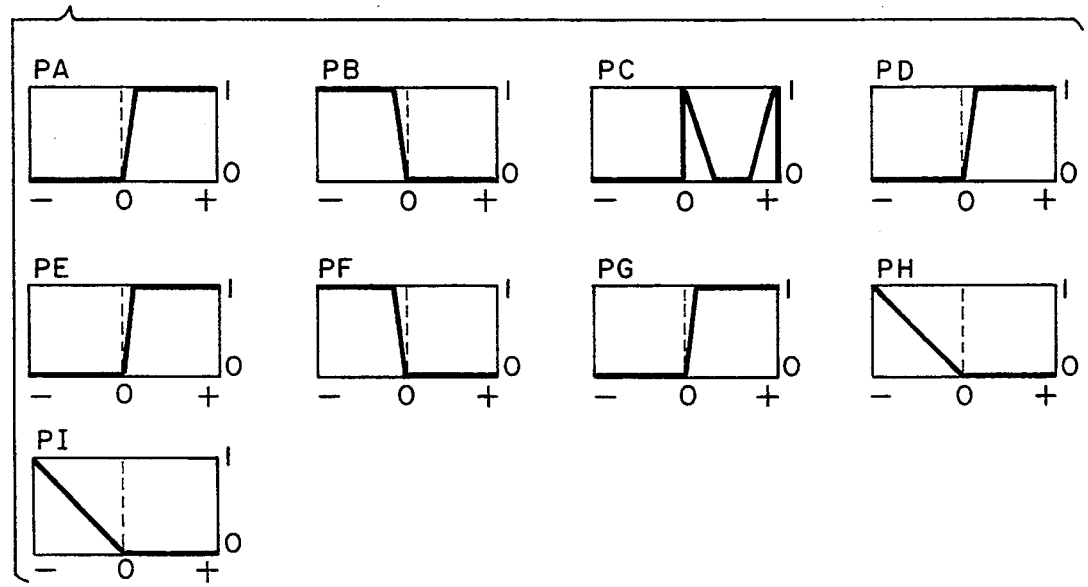
Figure 21Q:
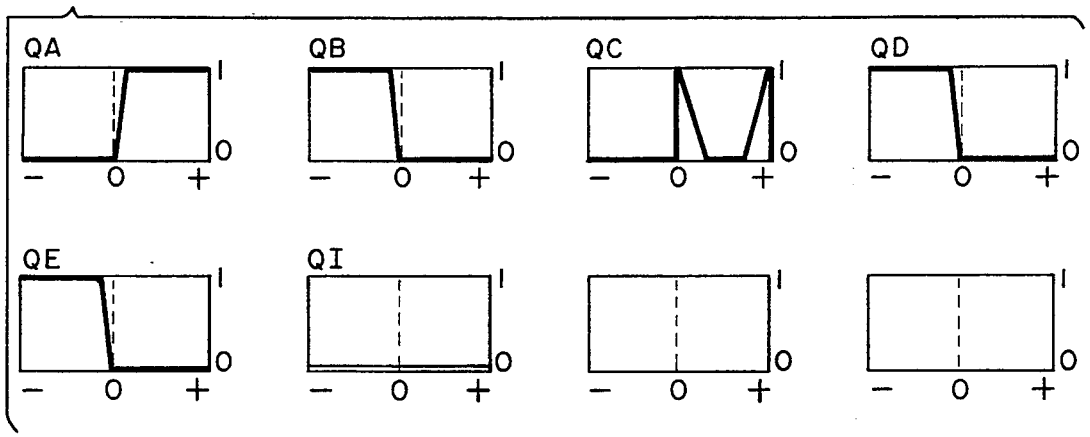
Figure 21R:
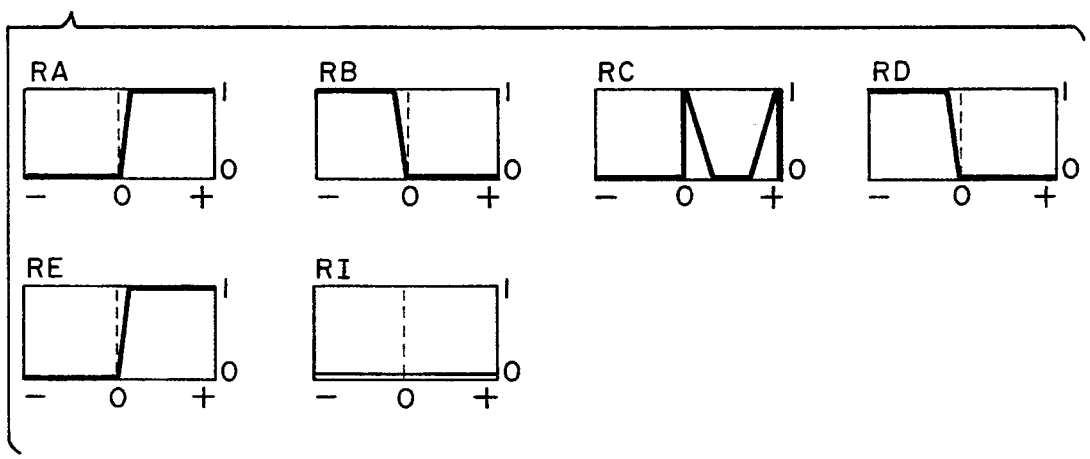
Figure 21S:
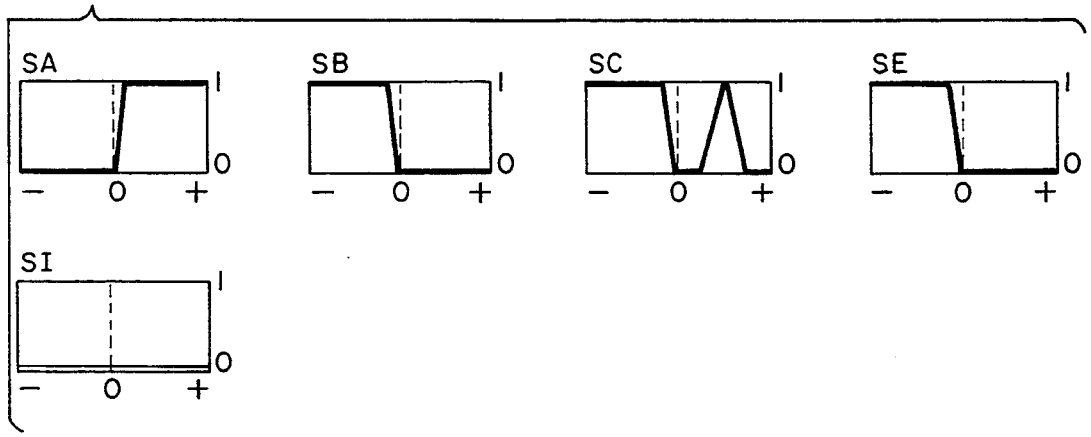
Figure 21T:
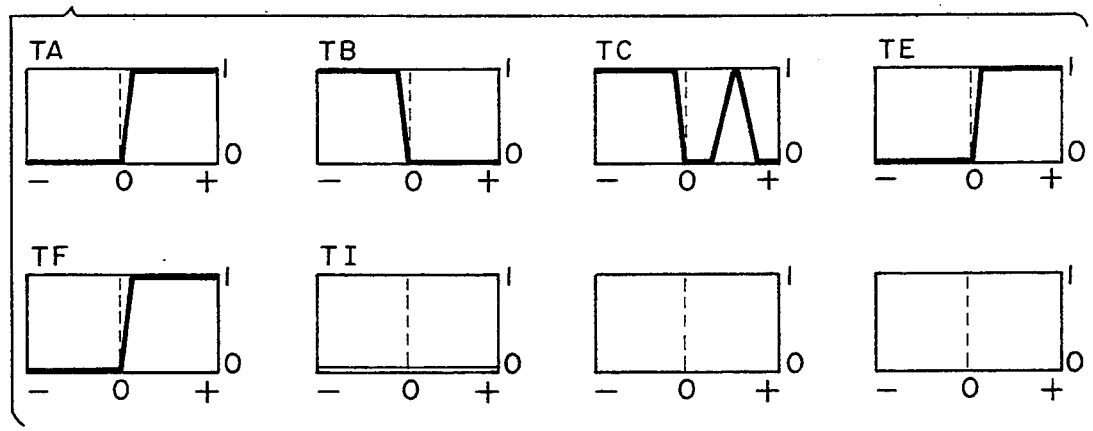
Figure 21U:
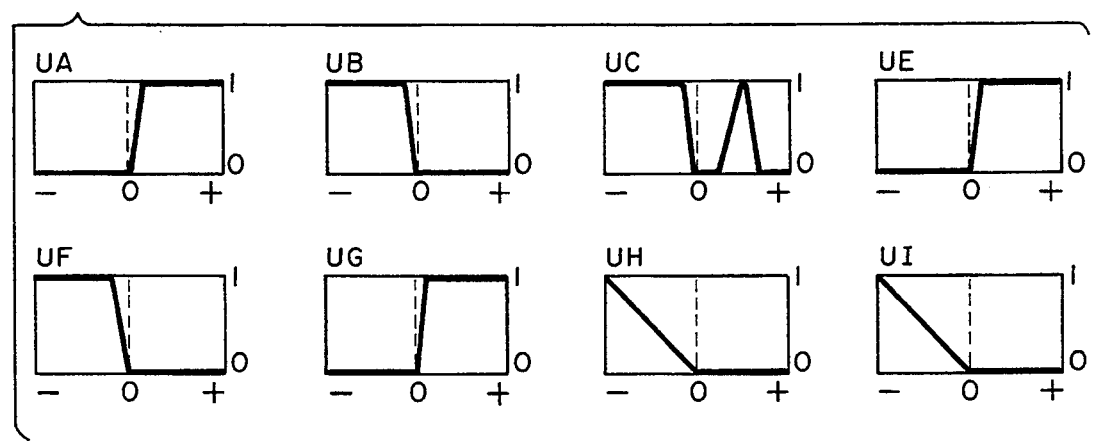
Figure 21V:
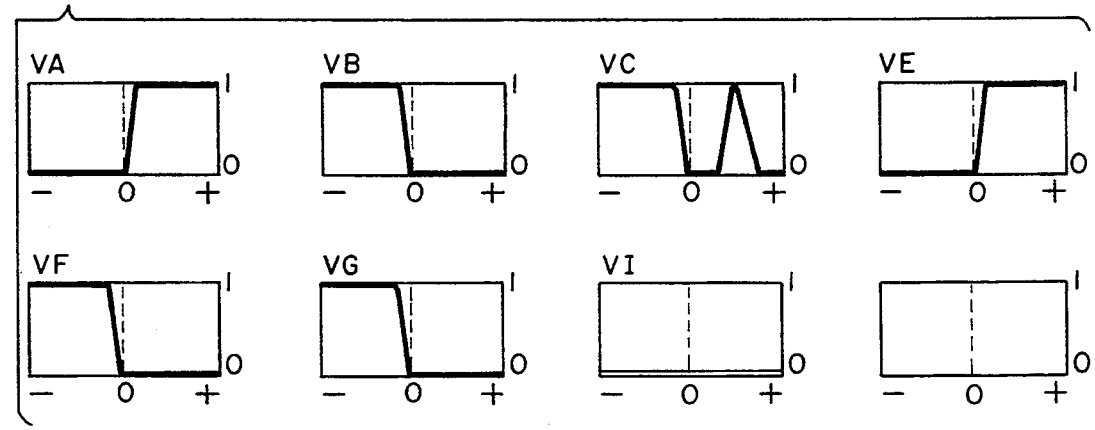
Figure 21W:
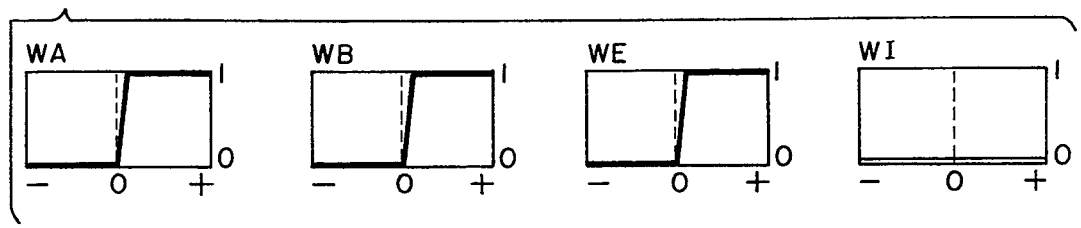
Figure 21X:
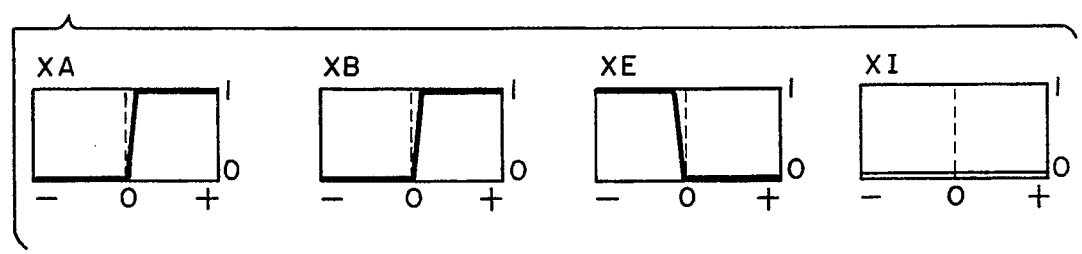

The antecedent and consequent membership functions associated with RFH1–RFH24 are shown in FIGS. 21(a)–(x) respectively. The final manipulated quantity generated represents the front hydraulic braking control signal.

The language control rules evaluated to generate the rear hydraulic braking control signal are as follows:

RRH1: If $\Delta\lambda_d$ is negative large, and $\Delta\mu_d$ is negative large, and S4 is positive large, and S9 is negative medium, then the hydraulic brake torque demand applied to the nondriven wheels is negative medium.

RRH2: If $\Delta\lambda_d$ is negative large, and $\Delta\mu_d$ is negative large, and S4 is negative large, then the hydraulic brake torque demand applied to the nondriven wheels is zero.

RRH3: If $\Delta\lambda_d$ is negative large, and $\Delta\mu_d$ is positive large, and $S1_d$ is positive small or positive large, and $S3_d$ is negative large, and S4 is positive large, and S9 is negative medium, then the hydraulic torque demand applied to the nondriven wheels is negative medium.

RRH4: If $\Delta\lambda_d$ is negative large, and $\Delta\mu_d$ is positive large, and $S1_d$ is positive small or positive large, and $S3_d$ is negative large, and S4 is negative large, then the hydraulic brake torque demand applied to the nondriven wheels is zero.

RRH5: If $\Delta\lambda_d$ if negative large, and $\Delta\mu_d$ is positive large, and $S1_d$ is positive small or positive large, and $S3_d$ is positive large, and S4 is negative large, and S5 is positive large, then the hydraulic brake torque demand applied to the nondriven wheels is zero.

RRH6: If $\Delta\lambda_d$ is negative large, and $\Delta\mu_d$ is positive large, and $S1_d$ is positive small or positive large, and $S3_d$ is positive large, and S4 is negative large, and S5 is negative large, and S10 is positive large, and $\tau_{Rmax}$ is negative medium, then the hydraulic brake torque demand applied to the nondriven wheels is negative medium.

RRH7: If $\Delta\lambda_d$ is negative large, and $\Delta\mu_d$ is positive large, and $S1_d$ is positive small or positive large, and $S3_d$ is positive large, and S4 is negative large, and S5 is negative large, and S10 is negative large, and S11 is negative medium, then the hydraulic brake torque demand applied to the nondriven wheels is negative medium.

RRH8: If $\Delta\lambda_d$ is negative large, and $\Delta\mu_d$ is positive large, and $S1_d$ is positive small or positive large, and $S3_d$ is positive large, and S4 is positive large, and S6 is positive large, and $\tau_{Rmax}$ is negative medium, then the hydraulic brake torque demand applied to the nondriven wheels is negative medium.

RRH9: If $\Delta\lambda_d$ is negative large, and $\Delta\mu_d$ is positive large, and $S1_d$ is positive small or positive large, and $S3_d$ is positive large, and S4 is positive large, and S6 is negative large, and S7 is positive large, and $\tau_{Rmax}$ is negative medium, then the hydraulic brake torque demand applied to the nondriven wheels is negative medium.

RRH10: If $\Delta\lambda_d$ is negative large, and $\Delta\mu_d$ is positive large, and $S1_d$ is positive small or positive large, and $S3_d$ is positive large, and S4 is positive large, and S6 is negative large, and S7 is negative large, and S9 is negative medium, then the hydraulic brake torque demand applied to the nondriven wheels is negative medium.

RRH11: If $\Delta\lambda_d$ is negative large, and $\Delta\mu_d$ is positive large, and $S1_d$ is negative large or positive medium, and S4 is negative large, and S5 is positive large, then the hydraulic brake torque demand applied to the nondriven wheels is zero.

RRH12: If $\Delta\lambda_d$ is negative large, and $\Delta\mu_d$ is positive large, and $S1_d$ is negative large or positive medium, and S4 is negative large, and S5 is negative large, and S10 is positive large, and $\tau_{Rmax}$ is negative medium, then the hydraulic brake torque demand applied to the nondriven wheels is negative medium.

RRH13: If $\Delta\lambda_d$ is negative large, and $\Delta\mu_d$ is positive large, and $S1_d$ is negative large or positive medium, and S4 is negative large, and S5 is negative large, and S10 is negative large, and S11 is negative medium, then the hydraulic brake torque demand applied to the nondriven wheels is negative medium.

RRH14: If $\Delta\lambda_d$ is negative large, and $\Delta\mu_d$ is positive large, and $S1_d$ is negative large or positive medium, and S4 is positive large, and S6 is positive large, and $\tau_{Rmax}$ is negative medium, then the hydraulic brake torque demand applied to the nondriven wheels is negative medium.

RRH15: If $\Delta\lambda_d$ is negative large, and $\Delta\mu_d$ is positive large, and $S1_d$ is negative large or positive medium and S4 is positive large, and S6 is negative large, and S7 is positive large, and $\tau_{Rmax}$ is negative medium, then the hydraulic brake torque demand applied to the nondriven wheels is negative medium.

RRH16: If $\Delta\lambda_d$ is negative large, and $\Delta\mu_d$ is positive large, and $S1_d$ is negative large or positive medium, and S4 is positive large, and S6 is negative large, and S7 is negative large, and S4 is negative medium, then the hydraulic brake torque demand applied to the nondriven wheels is negative medium.

RRH17: If $\Delta\lambda_d$ is positive large, and $\Delta\mu_d$ is negative large, and $S1_d$ is positive small or positive large, and $S3_d$ is positive large, and S4 is negative large, and S5 is positive large, then the hydraulic brake torque demand applied to the nondriven wheels is zero.

RRH18: If $\Delta\lambda_d$ is positive large, and $\Delta\mu_d$ is negative large, and $S1_d$ is positive small or positive large, and $S3_d$ is positive large, and S4 is negative large, and S5 is negative large, and S10 is positive large, and $\tau_{Rmax}$ is negative medium, then the hydraulic brake torque demand applied to the nondriven wheels is negative medium.

RRH19: If $\Delta\lambda_d$ is positive large, and $\Delta\mu_d$ is negative large, and $S1_d$ is positive small or positive large, and $S3_d$ is positive large, and S4 is negative large, and S5 is negative large, and S10 is negative large, and S11 is negative medium, then the hydraulic brake torque demand applied to the nondriven wheels is negative medium.

RRH20: If $\Delta\lambda_d$ is positive large, and $\Delta\mu_d$ is negative large, and $S1_d$ is positive small or positive large, and $S3_d$ is positive large, and S4 is positive large, and S6 is positive large, and $\tau_{Rmax}$ is negative medium, then the hydraulic brake torque demand applied to the nondriven wheels is negative medium.

RRH21: If $\Delta\lambda_d$ is positive large, and $\Delta\mu_d$ is negative large, and $S1_d$ is positive small or positive large, and $S3_d$ is positive large, and S4 is positive large, and S6 is negative large, and S7 is positive large, and $\tau_{Rmax}$ is negative medium, then the hydraulic brake torque demand applied to the nondriven wheels is negative medium.

RRH22: If $\Delta\lambda_d$ is positive large, and $\Delta\mu_d$ is negative large, and $S1_d$ is positive small or positive large, and $S3_d$ is positive large, and S4 is positive large, and S6 is negative large, and S7 is negative large, and S9 is negative medium, then the hydraulic brake torque demand applied to the nondriven wheels is negative medium.

RRH23: If $\Delta\lambda_d$ is positive large, and $\Delta\mu_d$ is negative large, and $S1_d$ is positive small or positive large, and $S3_d$ is negative large, and S4 is positive large, and S9 is negative medium, then the hydraulic brake torque demand applied to the nondriven wheels is negative medium.

RRH24: If $\Delta\lambda_d$ is positive large, and $\Delta\mu_d$ is negative large, and $S1_d$ is positive small or positive large, and $S3_d$ is negative large, and S4 is negative large, then the hydraulic brake torque demand applied to the nondriven wheels is zero.

RRH25: If $\Delta\lambda_d$ is positive large, and $\Delta\mu_d$ is negative large, and $S1_d$ is negative large or positive medium, and S4 is negative large, and S5 is positive large, then the hydraulic brake torque demand applied to the nondriven wheels is zero.

RRH26: If $\Delta\lambda_d$ is positive large, and $\Delta\mu_d$ is negative large, and $S1_d$ is negative large or positive medium, and S4 is negative large, and S5 is negative large, and S10 is positive large, and $\tau_{Rmax}$ is negative medium, then the hydraulic brake torque demand applied to the nondriven wheels is negative medium.

RRH27: If $\Delta\lambda_d$ is positive large, and $\Delta\mu_d$ is negative large, and $S1_d$ is negative large or positive medium, and S4 is negative large, and S5 is negative large, and S10 is negative large, and S11 is negative medium, then the hydraulic brake torque demand applied to the nondriven wheels is negative medium.

RRH28: If $\Delta\lambda_d$ is positive large, and $\Delta\mu_d$ is negative large, and $S1_d$ is negative large or positive medium, and S4 is positive large, and S6 is positive large, and $\tau_{Rmax}$ is negative medium, then the hydraulic brake torque demand applied to the nondriven wheels is negative medium.

RRH29: If $\Delta\lambda_d$ is positive large, and $\Delta\mu_d$ is negative large, and $S1_d$ is negative large or positive medium, and S4 is positive large, and S6 is negative large, and S7 is positive large, and $\tau_{Rmax}$ is negative medium, then the hydraulic brake torque demand applied to the nondriven wheels is negative medium.

RRH30: If $\Delta\lambda_d$ is positive large, and $\Delta\mu_d$ is negative large, and $S1_d$ is negative large or positive medium, and S4 is positive large, and S6 is negative large, and S7 is negative large, and S9 is negative medium, then the hydraulic brake torque demand applied to the nondriven wheels is negative medium.

RRH31: If $\Delta\lambda_d$ is positive large, and $\Delta\mu_d$ is positive large, and S4 is positive large, and S9 is negative medium, then the hydraulic brake torque demand applied to the nondriven wheels is negative medium.

RRH32: If $\Delta\lambda_d$ is positive large, and $\Delta\mu_d$ is positive large, and S4 is negative large, then the hydraulic brake torque demand applied to the nondriven wheels is zero.

Figure 23A:
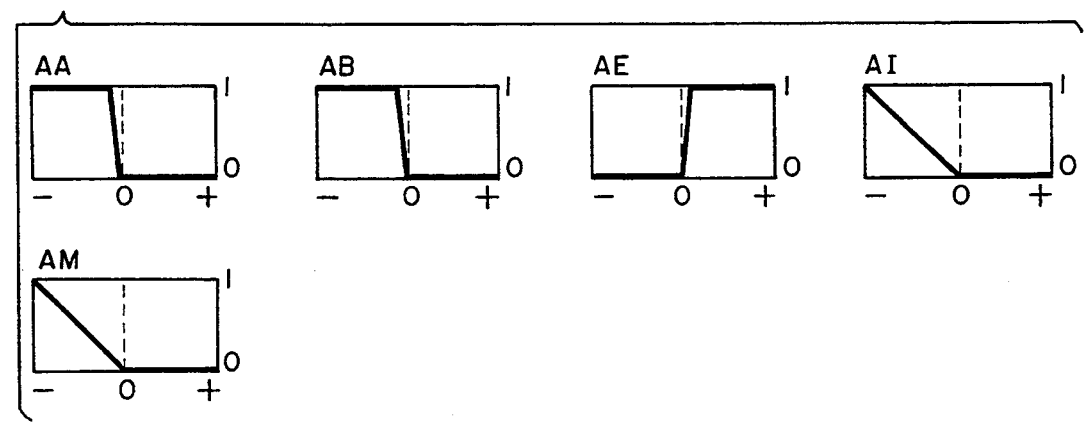
FIGS. 23(A) through 23(F') graphically illustrate the membership function maps of FIG. 22.
Figure 23B:
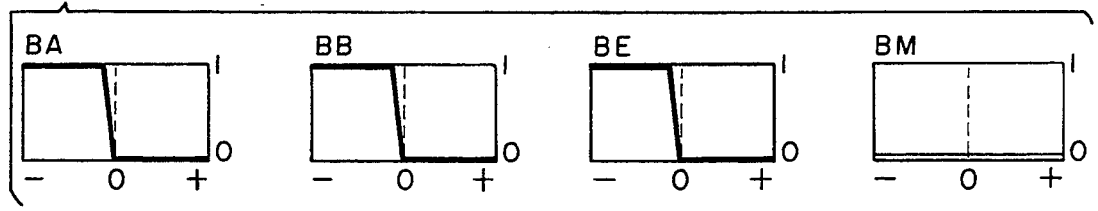
Figure 23C:
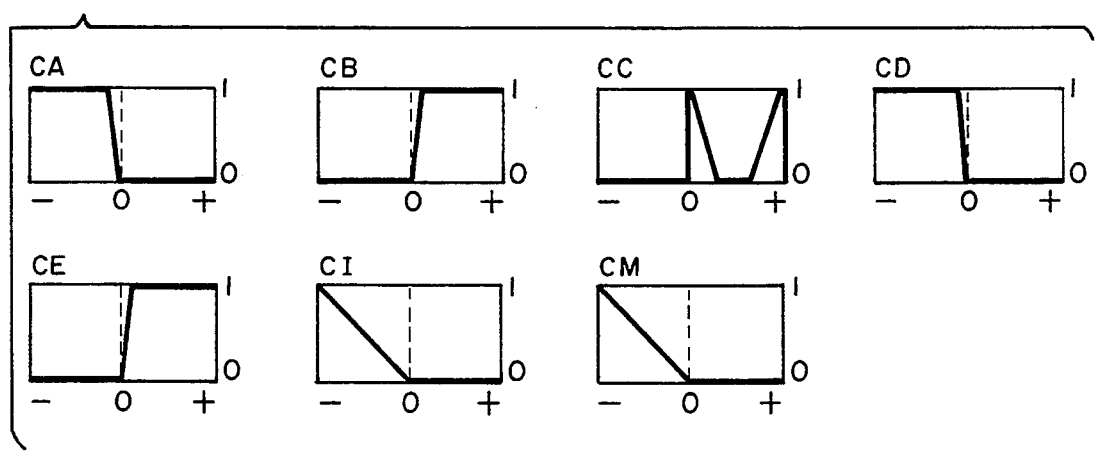
Figure 23D:
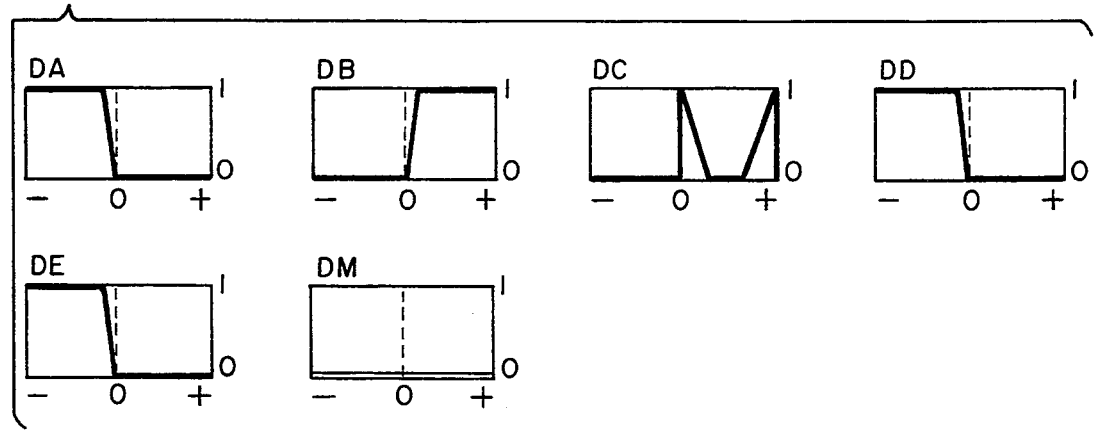
Figure 23E:
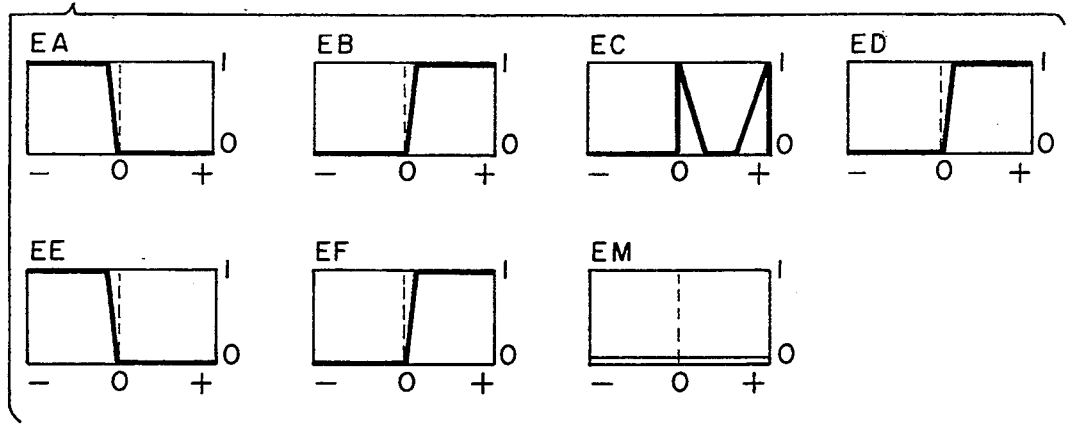
Figure 23F:
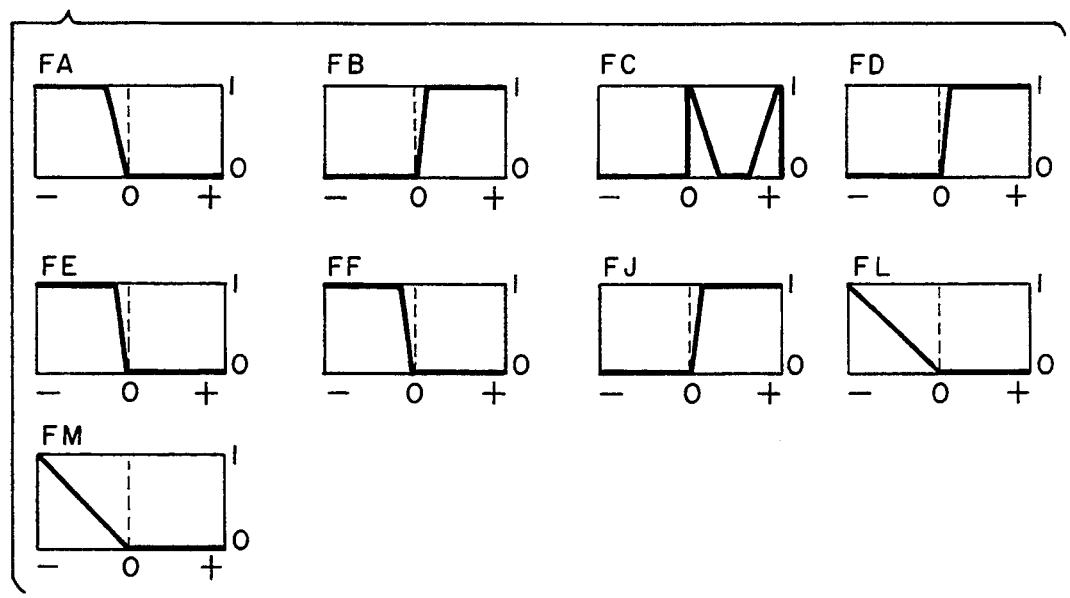
Figure 23H:
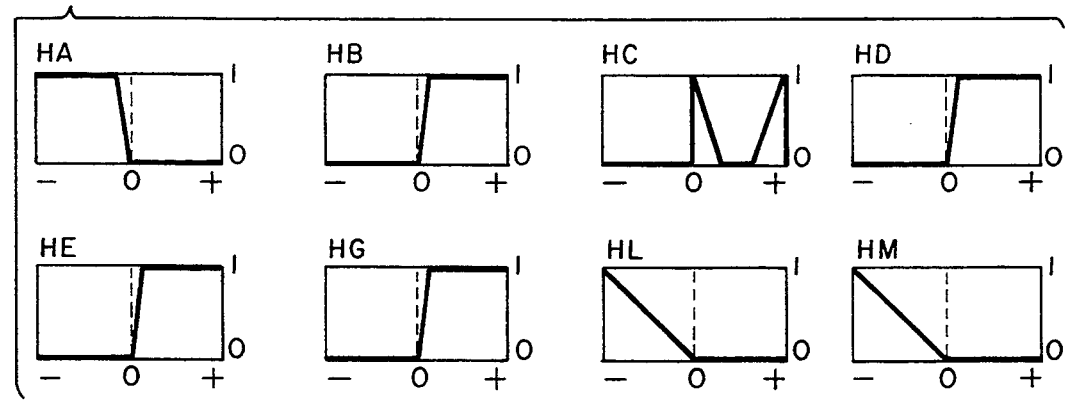
Figure 23G:
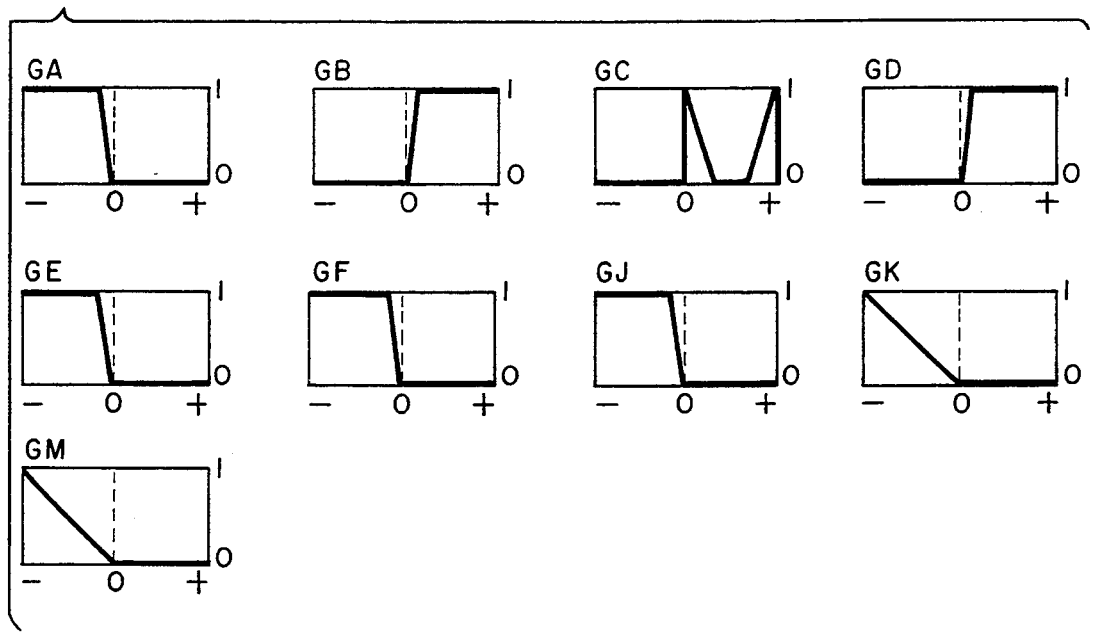
Figure 23I:
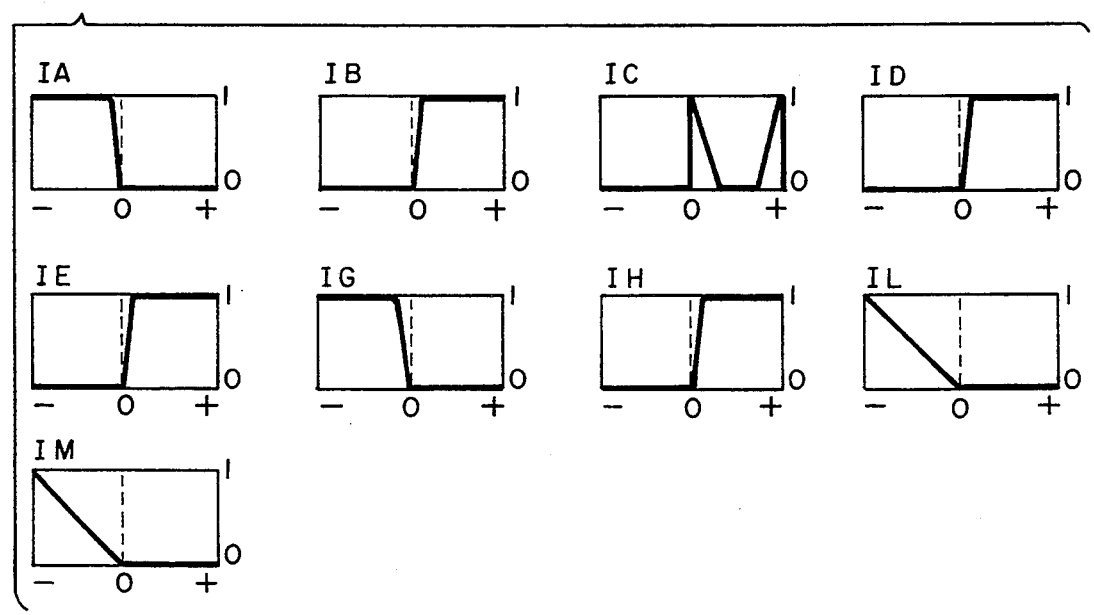
Figure 23J:
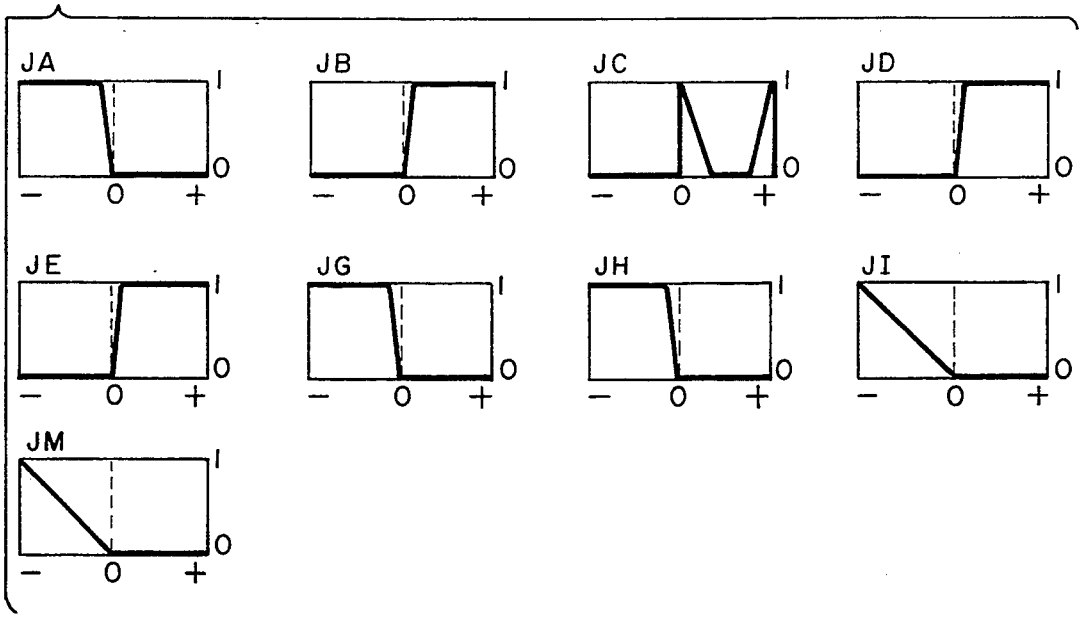
Figure 23K:
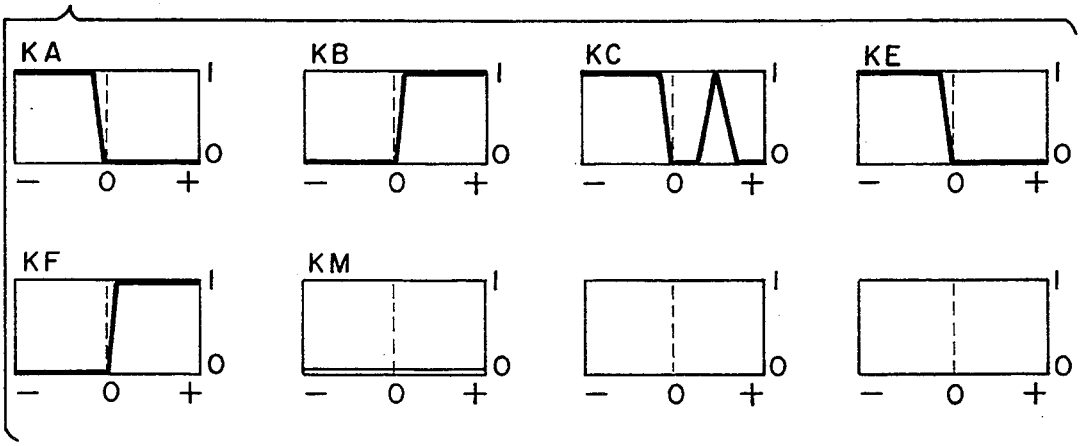
Figure 23L:
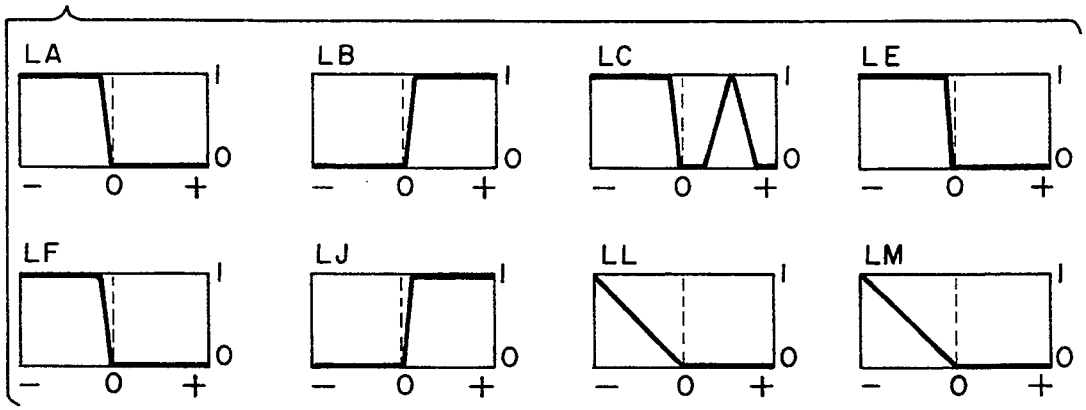
Figure 23M:
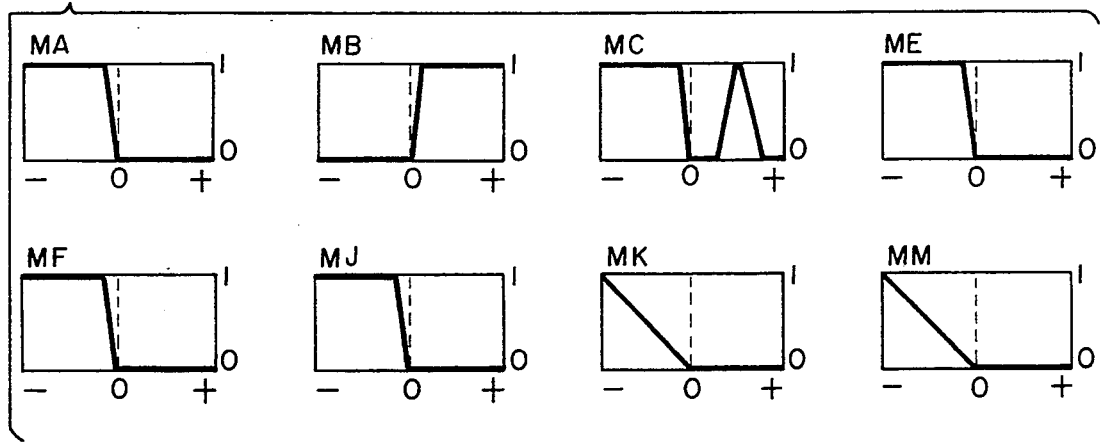
Figure 23N:
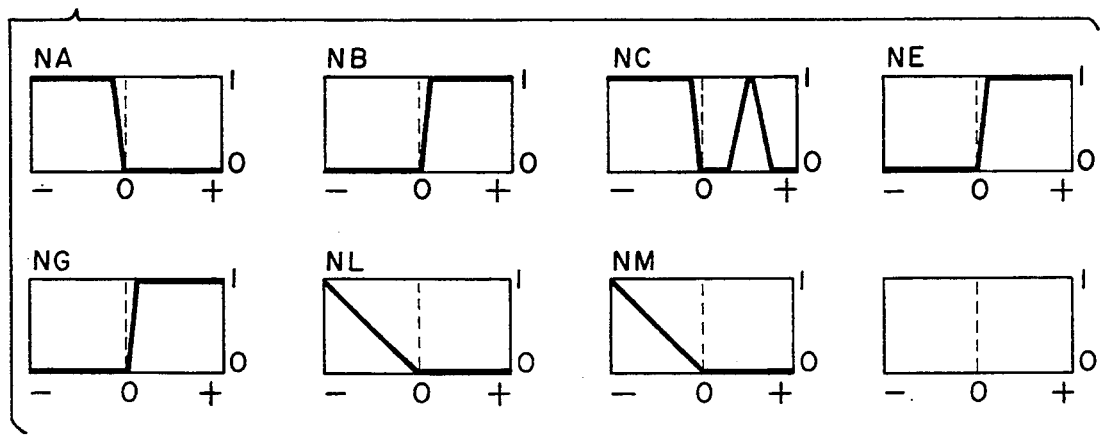
Figure 23O:
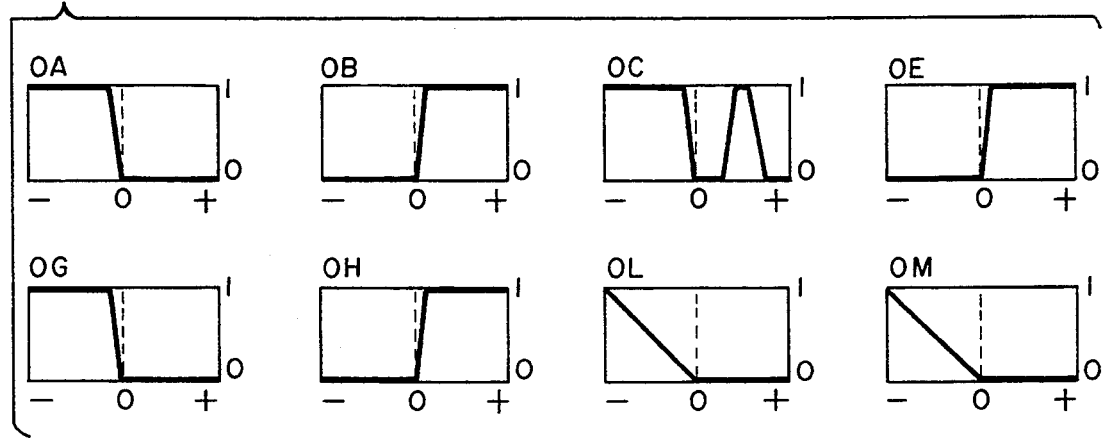
Figure 23P:
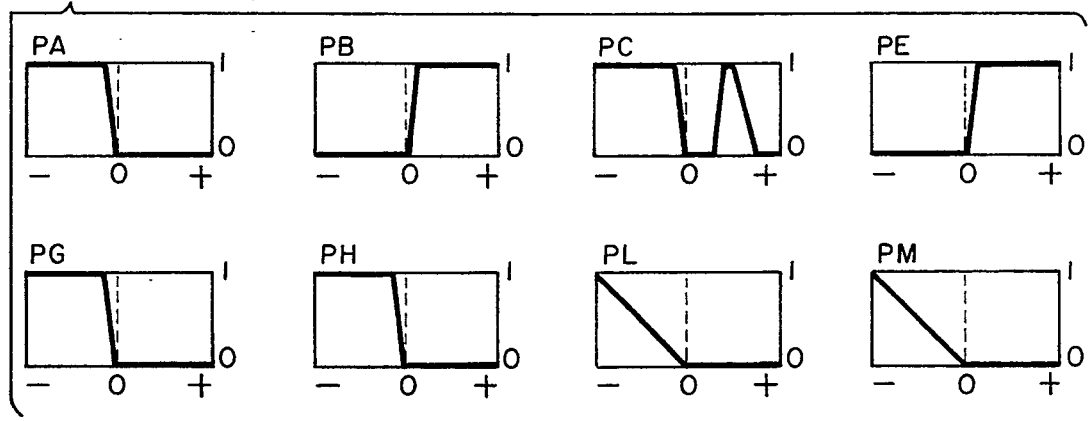
Figure 23Q:
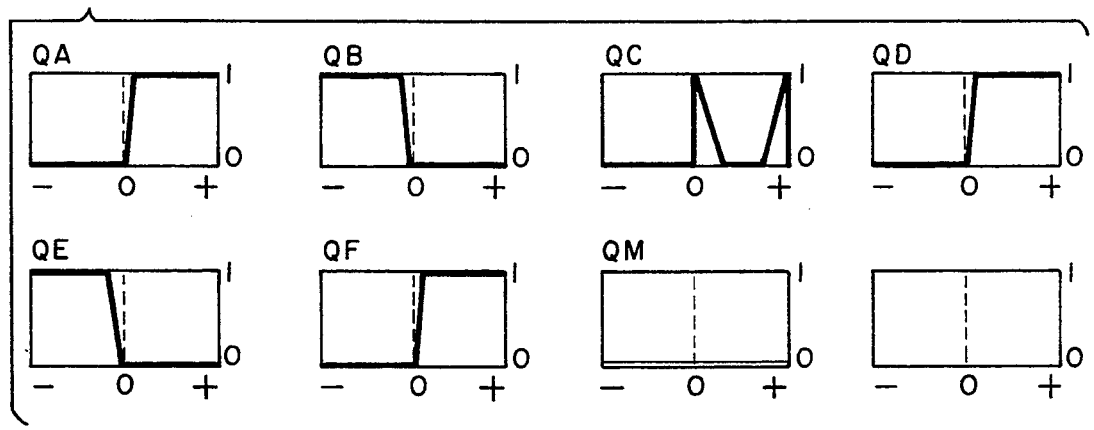
Figure 23R:
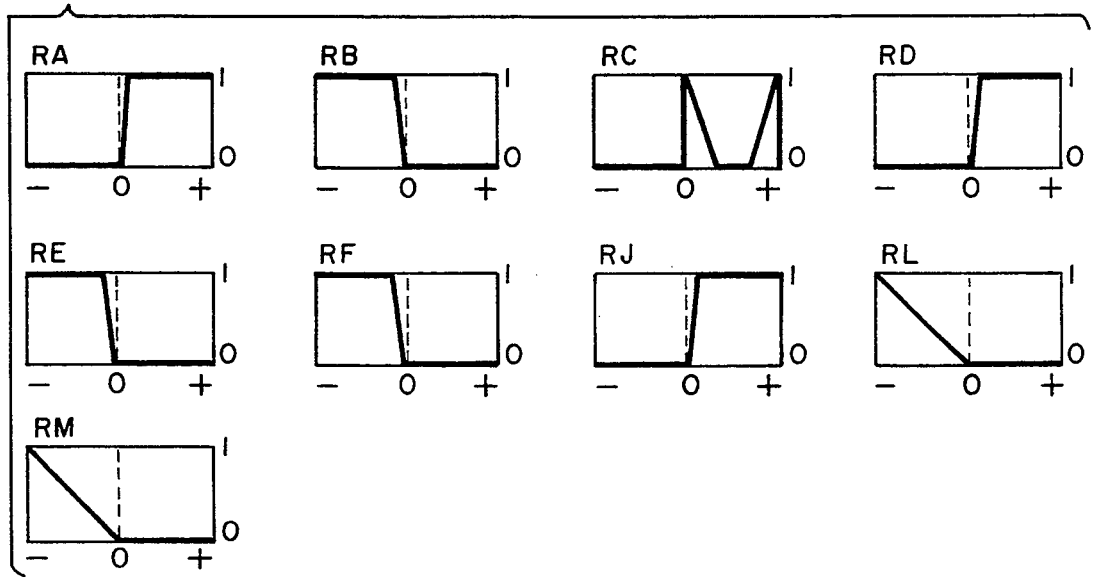
Figure 23S:
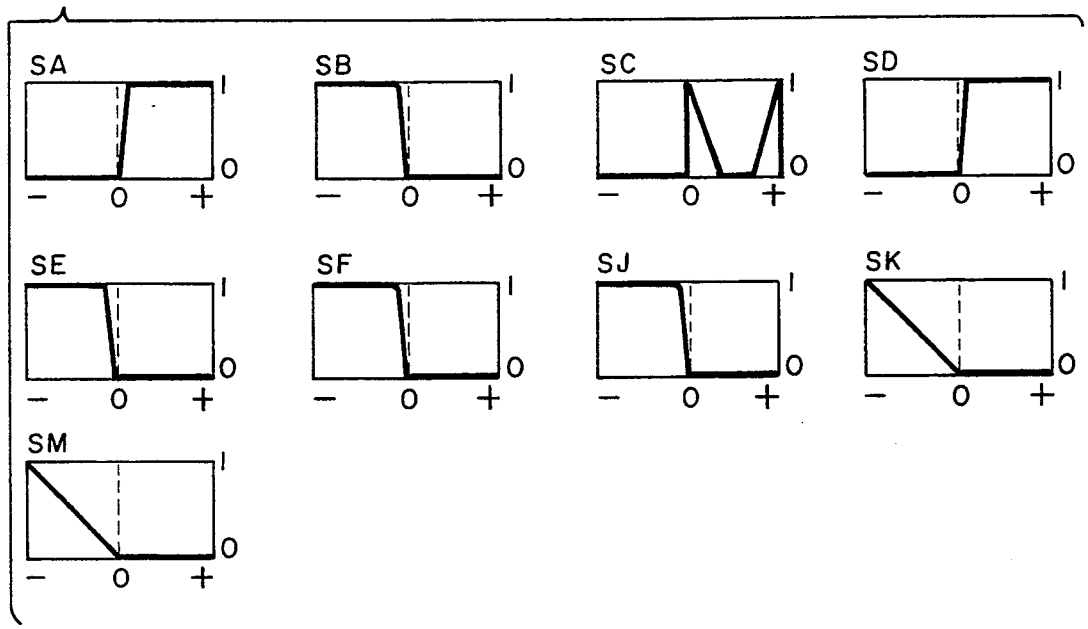
Figure 23T:
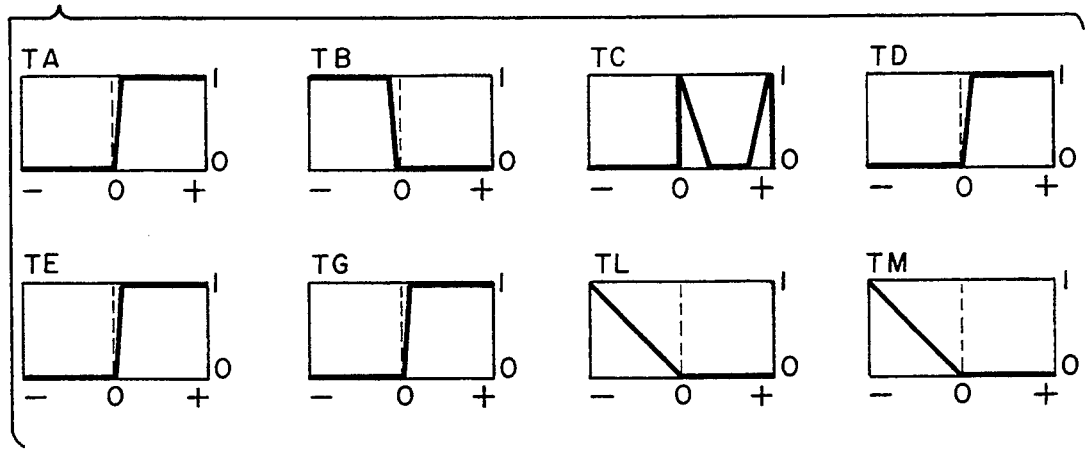
Figure 23U:
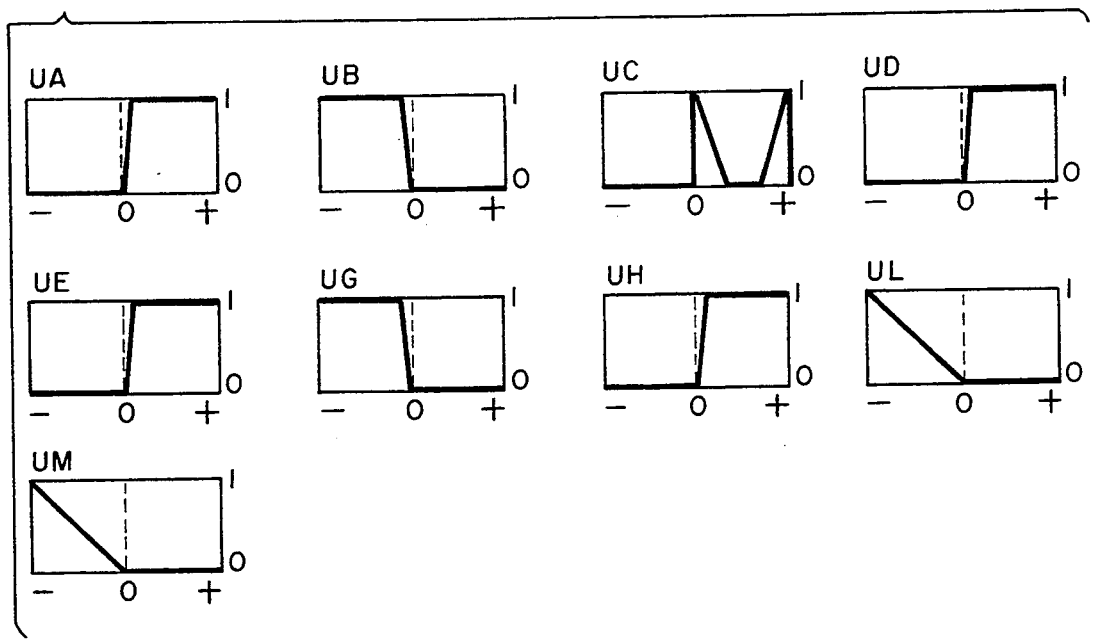
Figure 23V:
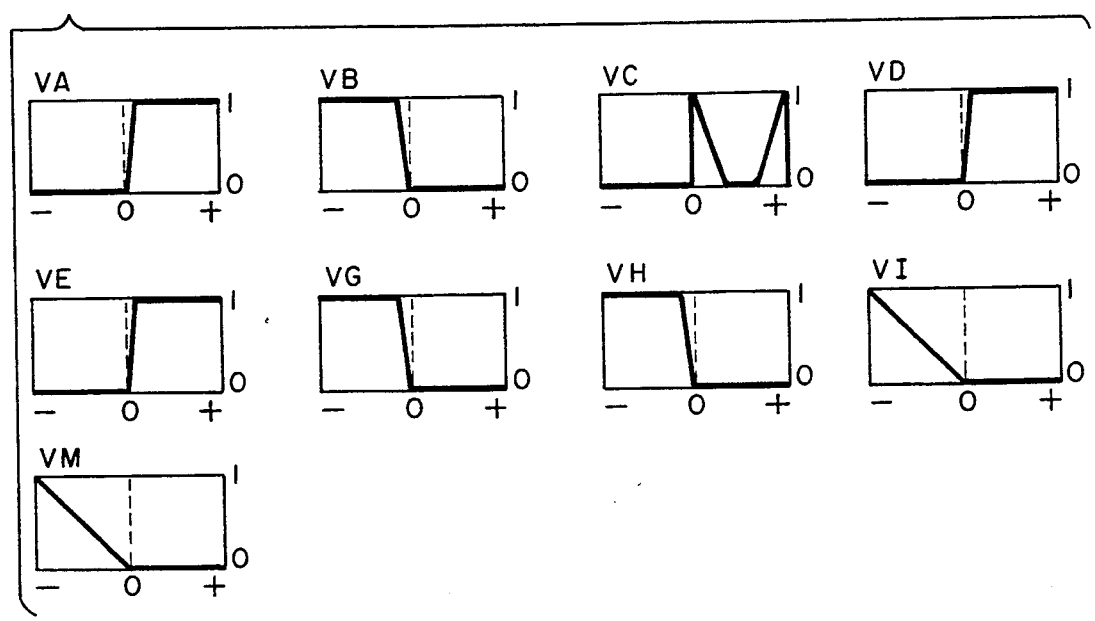
Figure 23W:
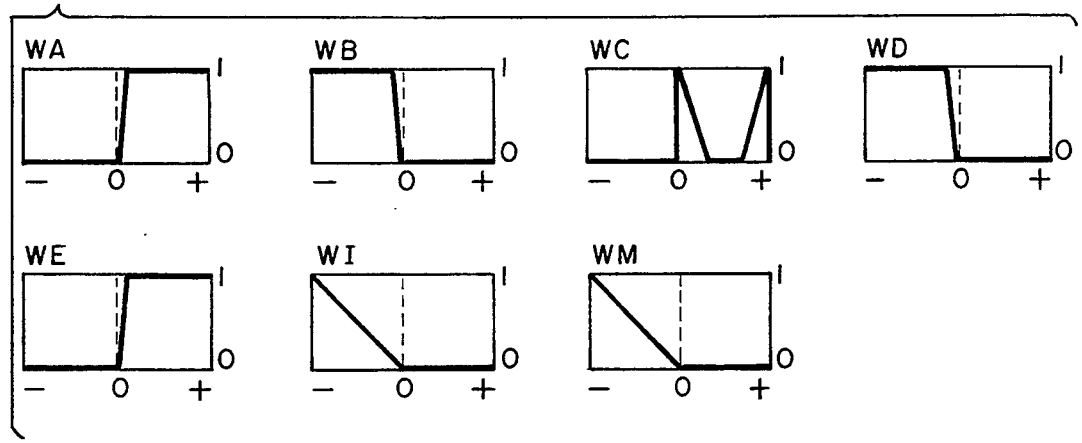
Figure 23X:
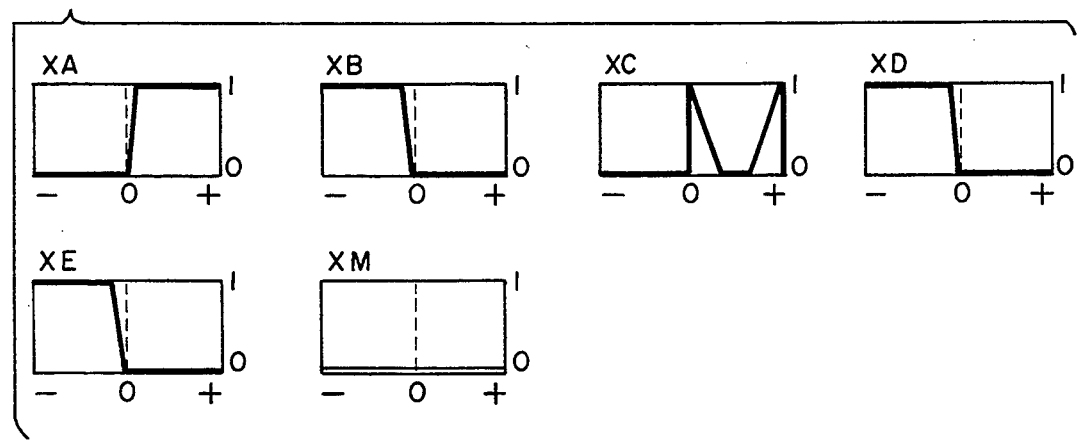
Figure 23Y:
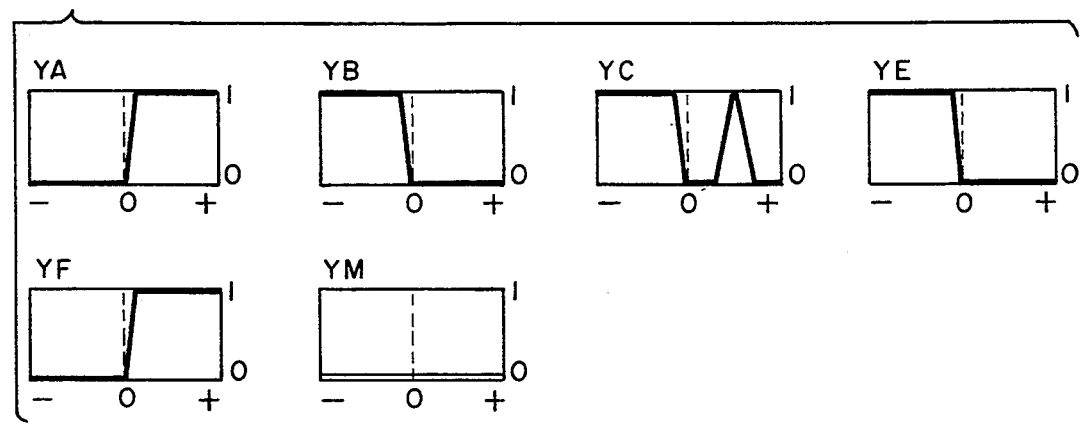

The antecedent and consequent membership functions associated with RRH1–RRH32 are shown in FIGS. 23(a)–(af) respectively. The final manipulated quantity generated represents the rear hydraulic braking control signal.

Referring again to FIG. 3, once the appropriate control signals are generated, the control means 104 and 110 are modulated 312 to operate the electric traction motor 104 and the hydraulic brake 112 to provide antiskid braking and traction control.

An important note is that severe split-$\mu$ traction control, i.e. when the driven wheels are on road surfaces having different adhesion coefficients, can be performed by the present control system by the conventional method of brake application and release without additional hardware. However, a description of such control is not included since such control is well known in the art.

Having thus described the data transmission system of the present invention in detail and by reference to preferred embodiments thereof, it will be apparent that modifications and variations are possible without departing from the scope of the invention defined in the appended claims.

What is claimed is:

1. A regenerative antiskid braking and traction control system for a vehicle having at least right and left driven wheels, a regenerative braking system operatively connected to an electric traction motor having motor control means for controlling the operation of said motor, and a separate hydraulic braking system having brake control means for controlling fluid pressure applied at each wheel by said hydraulic braking system, said regenerative antiskid braking and traction control system comprising:

sensing means for sensing vehicle parameters representative of vehicle behavior; and processing means, responsive to said sensing means, for calculating vehicle parameters defining said vehicle behavior not directly measurable by said sensing means, for applying fuzzy logic to said sensed vehicle parameters and said calculated vehicle parameters to determine critical values of said vehicle parameters according to a plurality of first language control rules, for determining a vehicle state of said vehicle based on said sensed vehicle parameters, said calculated vehicle parameters and said critical values, said vehicle state being any of requiring regenerative antiskid braking control, requiring hydraulic braking control, and requiring traction control, for generating command signals based on said vehicle state and said sensed and calculated vehicle parameters, and for providing said command signals to said motor control means to control operation of said electric traction motor and to said brake control means to control fluid pressure applied at each wheel to provide said regenerative antiskid braking control, hydraulic braking control, and traction control.

2. The regenerative antiskid braking and traction control system as claimed in claim 1 wherein said at least right and left driven wheels are interconnected by a drive axle and said critical values of said vehicle parameters include a driven wheel critical adhesion coefficient and a driven wheel critical wheel slip for each of said at least right and left driven wheels.

3. The regenerative antiskid braking and traction control system as claimed in claim 2 wherein said processing means further determines a worst case wheel slip condition by deriving a critical adhesion coefficient equal to a lowest value of said driven wheel critical adhesion coefficients and deriving a critical wheel slip equal to a value of said driven wheel critical slip associated with said critical adhesion coefficient and employs said control strategy in response to said worst case wheel slip condition to generate said command signals.

4. The regenerative antiskid braking and traction control system as claimed in claim 1 wherein said control strategy uses fuzzy logic for generating said command signals according to a plurality of second language control rules.

5. The regenerative antiskid braking and traction control system as claimed in claim 1 wherein said command signals include a rear hydraulic braking control signal, a front hydraulic braking control signal, and a regenerative antiskid braking control signal for modulating said brake control means and said motor control means when said vehicle is in said vehicle state requiring regenerative antiskid braking control.

6. The regenerative antiskid braking and traction control system as claimed in claim 1 wherein said command signals include a front hydraulic braking control signal and a rear hydraulic braking control signal for modulating said brake control means when said vehicle is in said vehicle state requiring hydraulic braking control.

7. The regenerative antiskid braking and traction control system as claimed in claim 1 wherein said command signals include a reduction in motor torque control signal for modulating said motor control means when said vehicle is in said vehicle state requiring traction control.

8. The regenerative antiskid braking and traction control system as claimed in claim 1 wherein said sensing means includes:
a plurality of driven wheel speed sensors for measuring wheel speed of said at least right and left driven wheels;
brake pressure sensors for measuring fluid pressure applied at least two driven wheels and for measuring fluid pressure in at least one brake line of nondriven wheels;
a master cylinder pressure sensor for measuring hydraulic pressure of a master cylinder;
at least two nondriven wheel speed sensors;
a brake switch sensor for sensing operation of a brake light switch;
a motor speed sensor for measuring speed of said electric traction motor;
a motor current sensor for measuring current of said electric traction motor; and
means for sensing operation of an acceleration pedal switch.

9. The antiskid braking and traction control system as claimed in claim 1 wherein said processing means calculates vehicle acceleration, Dv, as one of said vehicle parameters according to the following equation, whenever hydraulic brake pressure is applied to nondriven wheels:

$$Dv = [k(2(\theta_e/G_r) - \theta_{rd} - \theta_{ld}) - J_r(\alpha_{rtd} + \alpha_{ltd}) - \tau_{br} - \tau_{bl} + \beta(2(\omega_e/G_r) - \omega_{rd} - \omega_{ld})]/R_eM_v$$

wherein:
k is a spring rate of a drive axle of said vehicle,
$\theta_e$ is an integral of the speed of said motor,
$G_r$ is a combined gear ratio of a differential and transmission of said vehicle,
$\theta_{rd}$ and $\theta_{ld}$ are integrals of the speeds of said right and left driven wheels of said vehicle respectively,
$J_r$ is wheel inertia,
$\alpha_{rtd}$ and $\alpha_{ltd}$ are time derivatives of the speeds of said right and left driven wheels respectively,
$\tau_{br}$ and $\tau_{bl}$ are hydraulic brake torques applied to said right and left driven wheels respectively,
$R_w$ is a radius of one of said right and left driven wheels,
$M_v$ is the mass of said vehicle,
$\omega_{rd}$ and $\omega_{ld}$ are speeds of the right and left driven wheels respectively,
$\omega_e$ is the motor speed,
$\beta$ is the damping rate between the motor shaft and wheel; and
according to the following equation, whenever hydraulic brake pressure is not being applied to said nondriven wheels:

$$Dv = \frac{v(t) - v(t-T)}{T}$$

wherein:
v(t) is vehicle speed at time t,
T is sampling rate, and
v(t-T) is vehicle speed at time t minus sampling rate T.

10. The antiskid braking and traction control system as claimed in claim 1 wherein said processing means calculates an adhesion coefficient $\mu_d$ between a road surface and tire surface for each one of said right and left driven wheels as one of said vehicle parameters, according to the following equation:

$$\mu_d = \frac{k(2(\theta_e/G_r) - \theta_{rd} - \theta_{ld}) - 2\tau_d - 2J_r\alpha_d + \beta(2(\omega_e/G_r) - \omega_{rd} - \omega_{ld})}{2R_wN_v}$$

wherein:
k is a spring rate of a drive axle of said vehicle,
$\theta_e$ is an integral of the speed of said electric motor,
$G_r$ is a combined gear ratio of a differential and a transmission of said vehicle,
$\theta_{rd}$ and $\theta_{ld}$ are integrals of the speeds of said right and left driven wheels respectively,
$\tau_d$ is hydraulic brake torque applied to said one of said right and left driven wheels,
$J_r$ is wheel inertia, $\alpha_d$ is a time derivative of the speed of said one of said right and left driven wheels, $R_w$ is the radius of said one of said right and left driven wheels, $N_v$ is a normal force on said one of said right and left driven wheels, $\beta$ is the damping rate between the motor shaft and wheel, $\omega_e$ is the motor speed, and $\omega_{rd}$ and $\omega_{ld}$ are speeds of the right and left driven wheels respectively.

11. The regenerative antiskid braking and traction control system as claimed in claim 1 wherein said processing means further determines whether said vehicle is coasting, generates command signals representative of said vehicle coasting and provides said command signals to said motor control means and to said brake control means to provide regenerative antiskid braking control.

12. A regenerative antiskid braking and traction control system for a vehicle having at least two driven wheels, a regenerative braking system operatively connected to an electric traction motor having motor control means for controlling the operation of said motor, and a separate hydraulic braking system having brake control means for controlling fluid pressure applied at each wheel by said hydraulic braking system, said regenerative antiskid braking and traction control system comprising:

sensing means for sensing vehicle parameters representative of vehicle behavior; and processing means, responsive to said sensing means, for calculating vehicle parameters defining said vehicle behavior not directly measurable by said sensing means, for determining critical values of said sensed parameters and said calculated parameters, for determining a vehicle state of said vehicle based on said sensed vehicle parameters, said calculated vehicle parameters and said critical values, said vehicle state being any of requiring regenerative antiskid braking control, requiring hydraulic braking control, and requiring traction control, for applying fuzzy logic, in response to said vehicle state, to said vehicle parameters to generate command signals and for providing said command signals to said motor control means to control operation of said electric traction motor and to said brake control means to control fluid pressure applied at each wheel to provide said regenerative antiskid braking control, hydraulic braking control, and traction control.

13. The regenerative antiskid braking and traction control system as claimed in claim 12 wherein said right and left driven wheels are interconnected with a drive axle and said processing means further determines a worst case wheel slip condition among driven wheels of said vehicle and for applying fuzzy logic to said worst case slip condition to generate said command signals.

14. The regenerative antiskid braking and traction control system as claimed in claim 13 wherein said worst case wheel slip condition is determined by deriving a driven wheel critical adhesion coefficient and a driven wheel critical slip for each of said driven wheels, deriving a critical adhesion coefficient equal to a lowest value of said driven wheel critical adhesion coefficients, and deriving a critical wheel slip equal to a value of said driven wheel critical slip associated with said critical adhesion coefficient.

15. The regenerative antiskid braking and traction control system as claimed in claim 12 wherein said processing means further includes a braking strategy for generating said command signals whereby an optimum proportionality between regenerative braking and hydraulic braking is obtained while satisfying a required braking demand.

16. The regenerative antiskid braking and traction control system as claimed in claim 12 wherein said sensing means includes:

a plurality of driven wheel speed sensors for measuring wheel speed of said at least two driven wheels;

brake pressure sensors for measuring brake pressure on at least two driven wheels for measuring pressure in brake line of nondriven wheels;

a master cylinder pressure sensor for measuring hydraulic pressure of a master cylinder;

a brake switch sensor for sensing operation of a brake light switch;

a motor speed sensor for measuring speed of said electric traction motor;

a motor current sensor for measuring current of said electric traction motor;

means for sensing operation of an acceleration pedal switch; and at least two nondriven wheel speed sensors, 17. The regenerative antiskid braking and traction control system as claimed in claim 12 wherein said processing means further determines whether said vehicle is coasting, generates command signals representative of said vehicle coasting and provides said command signals to said motor control means and to said brake control means to provide regenerative antiskid braking control.

18. A method for providing regenerative antiskid braking and traction control for a vehicle having at least two driven wheels, a regenerative braking system operatively connected to an electric traction motor having motor control means for controlling the operation of said motor, and a separate hydraulic braking system having brake control means for adjusting the fluid pressure applied at each wheel by said hydraulic braking system, said method for providing regenerative antiskid braking and traction control comprising the steps of:

sensing vehicle parameters to obtain real-time measurements defining vehicle behavior;

calculating additional vehicle parameters describing vehicle behavior not directly measured in said step of sensing vehicle parameters;

applying fuzzy logic to said vehicle parameters to determine critical values of said vehicle parameters according to a plurality of language control rules;

determining whether regenerative antiskid braking control, hydraulic braking control, or traction control is required based on said vehicle behavior and said critical values;

generating command signals, in response to said vehicle parameters and said required control, for controlling said motor control means of said electric traction motor and said brake control means of said hydraulic braking system to provide said regenerative antiskid braking control, hydraulic braking control, or traction control; and controlling said motor control means of said electric traction motor and said brake control means of said hydraulic braking system in accordance with said command signals.

19. The method for providing regenerative antiskid braking and traction control as claimed in claim 18 wherein said step of generating command signals comprises the step of applying fuzzy logic to said vehicle parameters and said required control to generate said command signals according to a plurality of language control rules.

20. The method for providing regenerative antiskid braking and traction control as claimed in claim 19 wherein said step of applying fuzzy logic to said vehicle parameters further comprises the steps of:

deriving a driven wheel critical adhesion coefficient for each of said at least two driven wheels; and deriving a driven wheel critical wheel slip for each of said at least two driven wheels.

21. The method for providing regenerative antiskid braking and traction control as claimed in claim 20 further comprising the steps of:

deriving a critical adhesion coefficient equal to a lowest value of said driven wheel critical adhesion coefficients; and deriving a critical wheel slip equal to a value of said driven wheel critical slip associated with said critical adhesion coefficient, said critical adhesion coefficient and said critical wheel slip being used to generate said command signals.

22. The method for providing regenerative antiskid braking and traction control as claimed in claim 18 wherein said step of sensing vehicle parameters measures wheel speed of said driven wheels and brake pressure in line of nondriven wheels, master cylinder pressure, activation of a brake light switch, electric motor speed and current to said electric motor, nondriven wheel speeds, accelerator operation, and brake pressure to said driven wheels.

* * * * *